United States Patent
Hu et al.

(10) Patent No.: US 11,549,198 B2
(45) Date of Patent: Jan. 10, 2023

(54) METHOD OF PRODUCING NON-WOVEN PROTEIN FIBERS

(71) Applicant: Rowan University, Glassboro, NJ (US)

(72) Inventors: Xiao Hu, Glassboro, NJ (US);
Xiaoyang Mou, Williamstown, NJ (US)

(73) Assignee: Rowan University, Glassboro, NJ (US)

( * ) Notice: Subject to any disclaimer, the term of this patent is extended or adjusted under 35 U.S.C. 154(b) by 572 days.

(21) Appl. No.: 16/605,848

(22) PCT Filed: Apr. 17, 2018

(86) PCT No.: PCT/US2018/027922
§ 371 (c)(1),
(2) Date: Oct. 17, 2019

(87) PCT Pub. No.: WO2018/195048
PCT Pub. Date: Oct. 25, 2018

(65) Prior Publication Data
US 2021/0123163 A1   Apr. 29, 2021

Related U.S. Application Data

(60) Provisional application No. 62/486,270, filed on Apr. 17, 2017.

(51) Int. Cl.
B29C 41/08   (2006.01)
B29C 41/24   (2006.01)
(Continued)

(52) U.S. Cl.
CPC ............. *D01D 5/14* (2013.01); *B29C 41/085* (2013.01); *D01D 5/26* (2013.01); *D01F 1/10* (2013.01);
(Continued)

(58) Field of Classification Search
CPC ....... B29C 41/08; B29C 41/085; B29C 41/24; B29C 41/28; B29C 41/46; B29K 2005/00;
(Continued)

(56) References Cited

U.S. PATENT DOCUMENTS

2003/0183978 A1   10/2003   Asakura
2004/0097709 A1   5/2004   Armato et al.
(Continued)

FOREIGN PATENT DOCUMENTS

GB           517956 A  *  2/1940   ............... D01F 4/00

OTHER PUBLICATIONS

International Search Report and Written Opinion dated Sep. 17, 2018 for PCT International Application No. PCT/US18/27922.

*Primary Examiner* — Leo B Tentoni
(74) *Attorney, Agent, or Firm* — Saul Ewing LLP; Domingos J. Silva; Chihao Wang

(57) ABSTRACT

The invention relates to non-woven protein fibers and to methods for forming and producing the same. In certain embodiments, the invention provides a method of processing a protein comprising dissolving a protein in a solution, optionally removing any insoluble materials from the solution, and spraying the solution under an applied pressure. In other embodiments, the protein can be derived from a range of sources, including but not limited to arthropod silks, animal keratin (e.g. hair and wool), tissue elastin, collagen, resilin, and plant protein. In certain embodiments, the methods of the invention are an alternative to electrospinning methods known in the art.

36 Claims, 47 Drawing Sheets

(51) Int. Cl.
  *B29C 41/28* (2006.01)
  *B29C 41/46* (2006.01)
  *D01D 1/02* (2006.01)
  *D01D 10/06* (2006.01)
  *D01D 5/14* (2006.01)
  *D01D 5/26* (2006.01)
  *D01F 1/10* (2006.01)
  *D01F 4/00* (2006.01)
(52) U.S. Cl.
  CPC ............ *D01F 4/00* (2013.01); *B29K 2005/00* (2013.01); *D10B 2211/01* (2013.01); *D10B 2211/02* (2013.01); *D10B 2211/04* (2013.01); *D10B 2211/06* (2013.01); *D10B 2509/00* (2013.01)
(58) Field of Classification Search
  CPC . D01D 1/02; D01D 5/26; D01D 10/06; D01F 1/10; D01F 4/00; D10B 2211/01; D10B 2211/02; D10B 2211/06

USPC .......................... 264/202, 309, 330, 517, 518
See application file for complete search history.

(56) References Cited

U.S. PATENT DOCUMENTS

| | | |
|---|---|---|
| 2005/0222320 A1 | 10/2005 | Torres et al. |
| 2009/0220579 A1 | 9/2009 | Hassingboe et al. |
| 2011/0250256 A1* | 10/2011 | Hyun-Oh ................. D01F 1/10 514/357 |
| 2013/0122770 A1 | 5/2013 | Wahal et al. |
| 2014/0245923 A1* | 9/2014 | Sugahara ................. D01F 4/02 264/13 |
| 2015/0017862 A1 | 1/2015 | Hassingboe et al. |
| 2015/0141618 A1* | 5/2015 | Ishikawa ................. D01F 4/00 530/353 |
| 2016/0280960 A1 | 9/2016 | Leimer et al. |

* cited by examiner

FIG. 14A
FIG. 14B
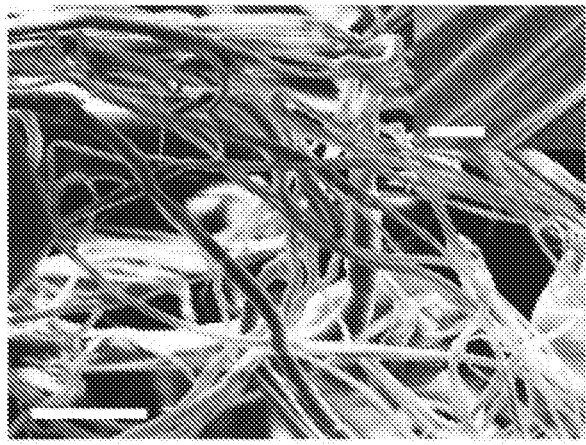
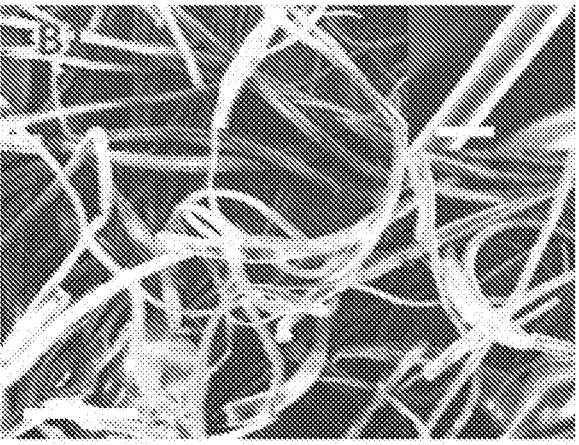
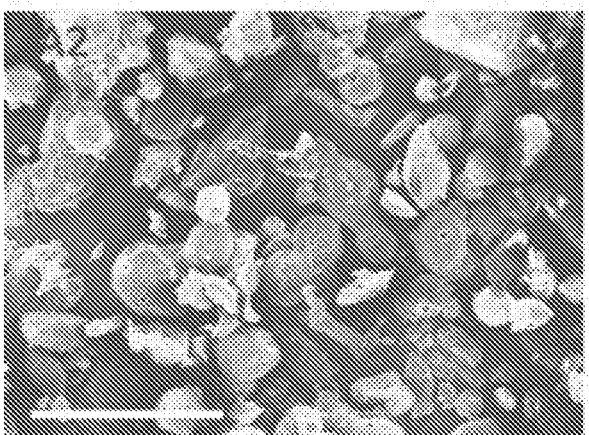
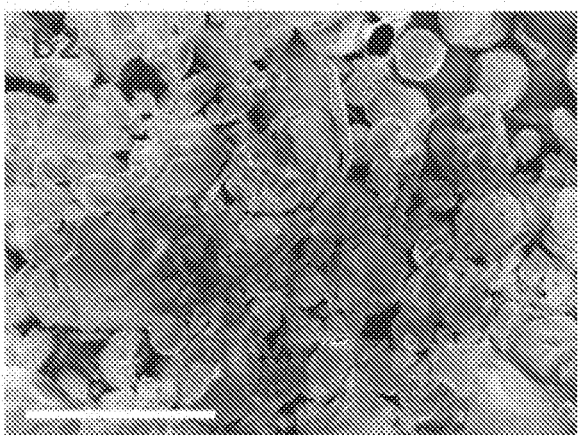
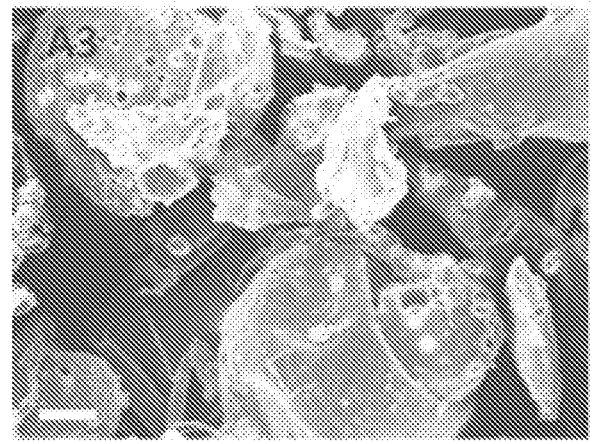
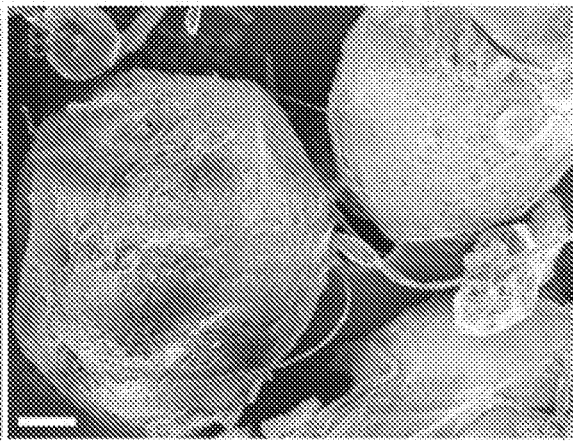

FIG. 14C
FIG. 14D
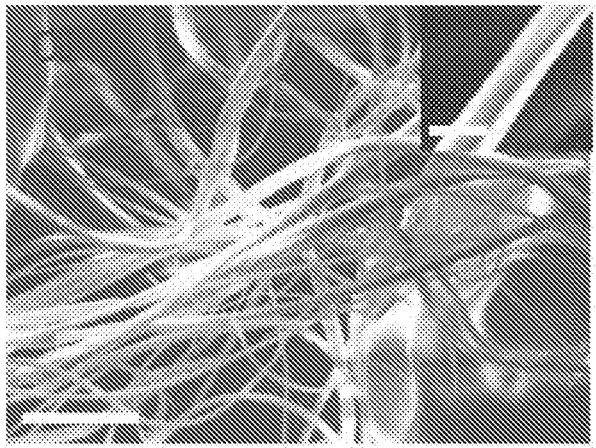
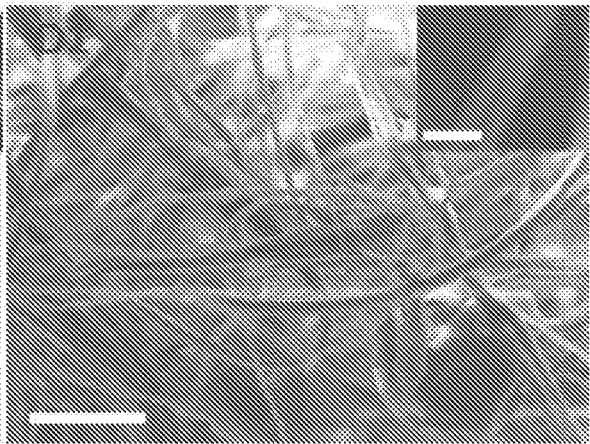
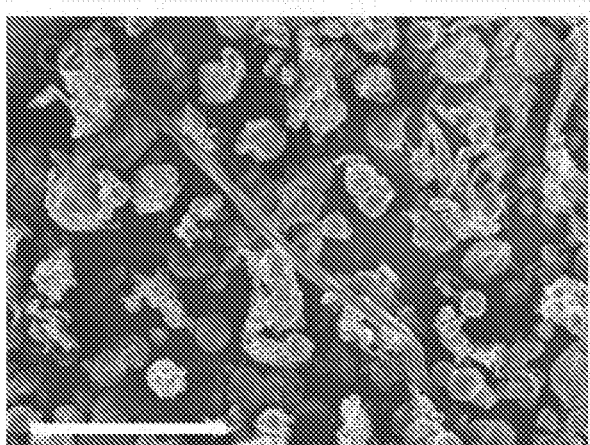
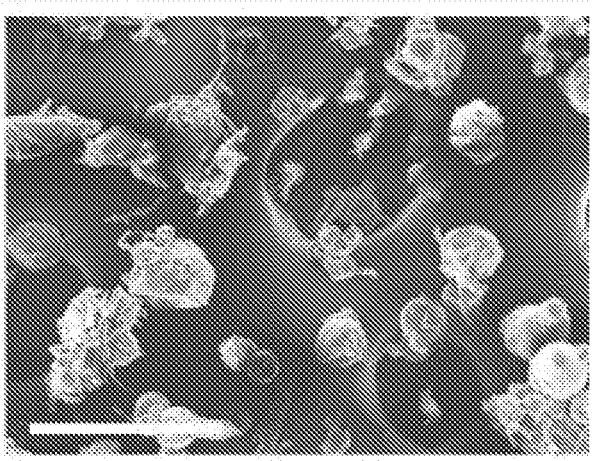
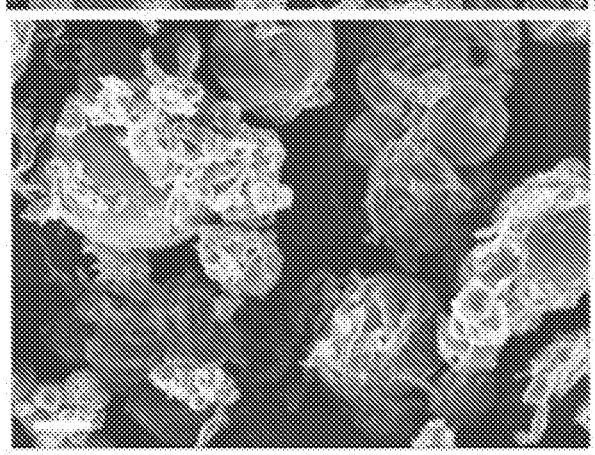
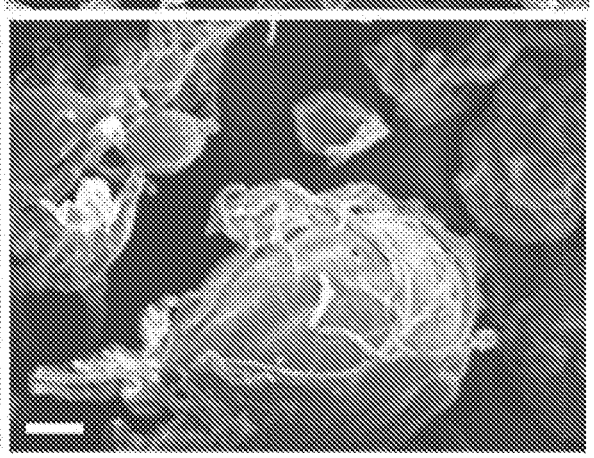

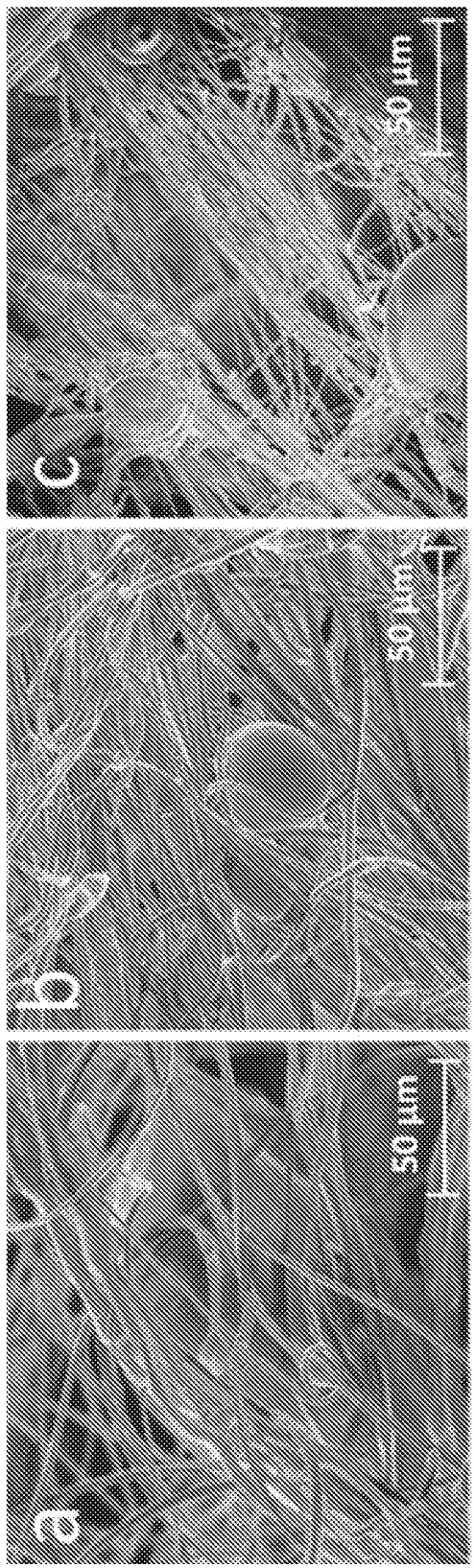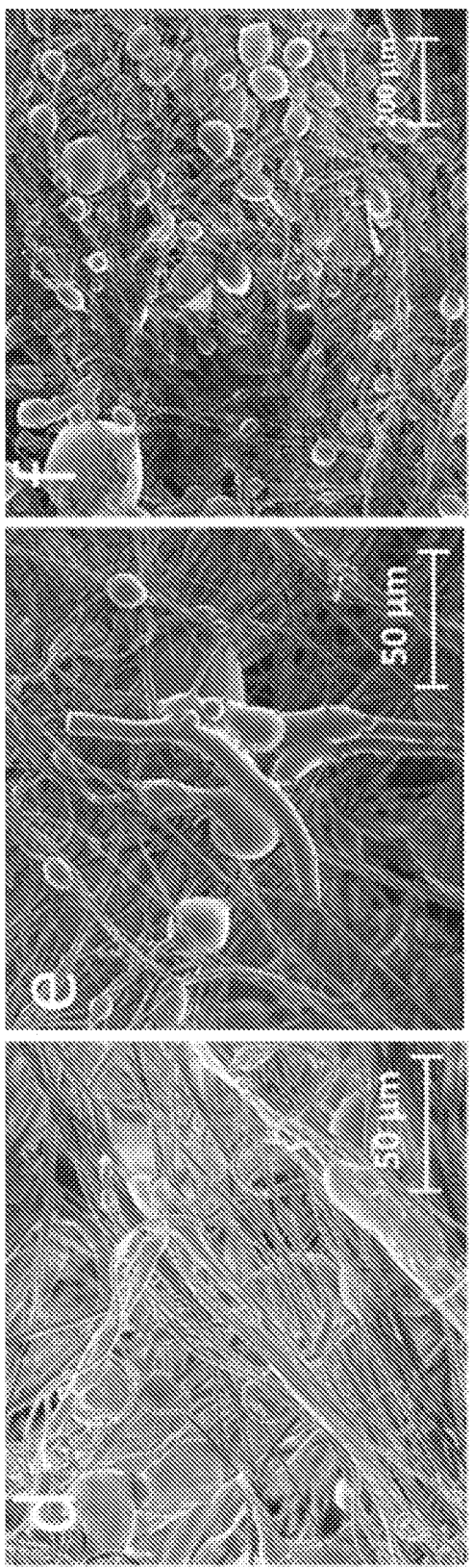

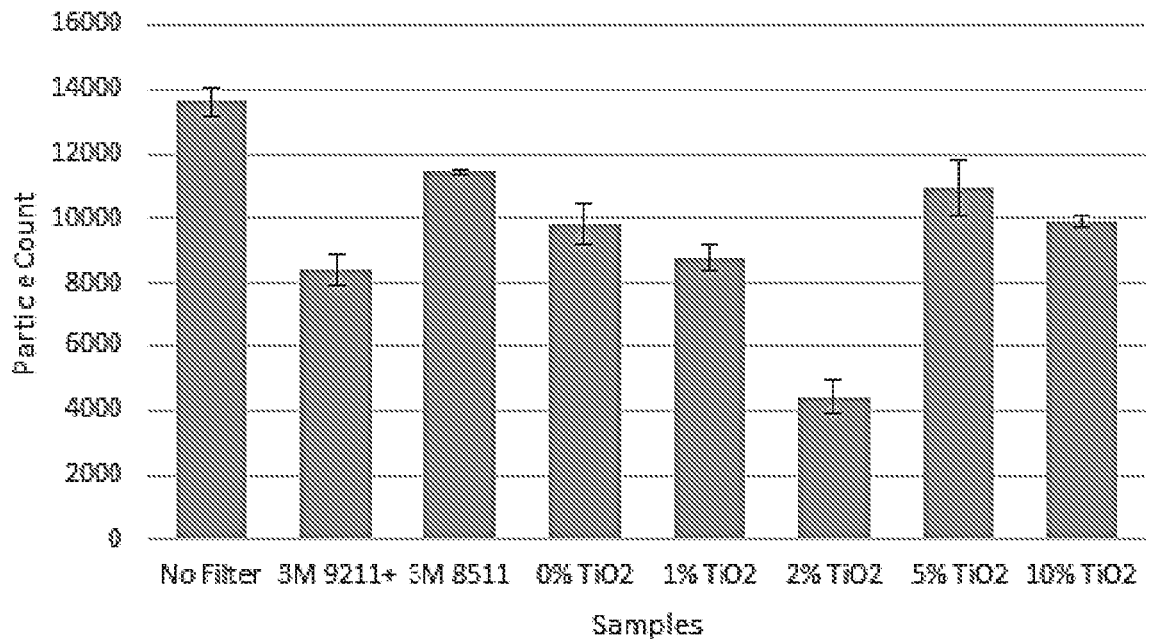
FIG. 27A Filtering 0.3 um Diameter Particles
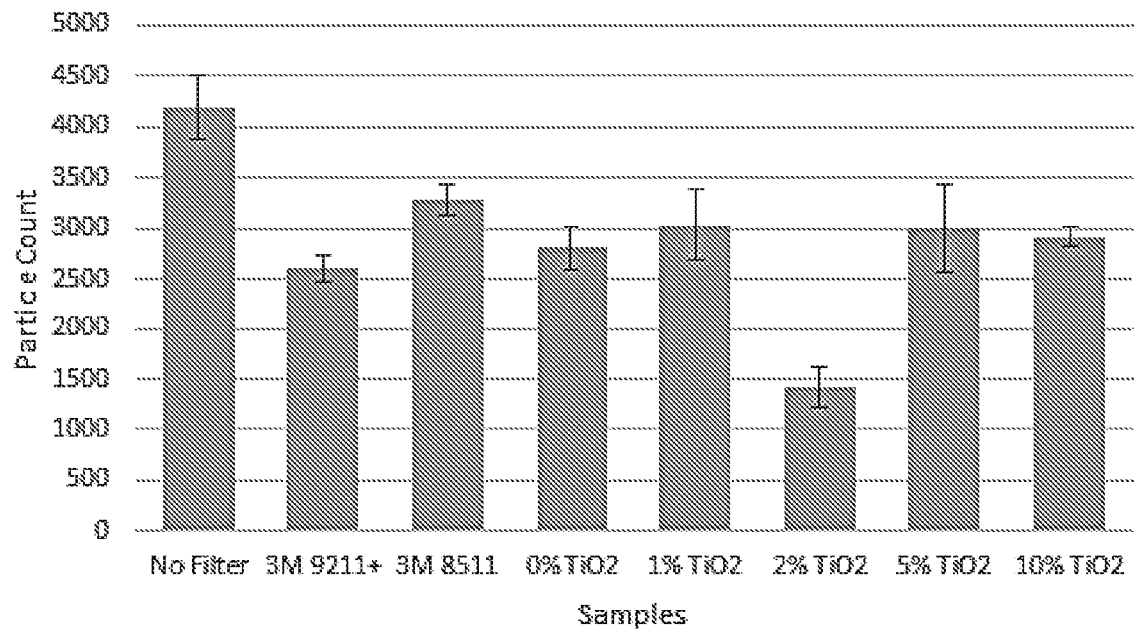
FIG. 27B Filtering 0.5 um Diameter Particles Filtering 1 um Diameter Particles Filtering 2.5 um Diameter Particles Filtering 5 um Diameter Particles Filtering 10 um Diameter Particles

METHOD OF PRODUCING NON-WOVEN PROTEIN FIBERS

CROSS-REFERENCE TO RELATED APPLICATIONS

The present application is a 35 U.S.C. § 371 national phase application of, and claims priority to, International Application No. PCT/US2018/027922, filed Apr. 17, 2018, which claims priority under 35 U.S.C. § 119(e) to U.S. Provisional Application No. 62/486,270, filed Apr. 17, 2017, all of which are incorporated herein by reference in their entireties.

BACKGROUND OF THE INVENTION

Due to their incredibly high strength and extensibility, as well as their combination of biocompatibility and biodegradability, protein materials have found applications in various fields such as biomedical research and materials science. However, many of the polymer products on the market today are very toxic, or rely on complex chemistries and cannot be manipulated easily with tunable physical properties. Also, such materials are not biologically and environmentally friendly, or able to integrate with living systems. It is thus desirable to tune the intimate connections between amino acid sequence, molecular structure, and material properties and to develop an environmentally friendly process for the production of biomaterials with low cost, high mechanical flexibility, and specific desired material properties.

Protein-based fibers, such as silk fibers, have been important materials in textiles, medical sutures, and armor since ancient times. Common sources of silk fibers for industrial applications are spiders, the larvae of *Bombyx mori*, other moth genera such as Eri, Muga, Thai, Tussah, and numerous other insects. Silk fibers are made up of the large naturally occurring polypeptide, called fibroin, which occurs in fibrous form featuring highly repetitive amino acid sequences. Silk fibroin is an insoluble protein that consists of two types of building blocks, a soft amorphous component and a strong crystalline component. Silk fibroin protein is commonly prepared by degumming silk fibers. In this procedure, silk fibers are boiled in a dilute solution of sodium carbonate, which removes sericin, one of the two major proteins that make up the cocoon. There are numerous varieties of silk fibroin, the composition of which depends on the source of silk fiber and the hydrolytic treatment used. Silk fibroins can then be further dissolved into a solution that can be stored and shaped into various forms, including soft sponges, hard discs, and films for structure studies.

Many plant-based proteins (soy, corn, and so forth) have also been used for material applications. For example, zein is a major storage protein rich in prolamine found in the endosperm of the corn kernel. It is a by-product from the processing of maize corn present in corn gluten meal and from the manufacturing of ethanol in both wet and dry milling. Zein has a molecular weight of about 40 kDa and is rich in glutamine, proline, alanine, and leucine residues. Zein proteins have hydrophobic and hydrophilic domains, but are frequently considered to be a hydrophobic protein due to its insolubility in water and solubility in ethanol, acetone, and acetylacetone. The excellent material properties of zein, such as biodegradability, mechanical resistance, water absorption and barrier ability, make it attractive in applications such as drug delivery and coatings in food and pharmaceuticals.

Protein polymers are known to be soluble in several types of high ionic strength aqueous salt solutions. To be widely applied in pharmaceuticals, foods, medical dressings and technical applications, the salts must be dialyzed out to produce a pure solution of protein. There are few reports of fibers and non-woven materials made of pure proteins, because to the weak fiber forming properties of proteins when used in conjunction with salt/organic solutions. It is possible to make protein fibers such as silk fibroin without the use of compatible solvents, primarily through by electro-spinning. However, current electro-spinning processes known in the art have low output efficiency and are limited by the dielectric constant of the materials. Another commonly used technique is wet-spinning, which involves the extrusion of a polymer solution through a spinneret into an acid-salt coagulating bath. Although wet-spinning is commonly considered the method with the most potential for scaling to commercial production of nanofibers, it relies on the use of expensive and harmful solvents, such as aqueous ammonium sulfate, acetic acid, isopropanol, or acetone.

Thus, there remains a need in the art for methods and devices for producing and collecting micro and nanofibers made from naturally occurring proteins. In certain embodiments, such methods and devices should avoid the biologically toxic solvent systems needed for wet- and electro-spinning. In other embodiments, the fibers produced should mimic the morphological characteristics of native collagen fibers and be useful in the fabrication of protein-cell constructs for medical applications. In yet other embodiments, the fibers should be useful as drug delivery vehicles. In yet other embodiments, the fibers should be useful as filters. The present invention meets these needs.

BRIEF SUMMARY OF THE INVENTION

In one aspect, the invention provides a method of producing non-woven protein fibers.

In certain embodiments, the method comprises dissolving a protein in an acidic solution. In other embodiments, the method comprises removing any insoluble material from the solution. In yet other embodiments, the method comprises spraying the solution under an applied pressure at a collection surface. In yet other embodiments, the solution evaporates shortly after being sprayed, forming protein fibers upon reaching or before reaching the collection surface. In yet other embodiments, the solution is sprayed without the application of an electrical potential. In yet other embodiments, at least one additional non-protein material is present in the acidic solution and is selected from the group consisting of a pharmaceutical agent, synthetic polymer, natural polymer, plasticizer, metal, metal alloy, metal oxide, metal salt, ceramic, glass, natural composite, synthetic composite, carbon material, nanoparticle, nanotube, nanofiber, nanosheet, microsphere, microfiber, and any combinations thereof.

In certain embodiments, the at least one additional non-protein material is a metal oxide selected from the group consisting of $SiO_2$, $TiO_2$, CaO, $Al_2O_3$, CuO, ZnO, FeO, MnO, NiO, BaO, SrO, and $Fe_2O_3$.

In certain embodiments, the at least one additional non-protein material is a pharmaceutical agent selected from the group consisting of an antibiotic, a β-lactamase inhibitor, an anti-diabetic agent, and an anticancer agent. In other embodiments, the at least one pharmaceutical agent is selected the group consisting of rifampin, meticillin, nafcillin, oxacillin, cloxacillin, dicloxacillin, flucloxacillin, aminopenicillins, ampicillin, amoxicillin, pivampicillin, hetacillin, bacampicillin, metampicillin, talampicillin, epicillin, carboxypenicillins, carbenicillin, ticarcillin, temocillin, ureidopenicillins, mezlocillin, piperacillin, β-lactamase inhibitors, clavulanic acid, sulbactam, tazobactam, insulins, biguanides, metformin, phenformin, buformin, thiazolidinediones, rosiglitazone, pioglitazone, troglitazone, doxorubicin, cyclophosphamide, amsacrine, bleomycin, capecitabine, carmustine, docetaxel, eribulin, fluorouracil, gemcitabine, hydroxycarbamide, idarubicin, temozolomide, thiotepa, tioguanine, topotecan, trabectedin, treosulfan, vinblastine, and vinorelbine.

In certain embodiments, the at least one additional non-protein material is a synthetic polymer selected from the group consisting of poly(lactic-co-glycolic acid) (PLGA), polystyrene, polyvinylchloride, poly(styrene sulfonate), poly(acrylic acid) (PAA), poly(diallyldimethylammoniumchloride) (PDADMAC), polyglycolic (PGA) acid, and polylactic acid (PLA).

In certain embodiments, the at least one additional non-protein material is a natural polymer selected from the group consisting of cellulose, chitin and starch.

In certain embodiments, the at least one additional non-protein material is a carbon material selected from the group consisting of graphene, carbon nanotubes, carbon nanofibers, and fullerenes.

In certain embodiments, the at least one additional non-protein material is a plasticizer selected from the group consisting of sorbitan, sorbitan anhydrides, castor oil, mono-acetylated monoglycerides, di-acetylated monoglycerides, glycerin triacetate, glycerol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, polyvinyl alcohol, propylene glycol, triethyl citrate, tributyl citrate, acetyl triethyl citrate, acetyl tributyl citrate, n-butyryl tri-n-hexyl citrate, oleic acid, steric acid, polyethylene glycols, and any combinations thereof.

In certain embodiments, the protein is derived from at least one natural source selected from the group consisting of arthropod silk, keratin, tissue elastin, collagen, resilin, reflectin, and plant proteins. In other embodiments, the protein is derived from at least one arthropod silk source selected from the group consisting of *Bombyx mori* silk, *Samia cynthia* silk, *Antheraea assamensis* silk, *Antheraea mylitta* silk, *Antheraea paphia* silk, *Antheraea pernyi* silk, *Antheraea roylei* silk, *Antheraea yamamai* silk, and spider silk. In yet other embodiments, the protein is derived from at least one proteins source selected from the group consisting of Indian *Antheraea mylitta* silk (Tussah), *Philosamia ricini* silk (Eri), *Antheraea assamensis* silk (Muga), Thailand silk (Thai), and *Bombyx mori* mulberry silk (Mori). In yet other embodiments, the protein is derived from at least one plant source selected from the group consisting of corn zein, wheat gliadin, wheat gluten, barley hordein, rye secalin, sorghum kafirin, oat avenin, soy, and any combinations thereof.

In certain embodiments, the protein is artificial or recombinant. In other embodiments, the protein is a recombinant protein derived from or related to a natural protein described elsewhere herein.

In certain embodiments, the protein is dissolved in the acidic solution at a concentration of about 1 g/L to about 600 g/L. In other embodiments, the acidic solution comprises at least one acidic component selected from the group consisting of formic acid, acetic acid, hydrochloric acid, propionic acid, butyric acid, valeric acid, caproic acid, oxalic acid, lactic acid, malic acid, citric acid, benzoic acid, carbonic acid, phenol, uric acid, and any combinations thereof. In yet other embodiments, the acidic solution comprises more than about 80% acidic component by volume.

In certain embodiments, the acidic solution comprises a salt comprising at least one cation selected from the group consisting of lithium, sodium, potassium, calcium, magnesium, zinc, iron, ammonium, and any combinations thereof. In other embodiments, the acidic solution comprises a salt comprising at least one anion selected from the group consisting of hydroxide, gluceptate, gluconate, acetate, propionate, lactate, nitrate, chloride, bromide, fluoride, iodide, sulfate, carbonate, phosphate, and any combinations thereof. In yet other embodiments, the acidic solution comprises at least one salt selected from the group consisting of $CaCl_2$, NaCl, KCl, and $MgCl_2$.

In certain embodiments, the insoluble materials are removed from the solution via a method selected from the group consisting of decantation, centrifugation, and filtration.

In certain embodiments, the solution is sprayed using an airbrush. In other embodiments, the solution is sprayed at an applied pressure of about 5 psi to about 200 psi.

In certain embodiments, the method further comprises drying the protein fibers.

In certain embodiments, the method produces protein fibers having an average diameter of about 0.1 μm to about 200 μm. In other embodiments, the method produces protein fibers having an average length of about 1 μm to about 10 m. In yet other embodiments, the method produces protein fibers that are not soluble in water.

In another aspect, the invention provides a protein fiber fabricated by any of the methods of the invention.

In yet another aspect, the invention provides a protein fiber composition, comprising at least one protein fiber fabricated by any of the methods of the invention.

BRIEF DESCRIPTION OF THE FIGURES

For the purpose of illustrating the invention, depicted in the drawings are certain embodiments of the invention. However, the invention is not limited to the precise arrangements and instrumentalities of the embodiments depicted in the drawings.

FIG. 5A is a graph illustrating standard DSC scans of different protein micro-/nanofibers samples. The samples were heated at 2° C. $min^{-1}$ from −30° C. to 400° C., with temperature regions related to solvent evaporations ($T_w$), glass transitions ($T_g$), and sample degradations ($T_{d1}$, $T_{d2}$). FIG. 5B is a graph illustrating reversing heat capacities of the protein samples, measured by temperature-modulated DSC (TMDSC) with a 2° C. min$^{-1}$ heating rate, a modulation period of 60 s and a temperature amplitude of 0.318° C.

FIG. 9A shows the spectra for fibers containing various drugs. The region containing the amide I and II peaks (1800 cm$^{-1}$ to about 1500 cm$^{-1}$) has been enhanced in FIG. 9B to highlight the random coil to alpha helix transition with the addition of drug. When the drug is released, secondary structure reverts back to the homogeneous random coil network seen in FIG. 9C.

FIGS. 14A-14E are SEM images of corn zein nanofibers with different model drugs (Rifampin, Alcian Blue, Indigo Carmine, Rhodamin and Crystal Violet for FIGS. 14A-14E respectively). The top image in each figure shows pre-release samples of each corn zein nanofiber. The scale bar is 20 μm. The scale bar of the inset images are 2 μm. The middle image in each figure shows the fibers after release of their respective drugs. The scale bar is 200 μm. The bottom image in each figure is an enhanced image of the fibers after release of their respective drugs. The scale bar is 20 μm to show the morphology of the particles.

FIGS. 20A-20F are SEM images of Mori silk-TiO$_2$ nanofibers with various amount of TiO$_2$. FIG. 20A: 0% (pure Mori silk fibers); FIG. 20B: 1%; FIG. 20C: 2%; FIG. 20D: 5%; FIG. 20E: 10%; FIG. 20F: 10% (with a larger scale bar compared with FIGS. 20A-20E).

DETAILED DESCRIPTION OF THE INVENTION

Figure 1:
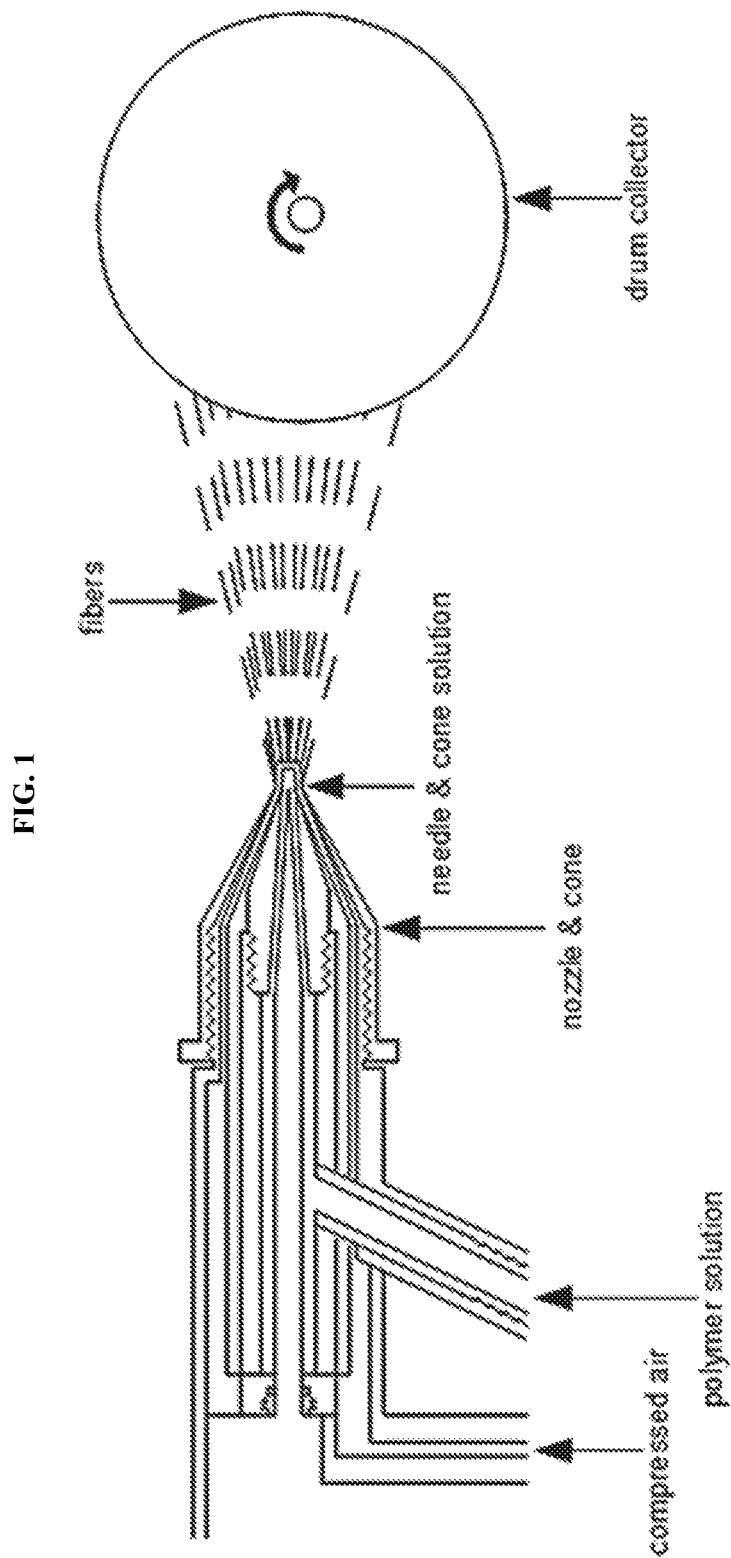
FIG. 1 is a schematic diagram for the fabrication of a raw protein material into microfibers and nanofibers according to an embodiment of the invention.

The invention relates to non-woven protein fibers and to methods for forming and producing the same. In certain embodiments, the invention provides a method of processing a protein comprising dissolving a protein in a solution, removing any insoluble materials from the solution, and spraying the solution under an applied pressure. In other embodiments, the protein can be derived from a range of sources, including but not limited to arthropod silks, animal keratin (e.g. hair and wool), tissue elastin, collagen, resilin, reflectin and plant proteins (e.g., corn zein, soy, wheat gluten), as well as any related protein peptides derived from recombinant biotechnology. In certain embodiments, the methods of the invention are an alternative to electrospinning methods known in the art.

Methods

In one aspect the invention relates to a method of producing non-woven protein fibers. In certain embodiments, the method comprises dissolving a protein in an acidic solution. In other embodiments, the method comprises optionally removing any insoluble material from the solution. In yet other embodiments, the method comprises spraying the solution under an applied pressure at a collection surface, such that the solution evaporates shortly after being sprayed, forming protein fibers upon reaching or before reaching the collection surface.

In certain embodiments, the solution is sprayed without the application of an electrical potential. In other embodiments, the method does not comprise electrospinning.

In certain embodiments, the protein is a protein derived from at least one natural source selected from the group consisting of arthropod silk, keratin, tissue elastin, collagen, resilin, reflectin, and plant protein (e.g., corn zein, soy, wheat gluten). In other embodiments, the protein is derived from at least one arthropod silk source selected from the group consisting of *Bombyx mori* silk, *Samia cynthia* silk, *Antheraea assamensis* silk, *Antheraea mylitta* silk, *Antheraea paphia* silk, *Antheraea pernyi* silk, *Antheraea roylei* silk, *Antheraea yamamai* silk. In yet other embodiments, the protein is derived from spider silk. In yet other embodiments, the protein is derived from at least one protein source selected from the group consisting of Indian *Antheraea mylitta* silk (Tussah), *Philosamia ricini* silk (Eri), *Antheraea assamensis* silk (Muga), Thailand silk (Thai) and *Bombyx mori* mulberry silk (Mori). In yet other embodiments, the protein is derived from at least one plant source selected from the group consisting of corn zein, wheat gliadin, wheat gluten, barley hordein, rye secalin, sorghum kafirin, oat avenin, and soy. In yet other embodiments, the protein is at least one selected from the group consisting of corn zein and silk fibroin.

In certain embodiments, the protein is an artificial or recombinant protein. In other embodiments, the protein is derived from a recombinant silk protein. In yet other embodiments, the protein is a recombinant silk protein derived from or related to any natural protein source discussed elsewhere herein. In yet other embodiments, the protein is a natural protein that has been modified through at least one chemical reaction to remove at least one functional group and/or add at least one functional group. In yet other embodiments, the natural protein is modified by methods known in the art of organic chemistry. In yet other embodiments, the protein is cross-linked to at least one synthetic polymer. In yet other embodiments, the at least one synthetic polymer is selected from the group consisting of, but not necessarily limited to, poly(ethylene glycol) (PEG), poly (lactic-co-glycolic acid) (PLGA), polystyrene, polylactic acid, polyvinylchloride, poly(styrene sulfonate), poly (acrylic acid) (PAA), poly(diallyldimethyl-ammoniumchloride) (PDADMAC) and any combinations thereof.

In certain embodiments, the protein is purified before being dissolved in the acidic solution. In other embodiments, the protein is degummed to remove undesired components using methods known in the art. In an exemplary embodiment, the silk fibroin fibers are purified to remove soluble silk sericin proteins. Such purification methods can be determined by a person of ordinary skill in the art without requiring undue experimentation.

In certain embodiments, the protein is dissolved in the acidic solution at a concentration of about 1 g/L to about 600 g/L. In other embodiments, the protein is dissolved in the acidic solution at a concentration of about 10 g/mL to about 500 g/L, about 10 g/mL to about 400 g/L, about 10 g/mL to about 300 g/L, about 10 g/mL to about 200 g/L, about 10 g/mL to about 100 g/L, about 20 g/mL to about 400 g/L, about 20 g/mL to about 300 g/L, about 20 g/mL to about 200 g/L, about 20 g/mL to about 100 g/L, about 50 g/mL to about 400 g/L, about 50 g/mL to about 300 g/L, about 50 g/mL to about 200 g/L, about 50 g/mL to about 100 g/L or any subunits and sub-ranges in-between. In yet other examples, the protein concentration of the acidic solution is at least one selected from the group consisting of 1 g/L, 5 g/L, 10 g/L, 20 g/L, 30 g/L, 40 g/L, 50 g/L, 60 g/L, 70 g/L, 80 g/L, 90 g/L, 100 g/L, 120 g/L, 140 g/L, 160 g/L, 180 g/L, 200 g/L, 250 g/L, 300 g/L, 350 g/L 400 g/L, 450 g/L, 500 g/L, 550 g/L, and 600 g/L, or any fraction or multiple thereof.

In certain embodiments, the protein comprises two or more types of proteins, thereby allowing for the formation of a protein alloy fiber. In one exemplary embodiment, protein derived from a wild tussah silk is co-dissolved with a protein from a domesticated mulberry silk to form a protein alloy biomaterial.

In certain embodiments, the acidic solution comprises at least one acidic component that is capable of rapidly volatilizing once sprayed at room temperature. In other embodiments, the at least one acidic component is selected from the group consisting of formic acid, acetic acid, hydrochloric acid, propionic acid, butyric acid, valeric acid, caproic acid, oxalic acid, lactic acid, malic acid, citric acid, benzoic acid, carbonic acid, phenol, uric acid, and any combinations thereof. In yet other embodiments, the acidic solution further comprises water. In certain embodiments, the acidic solution comprises more than about 50% acidic component by volume. In other embodiments, the acidic solution comprises more than about 60%, more than about 70%, more than about 80%, more than about 90%, more than about 95%, or more than about 99% acidic component by volume.

In certain embodiments, the acidic solution further comprises at least one salt comprising at least one alkali metal, alkaline earth metal, or transition metal cation. In other embodiments, the at least one cation is selected from the group consisting of lithium, sodium, potassium, calcium, magnesium, zinc, iron, ammonium, and any combinations thereof. In other embodiments, the at least one salt comprises at least one anion selected from the group consisting of hydroxide, gluceptate, gluconate, acetate, propionate, lactate, nitrate, chloride, bromide, fluoride, iodide, sulfate, carbonate, phosphate, and any combinations thereof. In yet other embodiments, the at least one salt is selected from the group consisting of calcium chloride, calcium fluoride, calcium bromide, calcium iodide, calcium citrate, calcium gluceptate, calcium gluconate, calcium hydroxide, calcium lactate, calcium phosphate, calcium propionate, calcium acetate, and calcium carbonate. In yet other embodiments, the salt is a calcium salt. In yet other embodiments, the anion is chloride. In yet other embodiments, calcium chloride is the only salt. In yet other embodiments, the salt is not calcium nitrate or lithium bromide. In yet other embodiments, the acidic solution comprises the at least one salt at a concentration of about 5 g/L to about 400 g/L. In other embodiments, the acidic solution comprises the at least one salt at a concentration of about 5 g/L, about 10 g/L, about 20 g/L, about 30 g/L, about 40 g/L, about 50 g/L, about 60 g/L, about 70 g/L, about 80 g/L, about 90 g/L, about 100 g/L, about 150 g/L, about 200 g/L, about 250 g/L or about 300 g/L.

In certain embodiments, the acidic solution further comprises at least one additional organic solvent. In other embodiments, the at least one additional organic solvent is selected from the group consisting of hexane, octane, acetone, tetrahydrofuran, 2-butanone, toluene, xylene, ethanol, methanol, isopropanol, benzene and dimethyl sulfoxide (DMSO). In other embodiments, the at least one additional organic solvent is added in order to modify the viscosity of the solution.

In certain embodiments, the dissolution of the protein into the acidic solution is promoted by at least one method selected from stirring, shaking, sonicating, heating and any combinations thereof. In other embodiments, the dissolution promoting methods lasts from a few seconds to more than 10 hours. In an exemplary embodiment, the solution, after the addition of the protein, is stirred or shaken for about 1, about 2, about 3, about 4, about 5, about 8, about 10, about 15, about 20, about 25, or about 30 minutes. In certain embodiments, the solution is heated to a temperature of about 30° C., about 35° C., about 40° C., about 45° C., about 50° C., about 55° C., about 60° C., about 65° C., about 70° C., about 75° C., about 80° C., about 85° C., about 90° C. or any temperatures and ranges therebetween.

In certain embodiments, the insoluble materials are removed from the solution via any method known in the art. In other embodiments, the insoluble materials are removed via a method selected from the group consisting of, but not necessarily limited to, decantation, centrifugation, and filtration. Specific requirements for this step, including for example determining the size of a filter needed to remove insoluble materials, can be determined by one of ordinary skill in the art without undue experimentation.

In certain embodiments, the solution is allowed to stand undisturbed for a period of time before spraying. In other embodiments, the solution is allowed to stand for at least 1 minute, at least 2 minutes, at least 5 minutes or at least 10 minutes. In yet other embodiments, allowing the solution to stand for a period of time allows for insoluble materials to settle out of the solution and for any bubbles to separate out.

In certain embodiments, the solution is sprayed using any spraying device or apparatus known in the art. In other embodiments the spraying device is an airbrush. In yet other embodiments, the spraying device comprises a nozzle through which the solution is ejected into a stream of accelerated gas. In yet other embodiments, the spraying device further comprises at least one pressure regulator. In yet other embodiments, the spraying device further comprises at least one spraying nozzle having an adjustable component to regulate flow of a stream of accelerated gas. In yet other embodiments, the spraying device comprises a reservoir adapted and configured to hold the solution. In yet other embodiments, the spraying device comprises a pump adapted and configured to deliver the solution from the reservoir to the nozzle at a controllable injection rate.

In certain embodiments, the solution is sprayed under an applied pressure of about 10 psi to about 250 psi. In other embodiments, the solution is sprayed under an applied pressure of about 100 psi. In yet other embodiments, the solution is sprayed using a compressed gas source. In yet other embodiments, the compressed gas is at least one selected from the group consisting of nitrogen, oxygen, hydrogen, helium, carbon dioxide, argon, and air.

In an exemplary embodiment, the protein solution is ejected through a nozzle as a bead or a droplet, and is drawn into a cone shape, as gas flow increases from one or more gas nozzles adjacent to a solution extruding nozzle. The increase in gas velocity promotes a low pressure zone at the solution/gas interface creating a driving and shearing force that is responsible for formation and acceleration of the polymer solution. As fine streams of polymer solution are ejected toward the collector or target area, the solvent rapidly evaporates from the stream, forming protein fibers before reaching the collector or target area. Due to the high surface area to volume ratio of these fibers, solvent evaporation occurs relatively quickly at ambient temperature and atmospheric pressure.

In certain embodiments, excess solvent is further removed from the formed non-woven protein fibers by drying the protein fibers through exposure to heat and/or vacuum. In other embodiments, the protein fibers are dried in a vacuum oven. In certain embodiments, the protein fibers are dried by allowing them to air dry at room temperature.

In certain embodiments, at least one additional non-protein material is dissolved in the acidic solution. In other embodiments, the at least one additional material is selected from the group consisting of a pharmaceutical agent, a synthetic polymer, a natural polymer, a plasticizer, a metal, a metal alloy, a metal oxide, a metal salt, a ceramic, a glass, a carbon material, a natural composite, a synthetic composite, a nanoparticle, a nanotube, a nanofiber, and any combinations thereof. In certain embodiments, the at least one additional material is a synthetic polymer. In other embodiments, the at least one additional material is selected from the group consisting of, but not necessarily limited to, poly(ethylene glycol) (PEG), poly(lactic-co-glycolic acid) (PLGA), polystyrene, polyglycolic acid (PGA), polylactic acid (PLA), polyvinylchloride, poly(styrene sulfonate), poly (acrylic acid) (PAA), poly(diallyldimethyl-ammoniumchloride) (PDADMAC) and any combinations thereof. In certain embodiments, the at least one additional material is a natural polymer. In other embodiments, the natural polymer is a polysaccharide, such as cellulose, chitin and starch. In certain embodiments, the at least one additional material is a metal oxide. In other embodiments, the at least metal oxide is selected from the group consisting of $SiO_2$, $TiO_2$, CaO, $Al_2O_3$, CuO, ZnO, FeO, MnO, NiO, BaO, SrO, and $Fe_2O_3$. In yet other embodiments, the at least one additional material is a pharmaceutical agent or drug. In yet other embodiments, the pharmaceutical agent or drug is at least one selected from, but not necessarily limited to, the group consisting of an antibiotic, a β-lactamase inhibitor, an anti-diabetic agent, and an anticancer agent. In yet other embodiments, the pharmaceutical agent or drug is an antibiotic selected from, but not necessarily limited to, the group consisting of rifampin, natural penicillins, β-lactamase-resistant antibiotics (e.g. meticillin, nafcillin, oxacillin, cloxacillin, dicloxacillin, and flucloxacillin), aminopenicillins (e.g. ampicillin, amoxicillin, pivampicillin, hetacillin, bacampicillin, metampicillin, talampicillin, and epicillin), carboxypenicillins (e.g. carbenicillin, ticarcillin, and temocillin), and ureidopenicillins (e.g. mezlocillin and piperacillin). In yet other embodiments, the pharmaceutical agent or drug is a β-lactamase inhibitor selected from, but not necessarily limited to, the group consisting of clavulanic acid, sulbactam, and tazobactam. In yet other embodiments, the pharmaceutical agent or drug is an anti-diabetic medication selected from, but not necessarily limited to, the group consisting of insulins, biguanides (e.g. metformin, phenformin, and buformin), and thiazolidinediones (e.g. rosiglitazone, pioglitazone, and troglitazone). In yet other embodiments, the pharmaceutical agent or drug is an anticancer chemotherapy selected from, but not necessarily limited to, the group consisting of doxorubicin, cyclophosphamide, amsacrine, bleomycin, capecitabine, carmustine, docetaxel, eribulin, fluorouracil, gemcitabine, hydroxycarbamide, idarubicin, temozolomide, thiotepa, tioguanine, topotecan, trabectedin, treosulfan, vinblastine, and vinorelbine. In yet other embodiments, the at least one additional material is at least one carbon material. In yet other embodiments, the at least one carbon material is selected from the group consisting of graphene, carbon nanotubes, carbon nanofibers, and fullerenes. In yet other embodiments, the at least one additional material is at least on plasticizer. In yet other embodiments, the plasticizer is selected from the group consisting of sorbitan, sorbitan anhydrides, castor oil, monoacetylated monoglycerides, di-acetylated monoglycerides, triacetin (glycerin triacetate), glycerol (glycerin), erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, polyvinyl alcohol, propylene glycol, triethyl citrate, tributyl citrate, acetyl triethyl citrate, acetyl tributyl citrate, n-butyryl tri-n-hexyl citrate, oleic acid, steric acid, polyethylene glycols, and any combinations thereof.

In certain embodiments, the collection surface is a substrate onto which the fibers are sprayed. In other embodiments, the collection surface is made of at least one material selected from the group consisting of a metal surface and a polymer surface. For example, in certain embodiments, the collection surface is at least one selected from the group consisting of polydimethylsiloxane (PDMS), Teflon, and aluminum foil.

In certain embodiments, the collection surface is a movable surface. In other embodiments, the collection surface is mounted on a rotating cylinder.

In certain embodiments, the method further comprises compressing the protein fibers. In other embodiments, the compression of the protein fibers is sufficient to alter one or more properties of the protein fibers selected from, but not limited to, the group consisting of solvent release temperature, thermal degradation temperature, glass transition temperature, crystallinity, bio-stability, and elastic modulus. In certain embodiments, the protein fibers are heated while undergoing compression.

In certain embodiments, the method further comprises shaping the protein fibers into a desired shape. In other embodiments, the protein fibers are shaped into a 3-D porous material. In yet other embodiments, the protein fibers are freeze-dried after being shaped into the desired shape. In yet other embodiments, the protein fibers are shaped based on the shape of the collection surface.

In certain embodiments, the protein fibers are microfibers or nanofibers. In other embodiments, the protein fibers have an average diameter of about 0.1 µm to about 200 µm. In other embodiments, the protein fibers produced by the method of the invention have an average diameter of about 0.5 µm to about 10 µm. In certain embodiments, the protein fibers produced by the method of the invention have an average length of about 1 µm to about 10 m.

In certain embodiments, the protein fibers produced by the method of the invention are not soluble in water, or not appreciably soluble in water. In other embodiments, the protein fibers are not soluble in water without any additional treatment or manipulation.

In certain embodiments, the protein fibers produced by the method of the invention retain their natural conformation without being denatured. In other embodiments, the protein fibers produced by the method of the invention form alpha helices. In yet other embodiments, the protein fibers produced by the method of the invention form beta sheets.

Compositions

In another aspect, the invention provides protein fibers. In certain embodiments, the protein fibers further comprises at least one additional non-protein material. In certain embodiments, the protein fibers are produced by a method of the invention. In other embodiments, the protein fibers are produced by any method known in the art.

In certain embodiments, the protein fibers are microfibers or nanofibers. In other embodiments, the protein fibers have an average diameter of about 0.1 µm to about 200 µm. In other embodiments, the protein fibers produced by the method of the invention have an average diameter of about 0.5 µm to about 10 µm. In certain embodiments, the protein fibers produced by the method of the invention have an average length of about 1 µm to about 10 m.

In certain embodiments, the protein fibers comprise at least one protein derived from at least one natural source selected from the group consisting of arthropod silk, keratin, tissue elastin, collagen, resilin, reflectin, and plant proteins (e.g., corn zein, soy, wheat gluten). In other embodiments, the protein is derived from at least one arthropod silk source selected from the group consisting of *Bombyx mori* silk, *Samia cynthia* silk, *Antheraea assamensis* silk, *Antheraea mylitta* silk, *Antheraea paphia* silk, *Antheraea pernyi* silk, *Antheraea roylei* silk, *Antheraea yamamai* silk. In yet other embodiments, the protein is derived from spider silk. In yet other embodiments, the protein is derived from at least one proteins source selected from the group consisting of Indian *Antheraea mylitta* silk (Tussah), *Philosamia ricini* silk (Eri), *Antheraea assamensis* silk (Muga), Thailand silk (Thai), and *Bombyx mori* mulberry silk (Mori). In yet other embodiments, the protein is derived from at least one plant source selected from the group consisting of corn zein, wheat gliadin, wheat gluten, barley hordein, rye secalin, sorghum kafirin, oat avenin, soy, and any combinations thereof. In yet other embodiments, the at least one protein is selected from the group consisting of corn zein and silk fibroin.

In certain embodiments, the protein fibers comprise at least one artificial protein or recombinant protein. In other embodiments, the protein is derived from a recombinant silk protein. In yet other embodiments, the protein is a recombinant silk protein derived from or related to any natural protein source discussed elsewhere herein. In yet other embodiments, the artificial protein is a natural protein that has been modified through at least one chemical reaction to remove at least one functional group and/or add at least one functional group. In yet other embodiments, the natural protein is modified by methods known in the art of organic chemistry. In yet other embodiments, the protein is cross-linked to at least one synthetic polymer. In yet other embodiments, the at least one synthetic polymer is selected from the group consisting of poly(ethylene glycol) (PEG), poly(ethylene glycol) (PEG), poly(lactic-co-glycolic acid) (PLGA), polystyrene, polyglycolic (PGA) acid, polylactic acid (PLA), polyvinylchloride, poly(styrene sulfonate), poly(acrylic acid) (PAA), poly(diallyldimethyl-ammoniumchloride) (PDADMAC) and any combinations thereof. In yet other embodiments, the protein is cross-linked to at least on natural polymer. In yet other embodiments, the at least one natural polymer is a polysaccharide such as cellulose, chitin and starch.

In certain embodiments, the at least one additional non-protein material is selected from the group consisting of a pharmaceutical agent, a natural polymer, a synthetic polymer, a plasticizer, a metal, a metal alloy, a metal oxide, a metal salt, a ceramic, a glass, a carbon material, a natural composite, a synthetic composite, a nanoparticle, a nanotube, a nanofiber, a nanosheet, a microsphere, a microfiber, a material with irregular shape, and any combinations thereof. In certain embodiments, the at least one additional material is a synthetic polymer. In other embodiments, the synthetic polymer is selected from, but not necessarily limited to, the group consisting of poly(ethylene glycol) (PEG), poly(lactic-co-glycolic acid) (PLGA), polystyrene, polyglycolic (PGA) acid, polylactic acid (PLA), polyvinylchloride, poly(styrene sulfonate), poly(acrylic acid) (PAA), poly(diallyldimethyl-ammoniumchloride) (PDADMAC) and any combinations thereof. In yet other embodiments, the at least one additional material is a metal oxide. In yet other embodiments, the metal oxide is selected from the group consisting of $SiO_2$, $TiO_2$, CaO, $Al_2O_3$, CuO, ZnO, FeO, MnO, NiO, BaO, SrO, and $Fe_2O_3$. In yet other embodiments, the at least one additional material is a pharmaceutical agent or drug. In yet other embodiments, the pharmaceutical agent or drug is at least one selected from, but not necessarily limited to, the group consisting of an antibiotic, a β-lactamase inhibitor. an anti-diabetic agent, and an anticancer agent. In yet other embodiments, the pharmaceutical agent or drug is an antibiotic selected from, but not necessarily limited to, the group consisting of rifampin, natural penicillins, β-lactamase-resistant antibiotics (e.g. meticillin, nafcillin, oxacillin, cloxacillin, dicloxacillin, and flucloxacillin), aminopenicillins (e.g. ampicillin, amoxicillin, pivampicillin, hetacillin, bacampicillin, metampicillin, talampicillin, and epicillin), carboxypenicillins (e.g. carbenicillin, ticarcillin, and temocillin), and ureidopenicillins (e.g. mezlocillin, and piperacillin). In yet other embodiments, the pharmaceutical agent or drug is a β-lactamase inhibitor selected from, but not necessarily limited to, the group consisting of clavulanic acid, sulbactam, and tazobactam. In yet other embodiments, the pharmaceutical agent or drug is an anti-diabetic medication selected from, but not necessarily limited to, the group consisting of insulins, biguanides (e.g. metformin, phenformin, and buformin), and thiazolidinediones (e.g. rosiglitazone, pioglitazone, and troglitazone). In yet other embodiments, the pharmaceutical agent or drug is an anticancer chemotherapy selected from, but not necessarily limited to, the group consisting of doxorubicin, cyclophosphamide, amsacrine, bleomycin, capecitabine, carmustine, docetaxel, eribulin, fluorouracil, gemcitabine, hydroxycarbamide, idarubicin, temozolomide, thiotepa, tioguanine, topotecan, trabectedin, treosulfan, vinblastine, and vinorelbine. In yet other embodiments, the at least one additional material is at least one carbon material. In yet other embodiments, the at least one carbon material is selected from the group consisting of graphene, carbon nanotubes, carbon nanofibers, and fullerenes. In yet other embodiments, the at least one additional material is at least on plasticizer. In yet other embodiments, the plasticizer is selected from the group consisting of sorbitan, sorbitan anhydrides, castor oil, mono-acetylated monoglycerides, di-acetylated monoglycerides, triacetin (glycerin triacetate), glycerol (glycerin), erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, polyvinyl alcohol, propylene glycol, triethyl citrate, tributyl citrate, acetyl triethyl citrate, acetyl tributyl citrate, n-butyryl tri-n-hexyl citrate, oleic acid, steric acid, polyethylene glycols, and any combinations thereof.

In certain embodiments, the protein fibers are not soluble in water or not appreciably soluble in water. In other embodiments, the protein fibers are not soluble in water without needing any additional treatment or manipulation. In certain embodiments, the protein fibers are biodegradable. In other embodiments, the protein fibers are biocompatible. In yet other embodiments, the protein fibers are antimicrobial. In certain embodiments, the protein fibers retain their natural conformation without being denatured.

In certain embodiments, the protein fibers comprise at least one pharmaceutical agent. In other embodiments, at least a portion of the protein fibers forms a coiled helical structure whereby at least a portion of the at least one pharmaceutical agent undergo a strong non-bonding interaction with the coiled helical structure. In other embodiments, the protein fibers release the at least one pharmaceutical agent at a slower rate than 2-D protein films made from the same proteins.

In certain embodiments, the protein fibers comprising the at least one pharmaceutical agent are formulated as part of a pharmaceutical composition further comprising at least one pharmaceutically acceptable carrier.

In certain embodiments, the protein fibers comprise at least one ceramic material, such as, but not limited to, $TiO_2$. In certain embodiments, the incorporation of the ceramic material imparts one or more properties to the protein fibers. In certain embodiments, the incorporation of the ceramic material imparts antimicrobial properties to the protein fibers. In other embodiments, the incorporation of the ceramic material alters at least one selected from the protein fiber's thermal, mechanical and hydrophobic properties, potentially by increasing crystallinity of the protein fibers. In yet other embodiments, incorporation of a photoactive ceramic material, such as $TiO_2$, allows the protein fibers to generate reactive oxygen species in the presence of UV light excitation and water.

In another aspect, the invention provides constructs and devices comprising the protein fibers of the invention.

In certain embodiments, the invention provides cell scaffolds comprising the protein fibers of the invention. In other embodiments, the cell scaffolds are capable of supporting and/or promoting the growth of cells. In yet other embodiments, the cell scaffolds are capable of supporting fibroblast cell proliferation.

In certain embodiments, the invention provides filters comprising the protein fibers of the invention. In other embodiments, the filters comprise protein fiber constructs that have been pressed flat. In yet other embodiments, the filters are capable of filtering at least a portion of particles having a particle size of about 0.3 μm to about 10 μm.

Treatment Methods

In another aspect, the invention provides methods of treating a disease or disorder in a subject in need thereof. In certain embodiments, the method comprises administering to the subject a therapeutically effective amount of a protein fiber composition of the invention comprising at least one pharmaceutical agent or drug.

In yet other embodiments, the pharmaceutical agent or drug is at least one selected from, but not necessarily limited to, the group consisting of an antibiotic, a β-lactamase inhibitor. an anti-diabetic agent, and an anticancer agent. In yet other embodiments, the pharmaceutical agent or drug is an antibiotic selected from, but not necessarily limited to, the group consisting of rifampin, natural penicillins, β-lactamase-resistant antibiotics (e.g. meticillin, nafcillin, oxacillin, cloxacillin, dicloxacillin, and flucloxacillin), aminopenicillins (e.g. ampicillin, amoxicillin, pivampicillin, hetacillin, bacampicillin, metampicillin, talampicillin, and epicillin), carboxypenicillins (e.g. carbenicillin, ticarcillin, and temocillin), and ureidopenicillins (e.g. mezlocillin, and piperacillin). In yet other embodiments, the pharmaceutical agent or drug is a β-lactamase inhibitor selected from, but not necessarily limited to, the group consisting of clavulanic acid, sulbactam, and tazobactam. In yet other embodiments, the pharmaceutical agent or drug is an anti-diabetic medication selected from, but not necessarily limited to, the group consisting of insulins, biguanides (e.g. metformin, phenformin, and buformin), and thiazolidinediones (e.g. rosiglitazone, pioglitazone, and troglitazone). In yet other embodiments, the pharmaceutical agent or drug is an anti-cancer chemotherapy selected from, but not necessarily limited to, the group consisting of doxorubicin, cyclophosphamide, amsacrine, bleomycin, capecitabine, carmustine, docetaxel, eribulin, fluorouracil, gemcitabine, hydroxycarbamide, idarubicin, temozolomide, thiotepa, tioguanine, topotecan, trabectedin, treosulfan, vinblastine, and vinorelbine. In certain embodiments, the method allows for a slower release profile of the pharmaceutical agent from the protein fibers than administration of the pharmaceutical agent in the absence of the protein fibers or as part of a 2-D protein film made from the same protein materials.

Definitions

As used herein, each of the following terms has the meaning associated with it in this section.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

Generally, the nomenclature used herein and the laboratory procedures in tissue engineering and biomaterial science are those well-known and commonly employed in the art.

As used herein, the articles "a" and "an" refer to one or to more than one (i.e., to at least one) of the grammatical object of the article. By way of example, "an element" means one element or more than one element.

As used herein, the term "about" is understood by persons of ordinary skill in the art and varies to some extent on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

As used herein, "biodegradable" means that the protein fibers can chemically break down or degrade within the body to form nontoxic components. The rate of degradation can be the same or different from the rate of drug release and can be different for each product formed via hydrolysis, enzymatic breakdown, or other forms of degradation.

A "disease" as used herein is a state of health of an animal wherein the animal cannot maintain homeostasis, and wherein if the disease is not ameliorated then the animal's health continues to deteriorate.

A "disorder" as used herein in an animal is a state of health in which the animal is able to maintain homeostasis, but in which the animal's state of health is less favorable than it would be in the absence of the disorder. Left untreated, a disorder does not necessarily cause a further decrease in the animal's state of health.

As used herein, a "microfiber" is a fiber having a diameter of less than about 10 μm.

As used herein, a "nanofiber" is a fiber having a diameter of less than about 100 nm.

The terms "patient," "subject" or "individual" are used interchangeably herein, and refer to any animal, or cells thereof whether in vitro or in situ, amenable to the methods described herein. In a non-limiting embodiment, the patient, subject or individual is a human.

As used herein, the term "pharmaceutically acceptable" refers to a material, such as a carrier or diluent, which does not abrogate the biological activity or properties of the compound, and is relatively non-toxic, i.e., the material may be administered to an individual without causing undesirable biological effects or interacting in a deleterious manner with any of the components of the composition in which it is contained.

As used herein, the term "pharmaceutically acceptable carrier" means a pharmaceutically acceptable material, composition or carrier, such as a liquid or solid filler, stabilizer, dispersing agent, suspending agent, diluent, excipient, thickening agent, solvent or encapsulating material, involved in carrying or transporting a compound useful within the invention within or to the patient such that it may perform its intended function. Typically, such constructs are carried or transported from one organ, or portion of the body, to another organ, or portion of the body. Each carrier must be "acceptable" in the sense of being compatible with the other ingredients of the formulation, including the compound useful within the invention, and not injurious to the patient. Some examples of materials that may serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; surface active agents; alginic acid; pyrogen-free water; isotonic saline; Ringer's solution; ethyl alcohol; phosphate buffer solutions; and other non-toxic compatible substances employed in pharmaceutical formulations.

As used herein, "pharmaceutically acceptable carrier" also includes any and all coatings, antibacterial and antifungal agents, and absorption delaying agents, and the like that are compatible with the activity of the compound useful within the invention, and are physiologically acceptable to the patient. Supplementary active compounds may also be incorporated into the compositions. The "pharmaceutically acceptable carrier" may further include a pharmaceutically acceptable salt of the compound useful within the invention. Other additional ingredients that may be included in the pharmaceutical compositions used in the practice of the invention are known in the art and described, for example in Remington's Pharmaceutical Sciences (Genaro, Ed., Mack Publishing Co., 1985, Easton, Pa.), which is incorporated herein by reference.

As used herein, the term "pharmaceutical composition" refers to a mixture of at least one compound useful within the invention with a pharmaceutically acceptable carrier. The pharmaceutical composition facilitates administration of the compound to a patient or subject. Multiple techniques of administering a compound exist in the art including, but not limited to, intravenous, oral, aerosol, parenteral, ophthalmic, nasal, pulmonary and topical administration.

A "therapeutic" treatment is a treatment administered to a subject who exhibits signs of pathology, for the purpose of diminishing or eliminating those signs.

As used herein, the term "treatment" or "treating" is defined as the application or administration of a therapeutic agent, i.e., a compound of the invention (alone or in combination with another pharmaceutical agent), to a patient, or application or administration of a therapeutic agent to an isolated tissue or cell line from a patient (e.g., for diagnosis or ex vivo applications), who has a condition contemplated herein, a symptom of a condition contemplated herein or the potential to develop a condition contemplated herein, with the purpose to cure, heal, alleviate, relieve, alter, remedy, ameliorate, improve or affect a condition contemplated herein, the symptoms of a condition contemplated herein or the potential to develop a condition contemplated herein. Such treatments may be specifically tailored or modified, based on knowledge obtained from the field of pharmacogenomics.

As used herein, the term "therapeutically effective amount" refers to an amount that is sufficient or effective to prevent or treat (delay or prevent the onset of, prevent the progression of, inhibit, decrease or reverse) a disease or condition described or contemplated herein, including alleviating symptoms of such disease or condition.

As used herein, the terms "% (w/v)" or "(w/v) %" refer to a percentage derived by dividing the mass of the polymer additive in grams (g) per 100 milliliters (mL) of solution. As used herein, these terms can converted to g/L by multiplying the "% (w/v)" by a factor of 10.

The following abbreviations are used herein: DSC, Differential Scanning calorimetry; FTIR, Fourier Transform Infrared Spectroscopy; PDMS, Polydimethylsiloxane; SEM, Scanning Electron Microscopy; TGA, Thermogravimetric analysis; TMDSC, Temperature-modulated differential scanning calorimetry.

It is to be understood that, wherever values and ranges are provided herein, the description in range format is merely for convenience and brevity and should not be construed as an inflexible limitation on the scope of the invention. Accordingly, all values and ranges encompassed by these values and ranges are meant to be encompassed within the scope of the present invention. Moreover, all values that fall within these ranges, as well as the upper or lower limits of a range of values, are also contemplated by the present application. The description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Materials and Methods

Purified zein protein powder was obtained from POET, LLC (Sioux Falls, S. Dak., USA) and filtered through a 0.45 μm nylon membrane to remove excess impurities once dissolved. ACS Grade 98% Formic Acid was purchased from EMD Millipore Corporation, ACS Grade Calcium Chloride Anhydrous was purchased from AMRESCO Inc., and both were used as purchased. Crystal violet, indigo carmine, alcian blue 8GX, rhodamine B, and rifampin were purchased from VWR International (Bridgeport, N.J., USA). 99.9% pure reagent grade Titanium Dioxide powder was purchased from Loudwolf Industrial and Scientific and used without further treatment. Bombyx Mori cocoons were obtained from China and boiled in a 0.02 M $NaHCO_3$ (Sigma Aldrich, USA) for 15 minutes to begin the degumming process. The sericin coating was then removed by washing the silk three times with deionized water. The remaining fibers were air dried overnight and then placed in a vacuum oven at room temperature for 24 hours to remove remaining moisture.

Corn Zein Nanofibers

Figure 8:
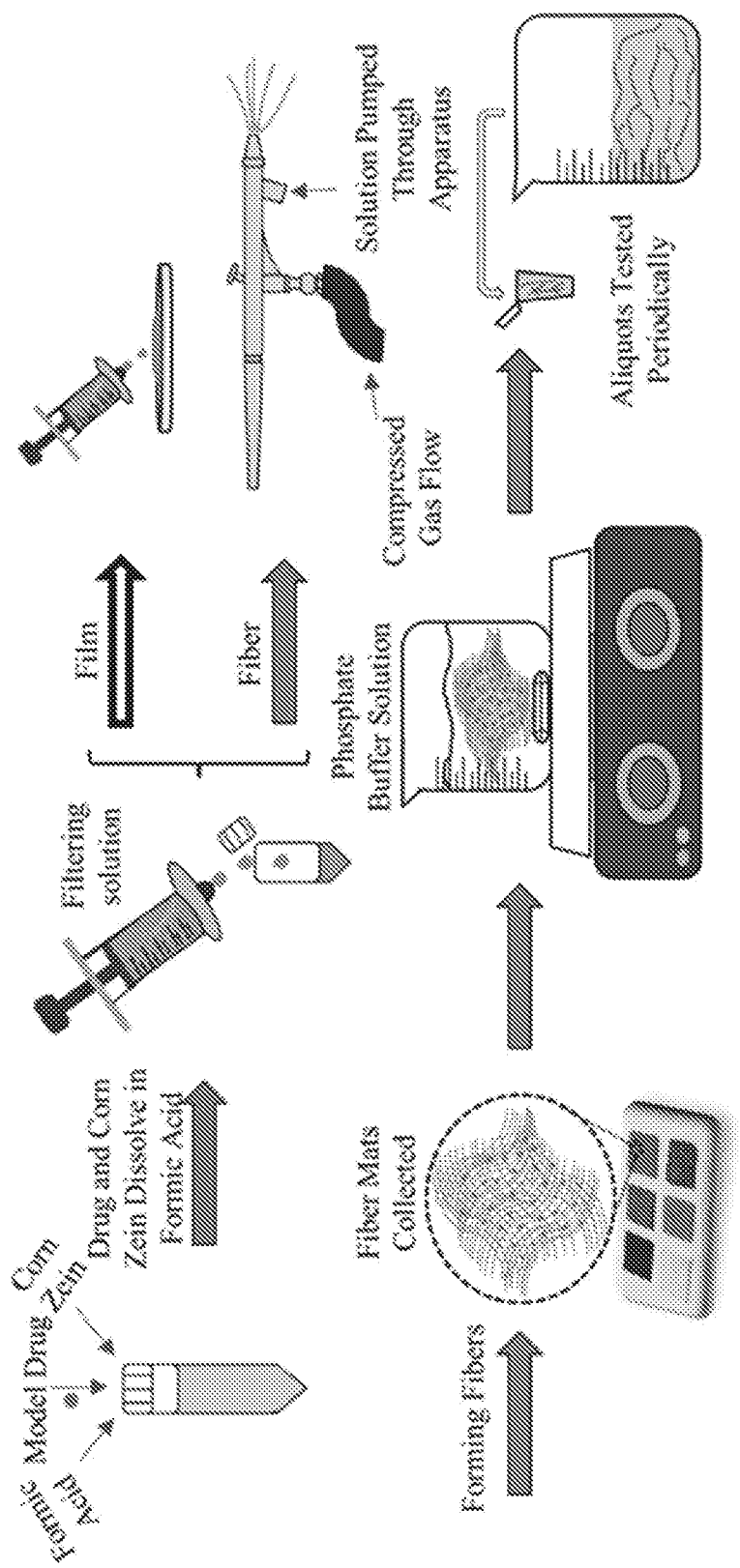
FIG. 8 is a schematic illustrating corn zein nanofiber and film synthesis and drug release study procedure, according to an embodiment of the invention.

Fabrication of corn zein nanofibers (FIG. 8) began by dissolving approximately 16 grams of corn zein protein in 30 mL of formic acid at room temperature. For samples containing model drugs, 0.4 g of drugs were dissolved in the formic acid prior to the addition of corn zein. After successful dissolution of zein protein, the solution was filtered through a syringe to remove any impurities and residual zein. The final filtered solution was then transferred to a syringe which was attached to a NEO BCN Siphon-Feed Dual-Action Airbrush. Compressed air was fed into the spray gun at a pressure of 100 psi and used to shear the zein solution to produce fibers. Fibers were collected on a box lined with aluminum foil that was approximately 1.7 m away from the sprayer and left to dry. Excess formic acid was evaporated by placing the fibers into a vacuum oven at 60° C. for 30 minutes. Absence of the C=O peak was observed in FTIR of all fiber samples, further suggesting that there was no residual formic acid left before the studies. Finally, fibers were characterized, and used for drug release studies.

Corn Zein Films

To study the effect of morphology on drug release kinetics, corn zein films were fabricated and compared to corn zein fibers. Corn zein-drug formic acid solutions were made by dissolving approximately 16 grams of corn zein protein in 30 mL of formic acid at room temperature. For samples containing model drugs, 0.4 g of drugs were dissolved in the formic acid prior to the addition of corn zein. After successful dissolution of zein protein, the solution was filtered through a syringe to remove any impurities and residual zein. Approximately 3 mL of solution was then poured into circular PDMS molds and left to sit at room temperature for two days. To remove excess formic acid, films were also placed in the vacuum oven at 60° C. for thirty minutes. Absence of the C=O peak is also observed in FTIR of all film samples, suggesting that no residual formic acid was left before the studies. Films containing each model drug were used for characterizations, as well as drug release studies.

SEM Characterization—Corn Zein Fibers

Scanning Electron Microscopy (SEM) was used to assess morphological characterization of the zein fibers and films. The experiments were performed using a Leo 1530 VP SEM (Germany), all the samples were sputter coated with gold for SEM imaging for 9 seconds. All figures were obtained with EHT at 5.00 kV.

Fourier Transform Infrared Spectrometry (FTIR)

A Bruker Tensor 27 Fourier Transform Infrared Spectrometer (FTIR), equipped with a deuterated triglycine sulfate detector and a multiple reflection, horizontal MIRacle ATR attachment (using a Ge crystal, from Pike Tech. (Madison, Wis.)) that was continuously purged with nitrogen gas was used. Readings were taken at a range of 4000 to 400 cm$^{-1}$ with 64 background scans and 64 sample scans at a of 4 cm$^{-1}$. For each fiber and film sample, four total measurements were taken to ensure homogeneity. However, only one spectrum is shown in this report to demonstrate the overall trend. Between samples, the ATR crystal was cleaned with methanol.

Differential Scanning calorimetry (DSC)

Data was collected using a TA Instruments (New Castle, Del.) Q100 DSC, with purged dry nitrogen gas flow (50 mL/min), equipped with a refrigerated cooling system. The instrument had been previously calibrated with indium for heat flow and temperature, and aluminum and sapphire reference standards were used to calibrate heat capacity. Samples were encapsulated in aluminum pans and heated in the DSC. Temperature-modulated differential scanning calorimetry (TMDSC) measurements were taken at a heating rate of 2° C./min with a modulation period of 60 s and temperature amplitude of 0.318° C., from −40° C. to 400° C.

Drug Release Studies

Approximately 0.05 g of film or fiber mesh was placed in 50 mL of 20 mM phosphate buffer (pH 7.0). Drug release was done in triplicate under conditions of dynamic flow. At the appropriate time points (15 minutes, 30 minutes, 1 hour, 2 hours, 3 hours, 4 hours, 5 hours, 24 hours, 48 hours, 96 hours), aliquots of solution were removed from the samples. The absorbance of each aliquot was measured at the appropriate wavelength for the corresponding model drug using a SpectraMax i3x Plate Reader (Molecular Devices LLC, Sunnyvale, Calif., USA). Absorbance was related to concentration and the values from the three aliquots were averaged and graphed as a function of time. Upon completion of the study, fibers were extracted from solution via suction filtration and dried overnight. Release profiles were then fit with the Krosmeyer-Peppas release model shown in equation 1:

$$\frac{M_t}{M_\infty} = K_{kp} t^n \quad (1)$$

Mori-TiO$_2$ Nanofibers

Figure 18:
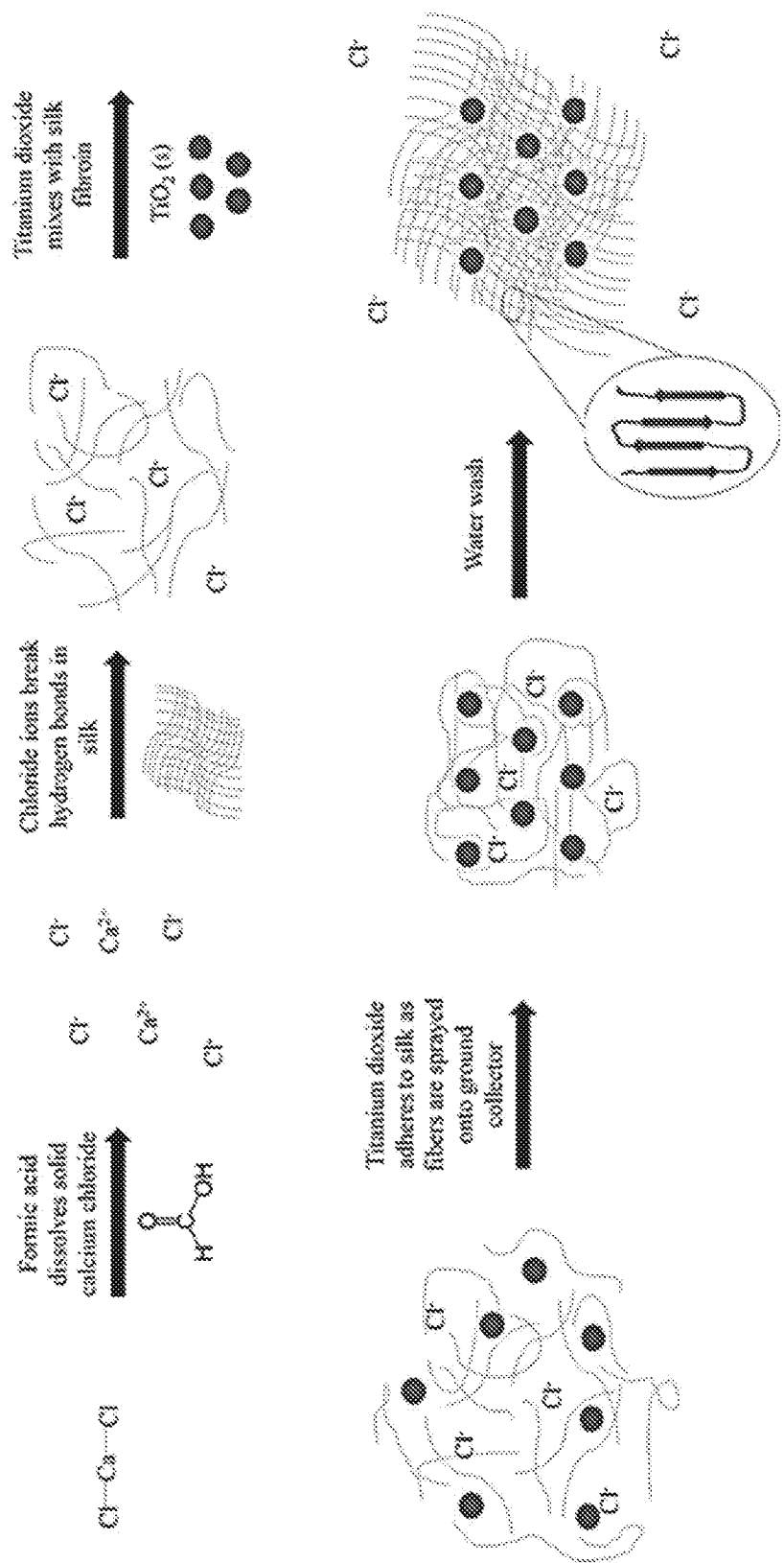
FIG. 18 is a scheme for the fabrication of silk-TiO$_2$ air-spinning fibers.

The procedure to fabricate silk-TiO$_2$ air-spinning fibers is shown in FIG. 18. First, approximately 0.9 grams of calcium chloride was dissolved in 30 mL of pure formic acid, and vortexed until dissolved. Between 5.4 and 7.2 grams of mori silk fibers was then dissolved in the calcium chloride solution to create a saturated solution. Without intending to be limited to any particular theory, the calcium chloride aided in breaking the hydrogen bonds within the amino acid sequence but could eventually degrade the bulk molecular structure of the silk fibroin if left long enough. Thus, the following procedure was completed in less than 30 minutes to ensure that the silk molecules retained their shape after the calcium chloride was later removed by water washing. Silk solution was filtered through a syringe to remove any impurities or undissolved silk. Various amounts of TiO$_2$ were then added to the filtered solution relative to the mass of silk in each solution to produce 0 wt %, 1 wt %, 2 wt %, 5 wt %, and 10 wt % silk-TiO$_2$ in solutions. For example, if 6 g of silk was dissolved in the formic acid, 0.06 g of TiO$_2$ would be used to make the 1% TiO$_2$ solution. The TiO$_2$ was then evenly dispersed using a probe-type sonicator. The TiO$_2$ could also be added to the calcium chloride-formic acid solution and dispersed through vortexing before the silk was added. However, the sonication method was shown to produce better fibers.

Figure 19:
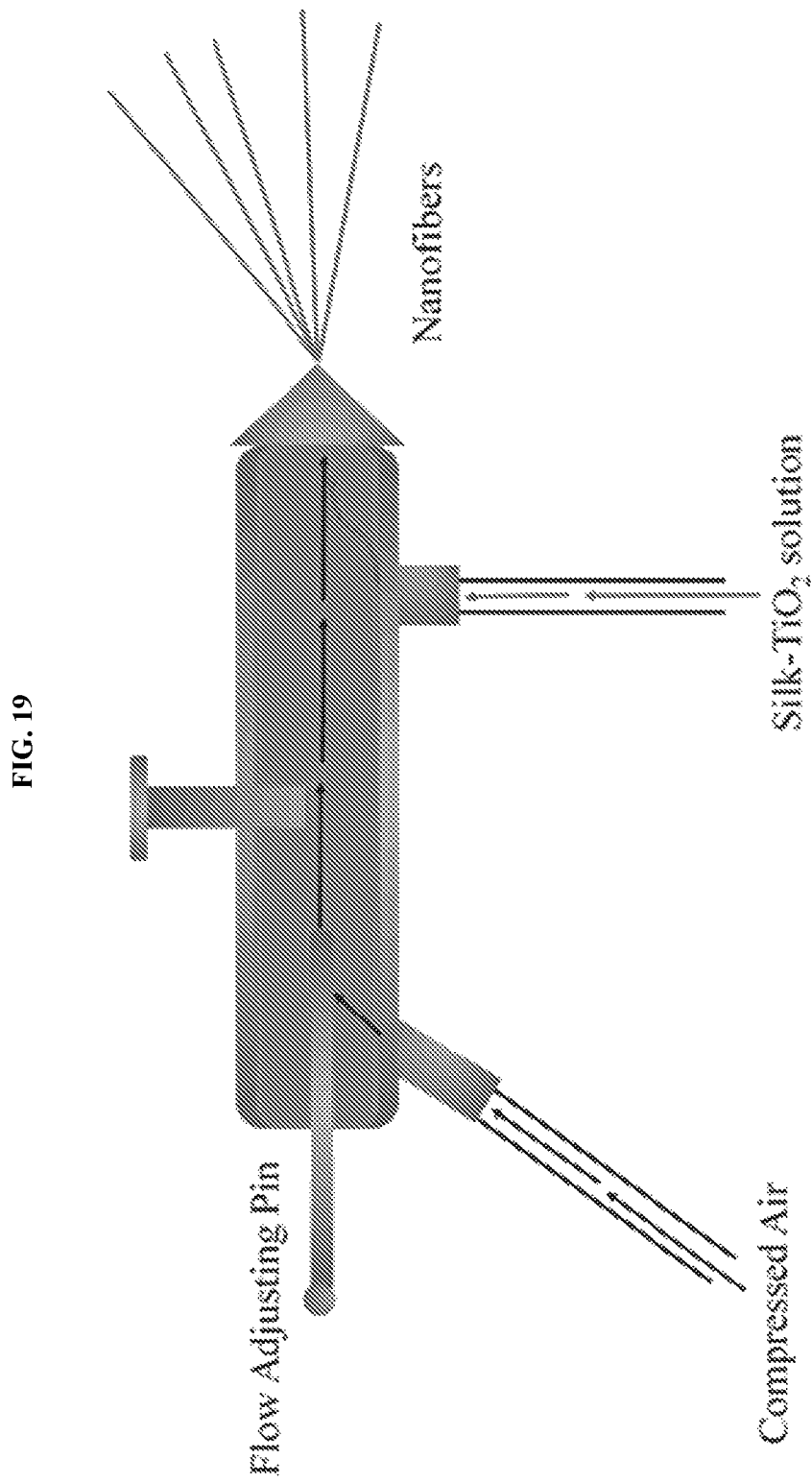
FIG. 19 is a diagram of an exemplary mechanism showing how air-jet spun fibers comprising TiO$_2$ can be generated. Compressed air and the TiO$_2$ doped silk solution are fed into the chamber of the gun. The compressed air then shears the silk solution and sprays nanofibers through the nozzle to be collected.

The final TiO$_2$ and mori silk solution was transferred to a syringe which was attached to a Central Pneumatic spray gun. Compressed air was fed into the spray gun at a pressure of 80 to 100 psi and the fibers were generated using the mechanism outlined in FIG. 19. Fibers were collected on a box lined with aluminum foil that was approximately 1.7 m away from the sprayer and left to dry. To remove calcium chloride, some fibers were washed in deionized water for approximately 10 minutes, and air dried overnight. To remove any remaining moisture, the fibers were placed in a desiccator for 48 hours, and finally characterized using SEM, FTIR, TGA, and DSC.

SEM Characterization—Silk-TiO$_2$ Fibers

Scanning Electron Microscopy (SEM) was used to assess morphological characterization of the samples. The experiments were performed using a Leo 1530 VP SEM (Germany), all the samples were sputtered coated with gold for SEM imaging. All figures were obtained with EHT at 3.00 kV.

Thermal Gravimetric Analysis (TGA)

The degradation of nanofibers was monitored using a Pyris 1 Thermogravimetric Analyzer with a nitrogen gas flow rate of 50 mL/min. Changes in mass were recorded over a temperature range of 25° C. to 500° C. at a rate of 5° C./min.

Biocompatibility Study

HEK293 (Human embryonic kidney) cells from ATCC (American Type Culture Collection) were grown in Dulbecco's modified Eagle's medium (HyClone, with 4.00 mM L-Glutamine and 4500 mg/L Glucose), supplemented with 10% fetal bovine serum (Life Technologies Inc.) and 100 U/mL Penicillin-Streptomycin (Thermo Fisher Scientific Inc., USA), in an atmosphere of 95% air, 5% carbon dioxide (CO$_2$), at 37° C. Cell culture was carried out according to NIH standard protocols. Equal number of cells was seeded on different silk-TiO$_2$ fiber mat samples as well as two control samples (commercial silk textile cloths and blank substrates). Cell numbers were acquired 72 hours after seeding using a 3-[4,5-dimethylthiazole-2-yl]-2,5-diphenyltetrazolium bromide (MTT) assay.

Air Filtration Particle Measurement

The filtering ability of the composite nanofiber materials were quantified using a VPC300 Video Particle Counter with built-in Camera from EXTECH Instruments (Townsend, N.H.). To fit on the attached air flow tube from the particle counter, samples were first pressed flat using a flat metal object with 5 kg weight. Flat samples were placed laterally on the detector surface and secured by the isokinetic probe. P article size, ranging from 0.3 to 10 microns, and particle count for each respective size were recorded. Each test was 1 minute or 100 minutes in duration with a flow rate of 2.83 L/min, and measurements were taken in triplicate and averaged. Measurements were also conducted with commercial filters from two types of 3M™ N95 face masks. 3M 8511 NIOSH filters and 3M Aura 9211+NIOSH filters were removed from face masks and adhered to the probe. Measurements were performed with the same parameters as test samples. Particle filtration of samples were referenced with surrounding atmosphere at 25° C. during each test.

Example 1: Air Spun Nanofiber Preparation Methods

Nanofibers of the invention were prepared by first degumming, purifying and washing the raw protein fiber materials. The purified protein fibers were then directly added to a solution of formic acid containing calcium chloride (0-20 wt %). The formic acid solution was then shaken for several minutes to completely dissolve the protein fibers. Protein saturation concentration and optimal shaking times are reported in Table 1. The solutions were then left to stand for a period of time (Table 1). Impurities were removed from the protein fiber in formic acid solutions by centrifuging at 8000 rpm for 10 minutes. Alternatively or optionally additionally, impurities were removed by filtering the solutions through a 0.45 µm filter. The solutions were then added to an airbrushing apparatus as depicted in FIG. 1 equipped with a nozzle size of 0.35 mm and air outlet size of ⅛"-27 NPS. The temperature of the silk solution was kept at room temperature (~25° C.) and the compressed air was not heated. The solution was sprayed and the obtained non-woven fiber material was found to be rigid with an average fiber diameter of about 100 µm to about 200 µm. Airflow was controlled via the pressure regulator on the air compressor and a manometer finger level pressure regulator. A compressed air pressure of approximately 10-150 PSI was used to form the fibers.

TABLE 1

Content, shaking time and standing time of proteins.

| Sample | Content of $CaCl_2$ (g ml$^{-1}$) | Shaking Time (min.) | Standing Time (min.) |
|---|---|---|---|
| Mori | 0.15 | >1 | >2 |
| Thai | 0.15 | >1 | >2 |
| Zein | 0 | >1 | >2 |

Figure 2:
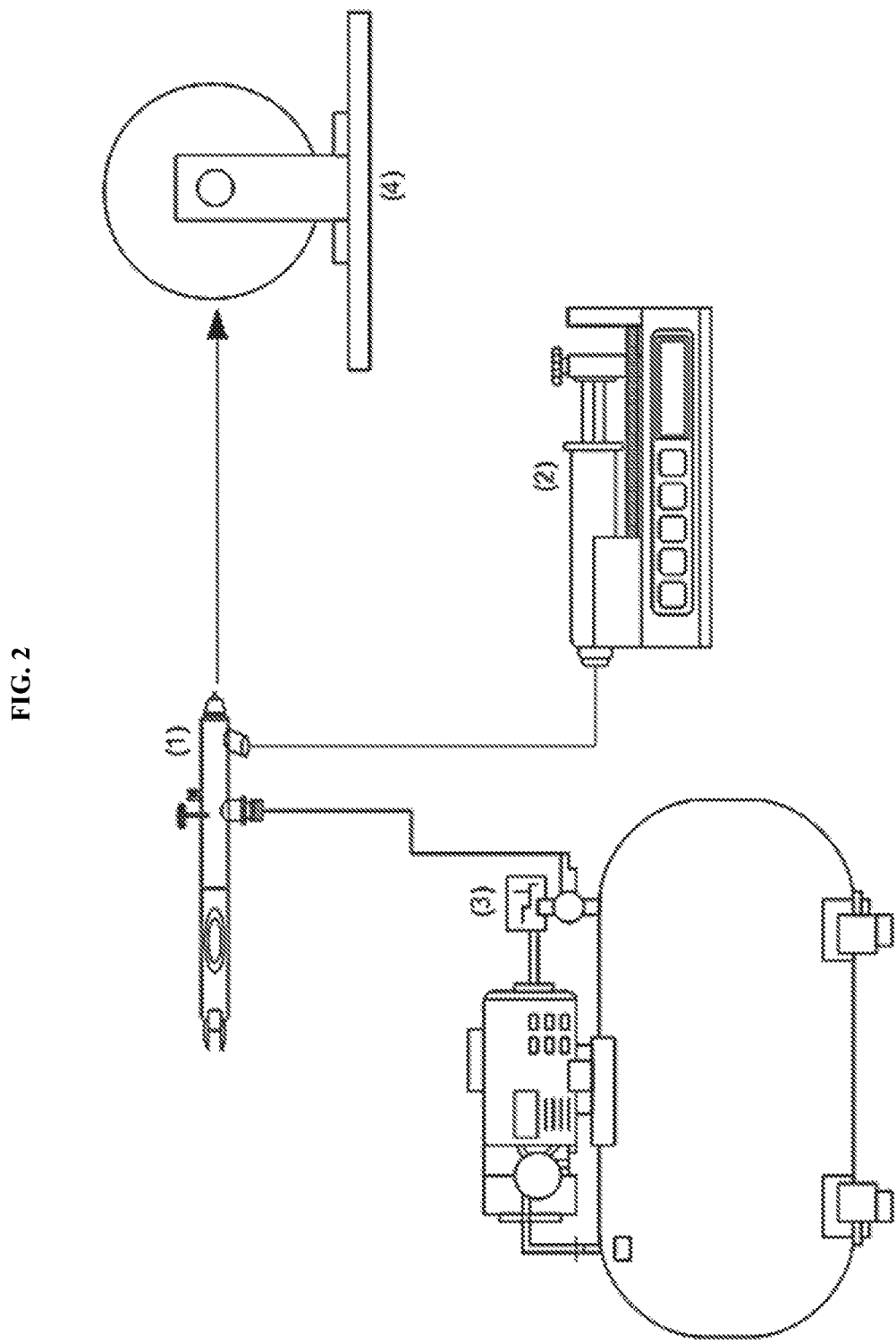
FIG. 2 is a diagram of a solution-spinning setup: (1) nozzle and cone; (2) injection pump with syringe and blowing medium; (3) compressor and pressure gauge; and (4) rotating drum collector.
Figure 3:
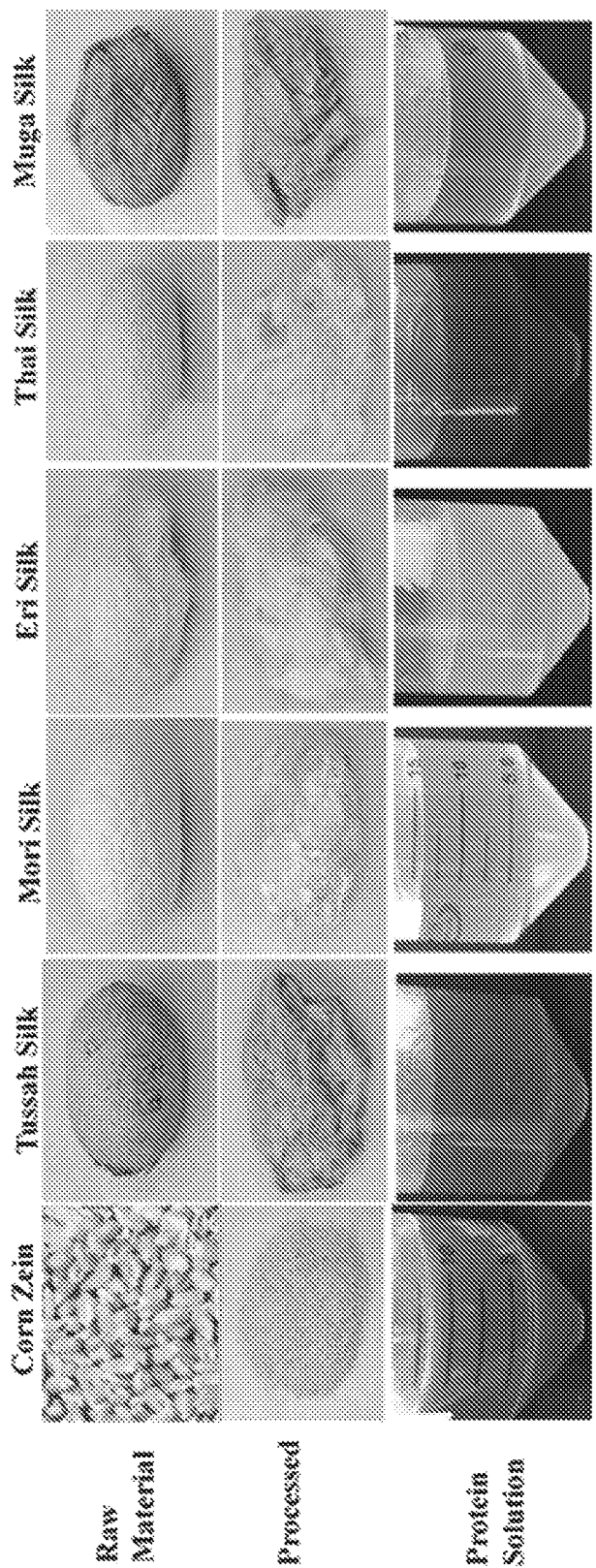
FIG. 3 is a set of photographs depicting the appearance and shape of proteins at different stages: raw materials (Corn, Tussah cocoons, Mori cocoons, Eri cocoons, Thai cocoons, Muga cocoons), prepared corn zein powders or silk fibroin degummed fibers (after removal of the glue-like sericin proteins), and zein/silk fibroin solutions (top to bottom).
Figure 4A:
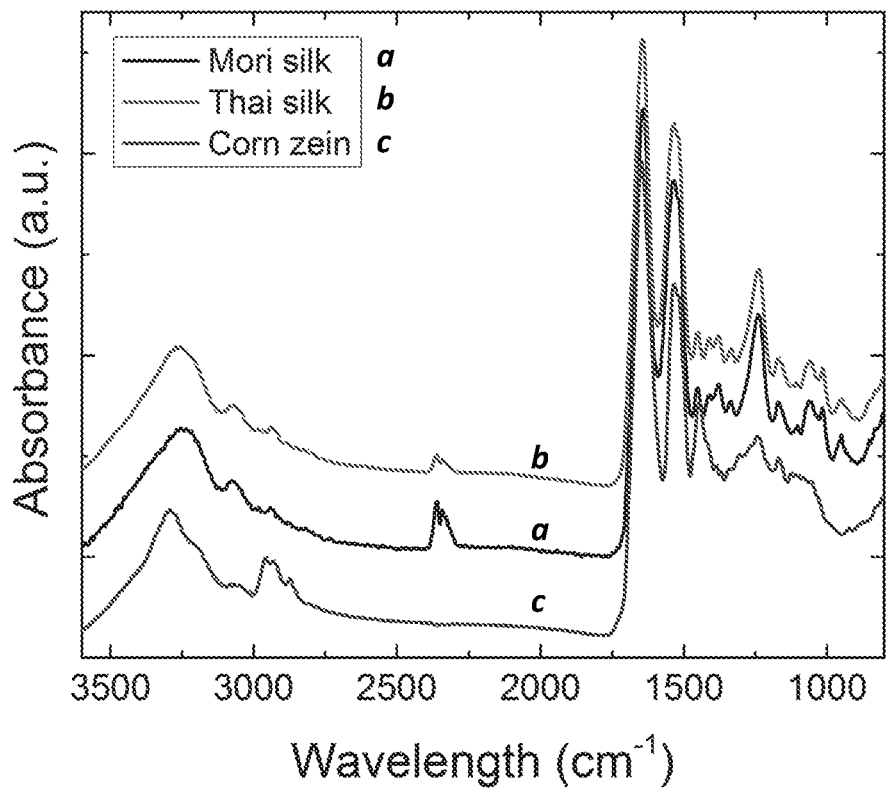
FIGS. 4A-4B are graphs showing FTIR absorbance spectra of different protein micro-/nanofiber samples (Mori, Thai silks, and Corn zein) fabricated through randomly blow spun protein (FIG. 4A) or aligned blow spun protein (FIG. 4B). Spectra were collected in the region of 1400-1800 $cm^{-1}$.
Figure 4B:
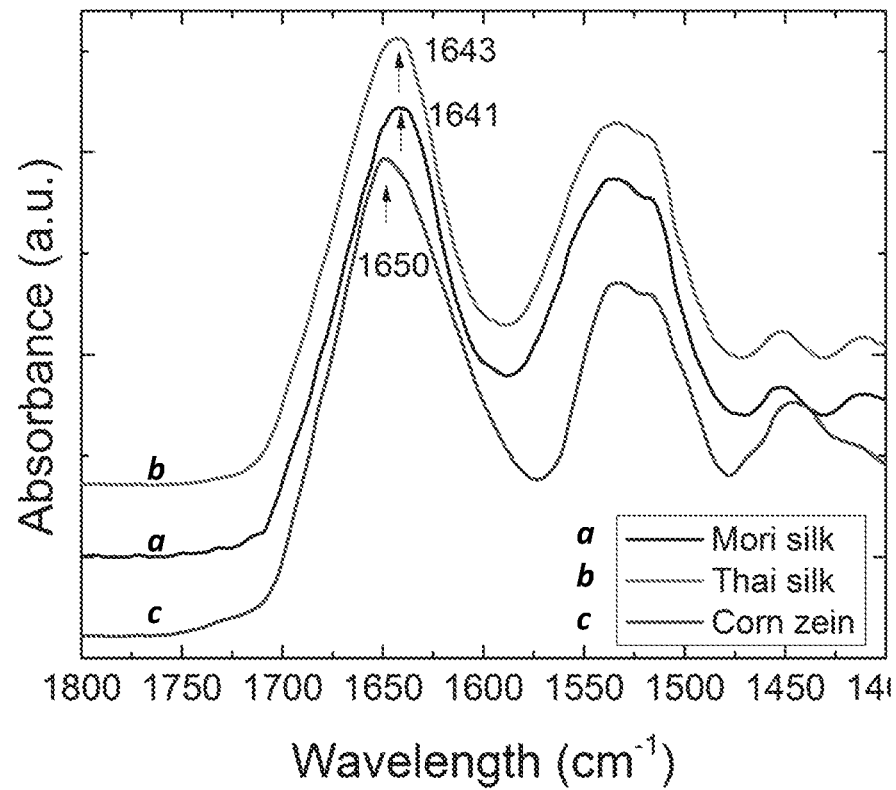

FIG. 1 depicts a diagram of a commercial airbrush suitable for use as a blow spinning platform in accordance with exemplary embodiments of the invention. FIG. 2 shows a schematic of an airbrush including a polymer solution reservoir, a pump with controllable injection rate and an inlet for connecting a compressed gas source. A fibrous non-woven structure was obtained when the collecting device was held in a position ranging from parallel to a 45° angle to the fiber extruding direction. It was found that a non-woven mat could be collected by rotating a cylinder, using it as a collecting device (FIG. 1). When a constant rate of motion and fiber output was maintained, a non-woven mat with a uniform appearance was created.

The blown fibers collected on the collecting device exhibited extremely good flexibility and were amenable for additional industrial processin. The fiber samples were dried at room temperature overnight or in a 37° C. oven overnight. Overall, the protein fiber products of the invention demonstrated a number of desirable qualities as compared to fibers produced through electrospinning methods known in the art. These qualities are summarized in Table 2.

TABLE 2

Comparisons of protein nanofibers fabricated from the presented method and the electrospinning method.

| Fiber Property | New: Formic Acid + $CaCl_2$ based air-spun micro-/nanofibers | Old: Electrospinning based micro-/nanofibers |
|---|---|---|
| Time to make 10 g fiber mat | 15 mins | >2 h |
| Processing Cost | (Very Low) Requires an air compressor, formic acid and $CaCl_2$ | (High) Requires high voltage electricity, safety precautions, optionally oven and dialysis system (dialysis tubes, pH solutions, and so forth) are needed for at least 3 days |
| Water Solubility | Mostly water insoluble | Water soluble without additional treatment |
| Enzyme Degradability | Stable in Protease XIV enzyme for an extended period of time | Quickly degraded in specific enzymes (e.g. Protease XIV) |

The blow spun method of protein fiber fabrication from formic acid-$CaCl_2$ solution was mechanistically studied, and the structural properties, thermal properties and stability of the protein micro-/nanofibers were also investigated (FIGS. 3-6). FTIR results (FIG. 4) showed that the secondary structural configurations of protein micro-/nanofibers cast from formic acid-$CaCl_2$ solutions were different from their natural conformations. After being blown under 10-150 psi through a nozzle, the content of the beta-sheet for all silk samples was much lower than their natural silk fibers, indicating that a less ordered structure was formed, such as insoluble coiled-coils or helix structures (FIG. 4, features centered around 1640~1650 cm$^{-1}$). It was also shown that the methods of the invention helped proteins retain part of their β-sheet structures (FIG. 4, features centered between 1621~1639 cm$^{-1}$) when dissolving raw fibers, which caused the micro-/nanofibers to be water insoluble after casting.

Figure 5A:
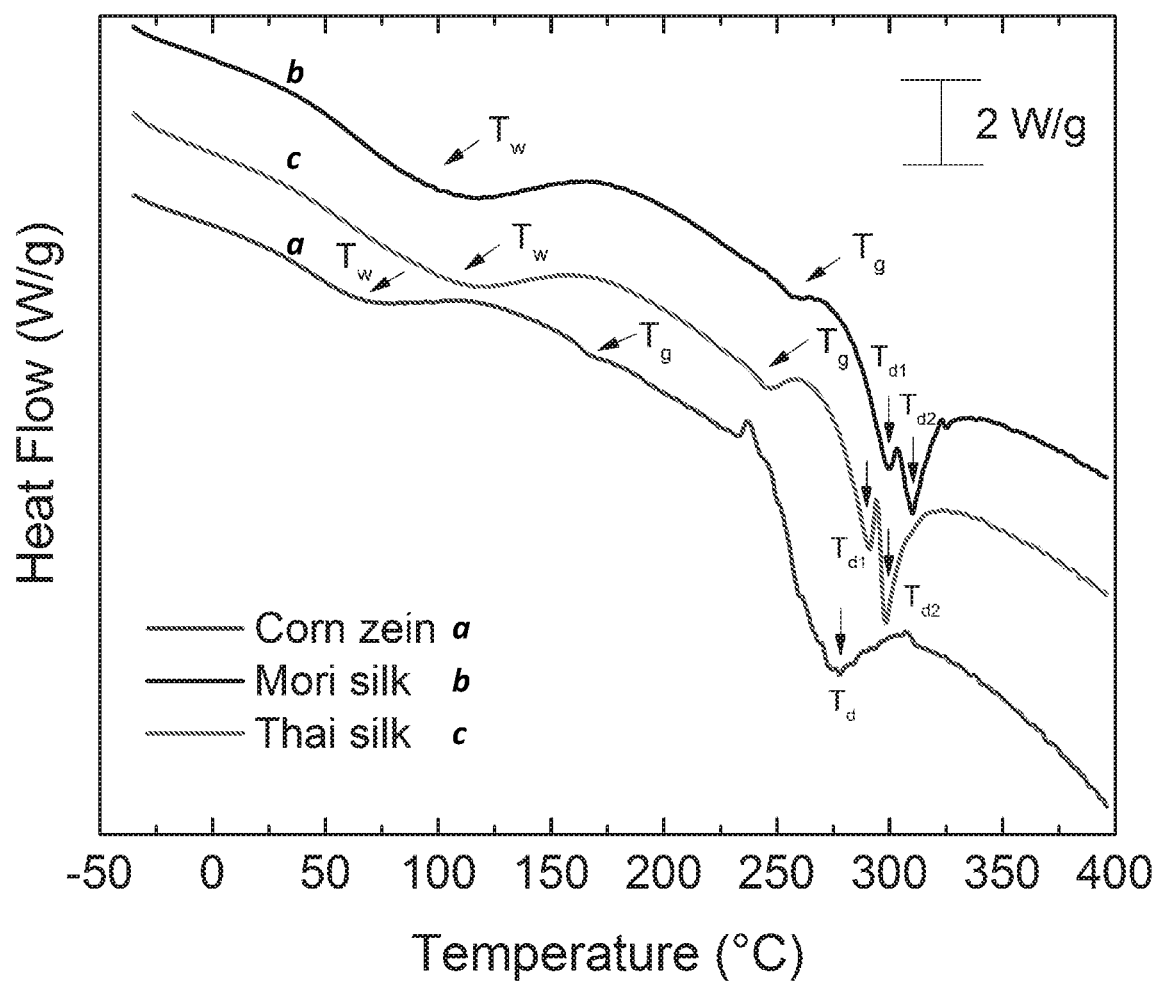
FIGS. 5A-5B are graphs illustrating physical properties of certain samples of the invention.
Figure 5B:
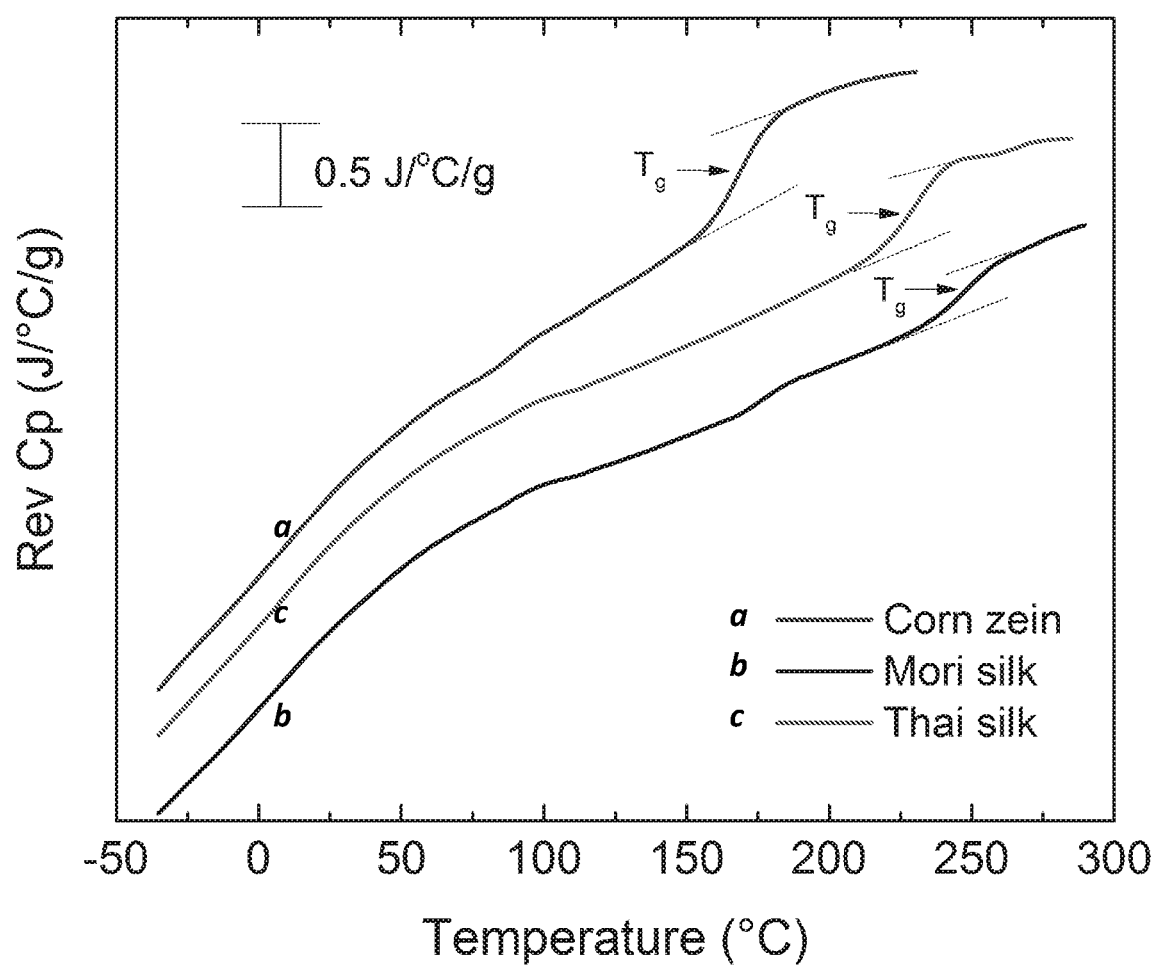
Figure 6:
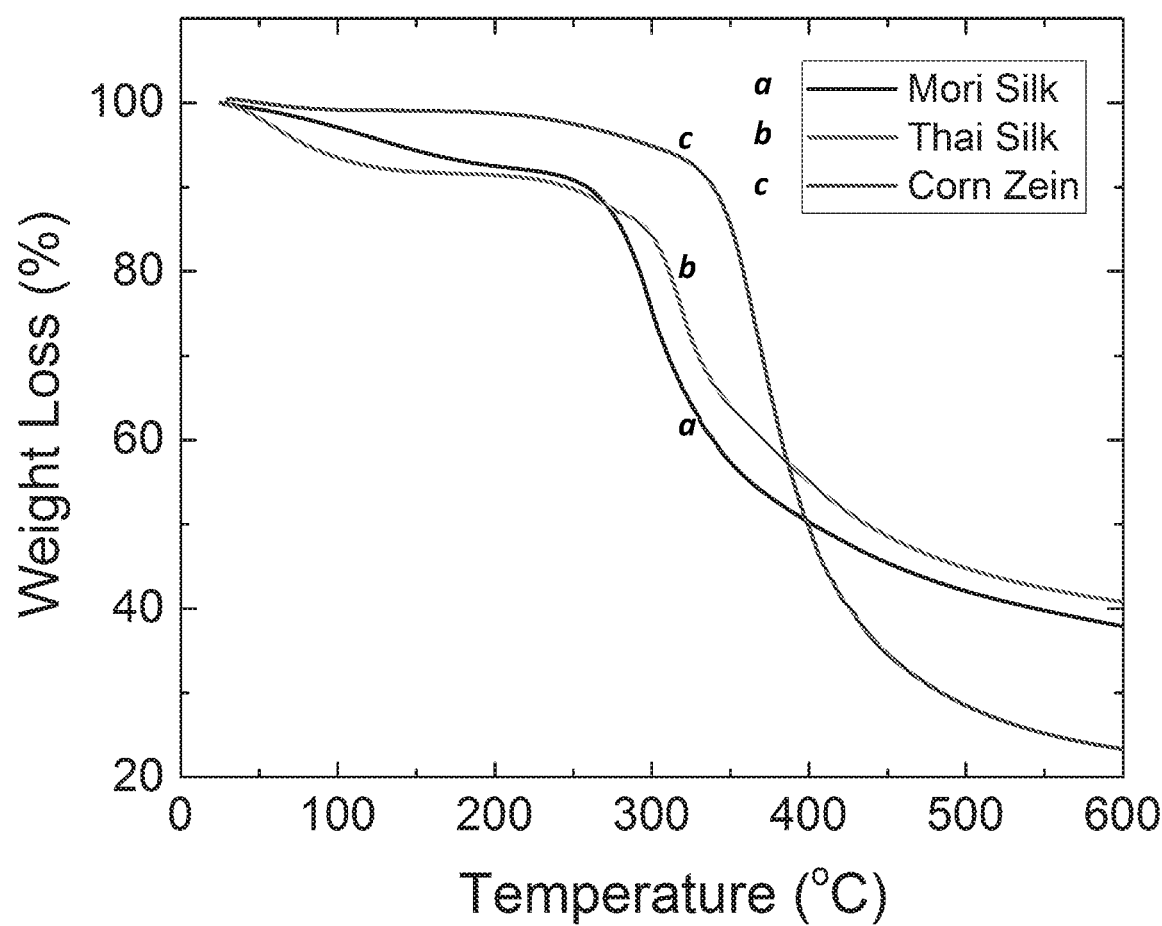
FIG. 6 is a graph illustrating thermogravimetric analysis (TGA) scans of different protein micro-/nanofibers samples. The samples were heated at 5° C. min$^{-1}$ from 25° C. to 600° C.

Differential scanning calorimetry results are shown in FIG. 5, and Table 3. Glass transition temperatures ($T_g$), solvent release temperatures ($T_w$) and the degradation temperatures ($T_d$) of three protein air-spun fiber samples were measured. It was found that the glass transition temperature $T_g$ significantly changed to a higher temperature after blowing, compared with solution cast films without blowing (e.g. $T_g$ of Mori silk fibroin increased from 178° C. for films to 246° C. for air spun fibers). Table 3 also compares thermal data of different protein micro-/nanofibers produced by the method of the invention. The method of the invention produced more stable micro-/nanofibers with higher glass transition and degradation temperatures, compared with their solution-cast film analogs.

TABLE 3

Thermal data of different protein micro-/nanofibers produced by the methods of the invention.

| Protein Sample | $T_g/°$ C. | Solvent release $T_w/°$ C. | Degradation $T_d$ $(T_{d1}/T_{d2})/°$ C. |
|---|---|---|---|
| Mori | 246.5 | 114.2 | 299.7/310.4 |
| Thai | 228.5 | 116.3 | 290.7/297.8 |
| Zein | 169.1 | 70.6 | 276.4 |

Figure 7:
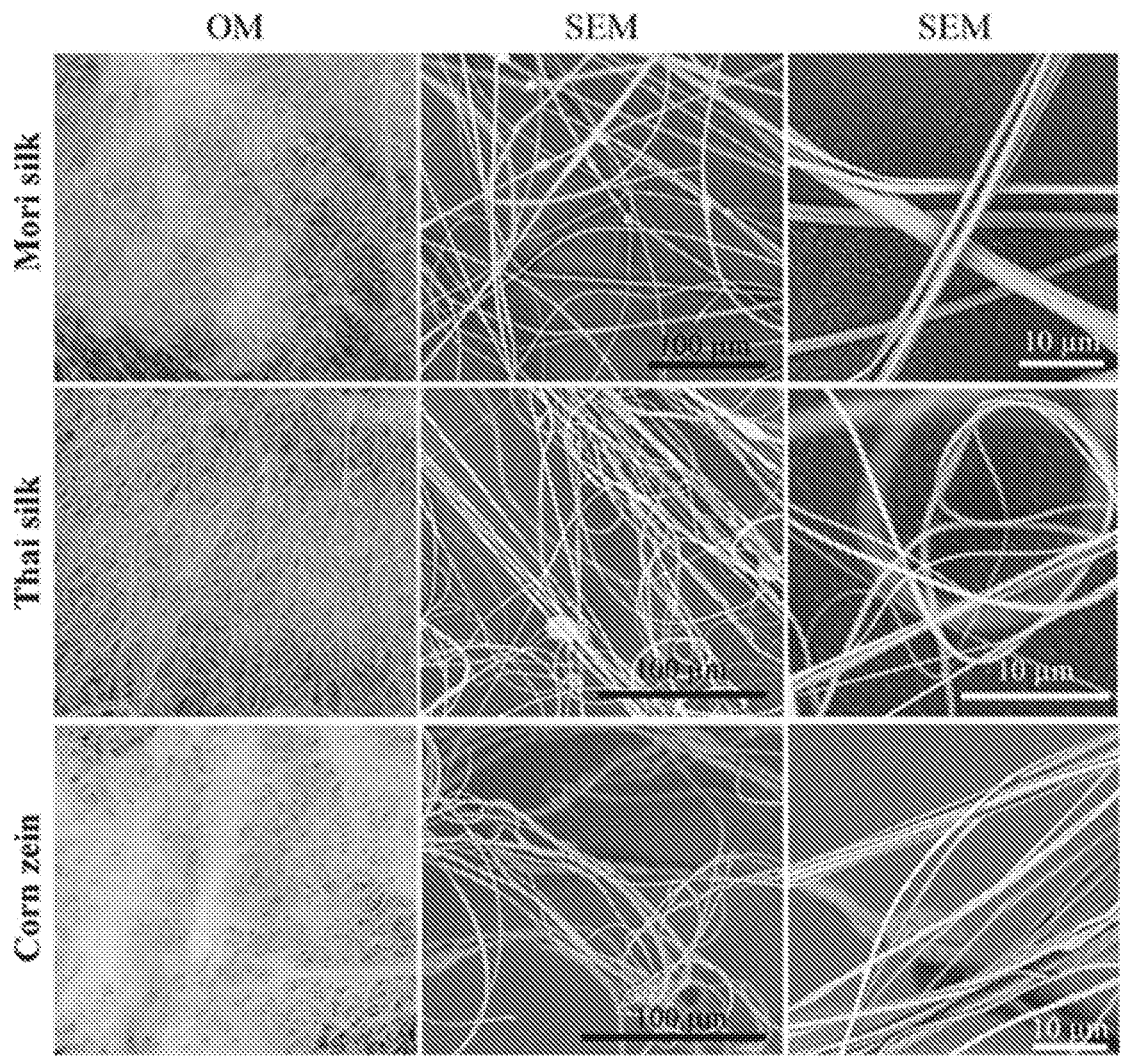
FIG. 7 is a set of photographs and SEM images of Mori silk, Thai silk and Corn zein micro-/nanofibers made by a method of the invention.

Protein samples were also spun and collected for Scanning Electron Microscopy (SEM) analysis (FIG. 7). SEM samples were coated by gold sputtering for 8 s and analyzed for fiber morphology using a Phenom Scanning Electron Microscope (Model Pure) operated at a voltage of 5 kV. Fiber thickness was measured on SEM images using specialized software (MeasureIT). Some protein nanofibers were found to be entangled together, becoming a larger bundle of protein fibers, potentially due to the electrostatic interactions between nanofibers during the spinning procedure.

Example 2: Structural Characterization of Corn Zein Nanofibers Comprising Drugs

Figure 9A:
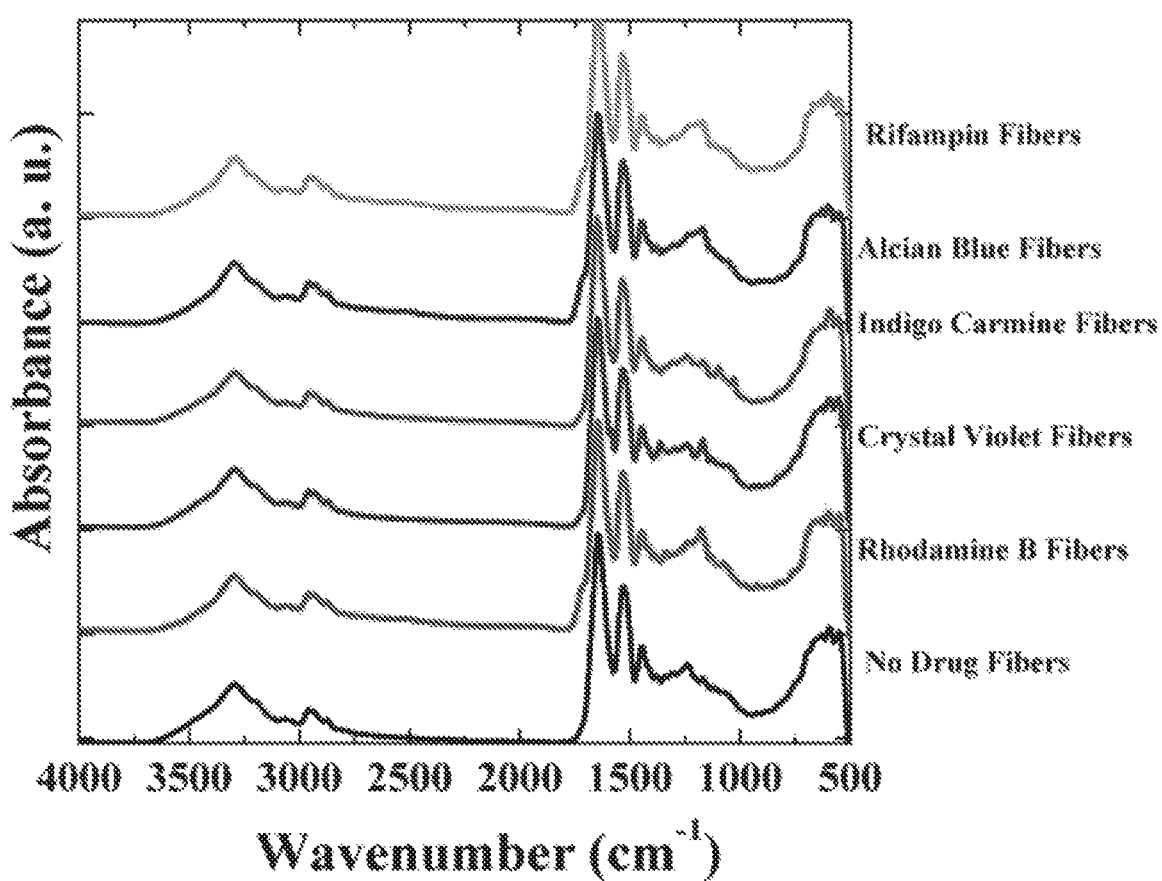
FIGS. 9A-9C are a set of FTIR spectra for corn zein nanofibers with and without different model drugs incorporated into the fiber materials.
Figure 9B:
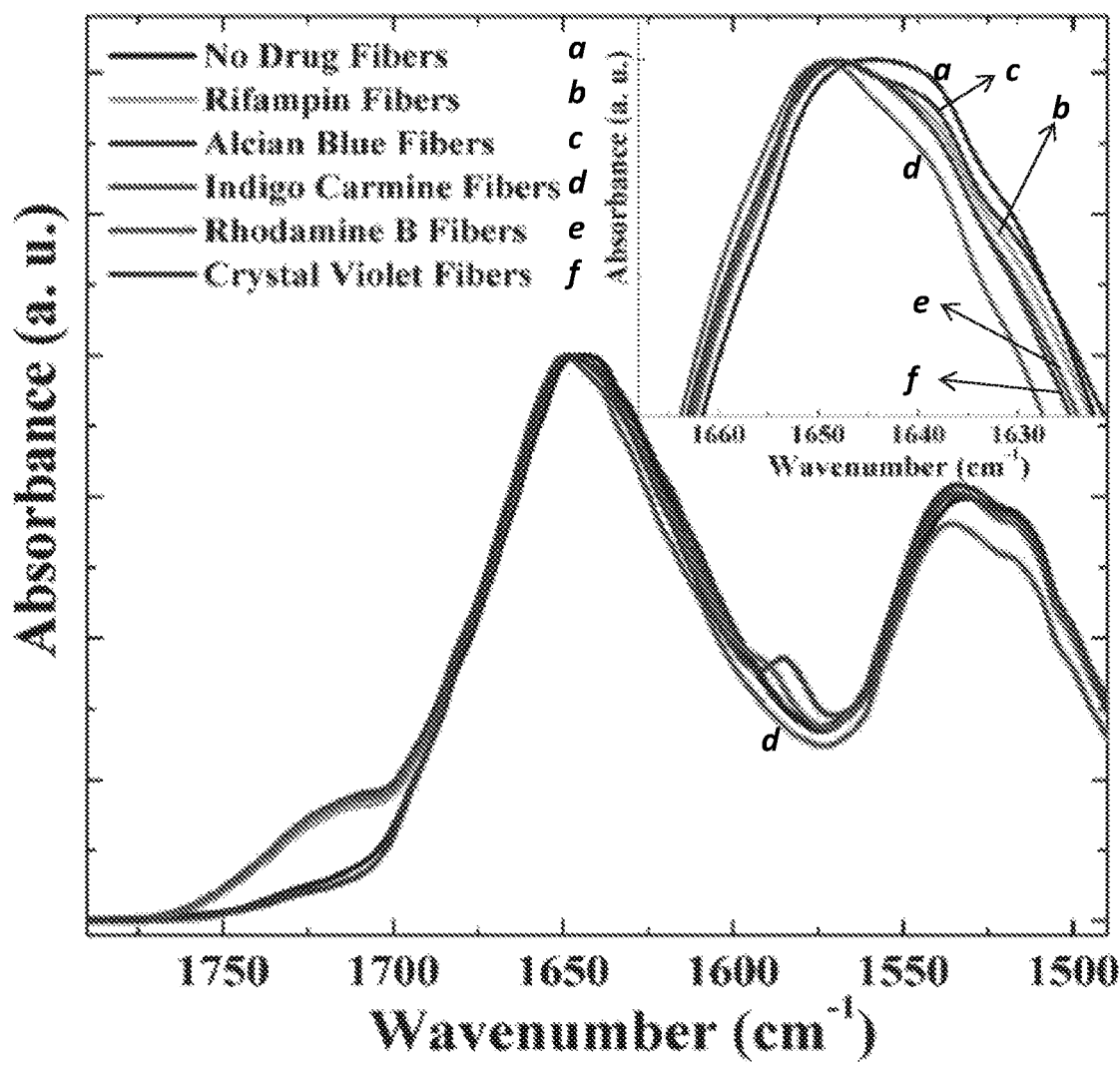
Figure 9C:
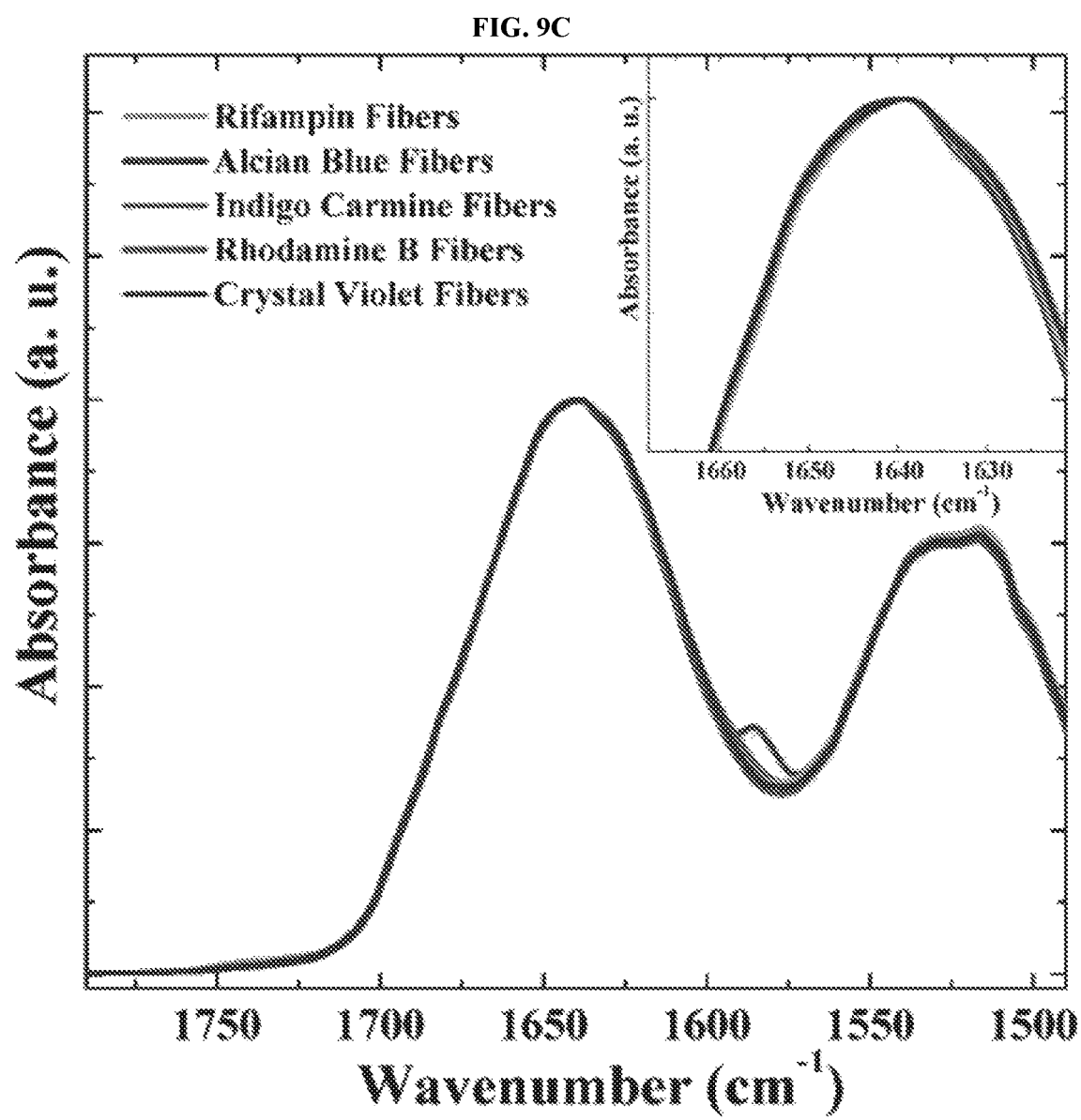

To assess the structural properties of the corn zein nanofibers, samples with and without model drugs were first characterized with FTIR. FIG. 9A shows the complete absorbance spectrum of samples before drug release. To analyze the secondary structure of the corn zein protein more closely, the Amide I and II regions are highlighted in FIG. 9B. Prior to the addition of model drugs, the Amide I peak is localized at 1640 cm$^{-1}$ suggesting an insoluble network dominated by random coils. Upon addition of model drugs, the Amide I peak shifts left suggesting a transition to a more alpha helical structure. For the crystal violet and rhodamine B samples, a shoulder at 1585 cm$^{-1}$ and 1560 cm$^{-1}$ can be seen. These peaks can be attributed to the corresponding model drugs. All samples excluding fibers containing no drug or crystal violet also exhibit a small shoulder localized at 1720 cm$^{-1}$, most likely originating from the C=O stretching of residual formic acid. These assertions are further corroborated by the spectrum shown in FIG. 9C for fibers after drug release. A shift back to the original 1640 cm$^{-1}$ localization of the Amide I region is observed for all fiber samples once the drug is removed. This suggests that the model drug molecules may be pushing the random coil structure of the corn zein into alpha helices. Upon removal of the drug, corn zein again completely adopts it native coil-dominated structure, illustrating a fully controllable transition overall. Reduction in the rhodamine B and crystal violet peaks is also evident, suggesting that the majority of the drug was released. In this instance, the corn zein fibers are behaving like carriers for the model drugs. This is an ideal characteristic for drug delivery vehicles since the drug does not permanently bind to the protein and can be released completely.

Figure 10A:
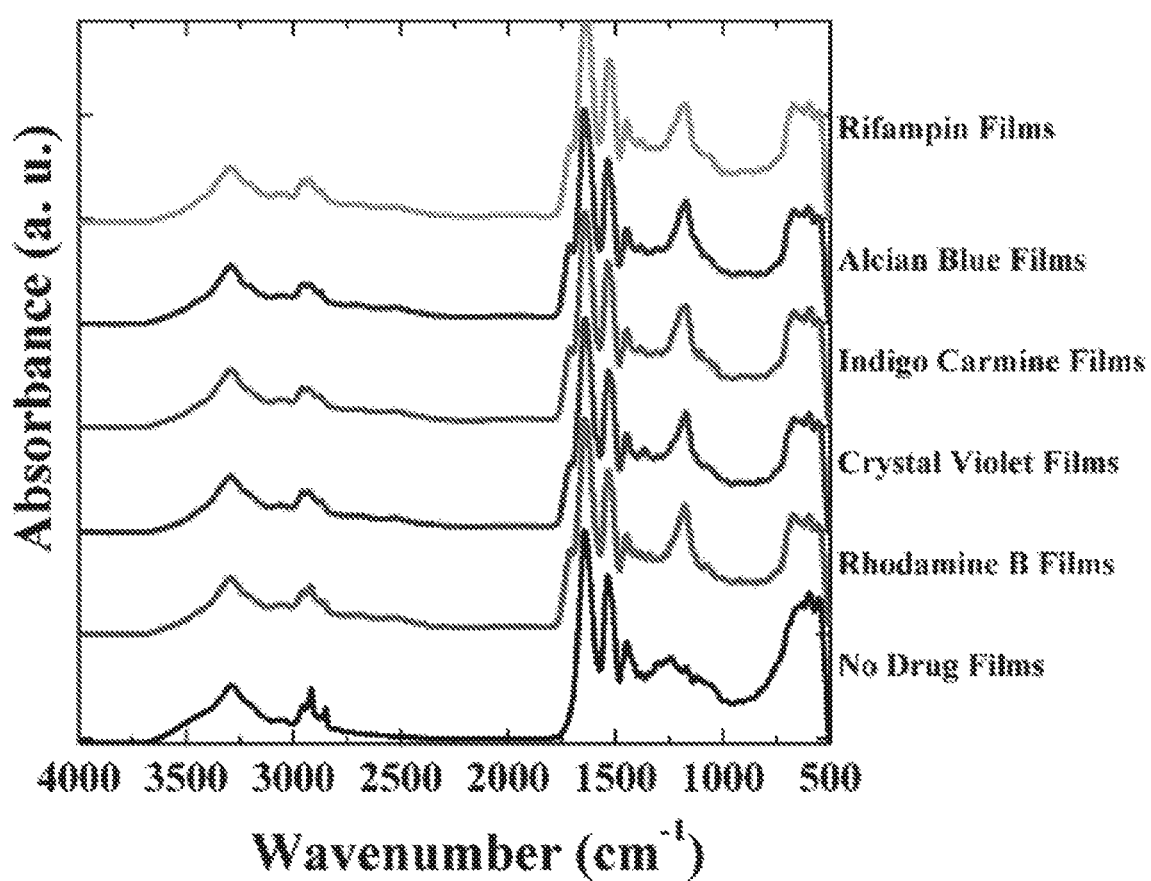
FIGS. 10A-10C are a set of FTIR spectra for corn zein films with and without model drugs. The region containing the amide I and II peaks (1800 cm$^{-1}$ to about 1500 cm$^{-1}$) has been enhanced in FIG. 10B. With the exception of alcian blue (largest drug tested), no strong structural transition is seen. After release, films maintain their random coil network with some variety as seen in FIG. 10C.
Figure 10B:
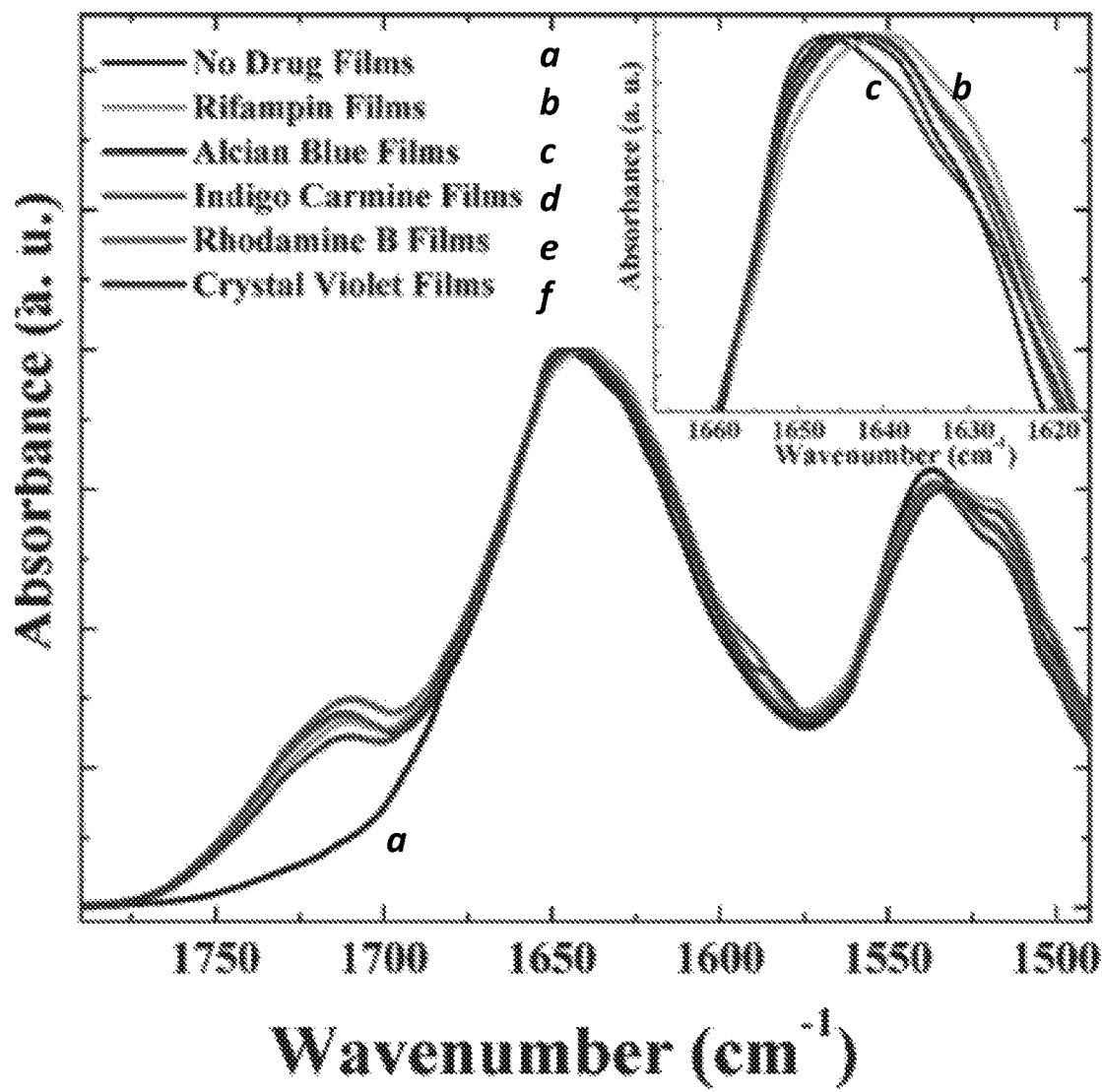
Figure 10C:
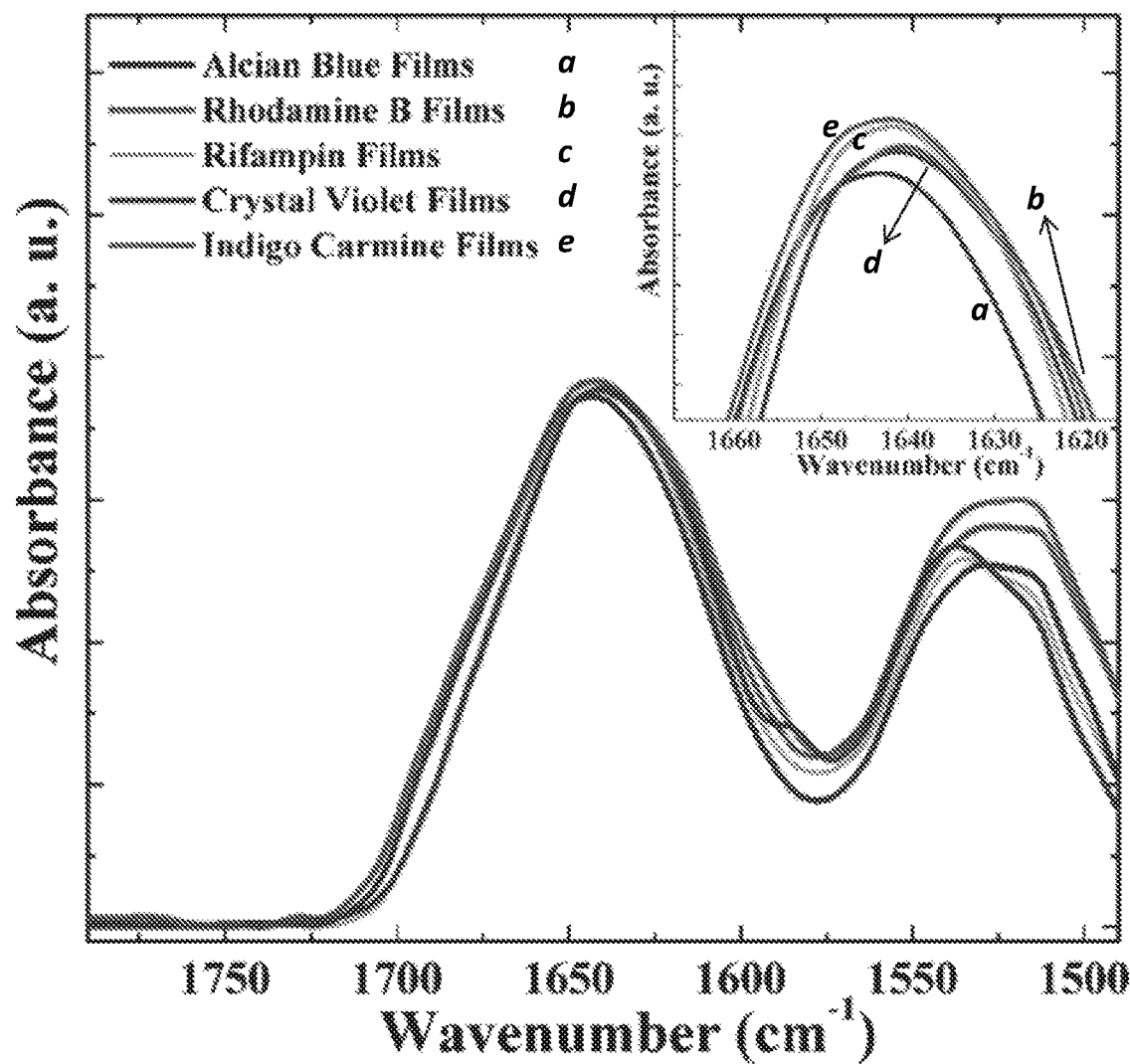

FIGS. 10A-10B show the complete and Amide I and II spectra of the corn zein films prior to drug release. Compared to the fiber samples studied in FIG. 9B, the corn zein films appeared to retain their random coil structure upon the addition of model drugs. During the creation of films, corn zein was dissolved in formic acid and then poured into PDMS molds to set. In this instance, the corn zein was exposed to formic acid for a longer period of time than it was during fiber generation. Without intending to be limited to any particular theory, it is possible that during this time, the formic acid was able to sever some of the hydrogen bonds of the corn zein structure, allowing the integration of the model drug molecules. Thus, the addition of drugs did not compress the corn zein towards a more alpha helical structure for the films. An exception to this was films containing alcian blue and rifampin. As seen in FIG. 10B, alcian blue films experienced a similar shift to 1648 cm$^{-1}$. Alcian blue, with a molecular weight of 1.3 kDa was the largest model drug tested. This drug was most likely too large to integrate into the corn zein structure and still pushed the protein towards an alpha helical structure. Upon release of drug from the films, a majority of the random coil network was maintained but with slight structural change, illustrating an uncontrollable transition due to the protein-drug interactions.

Example 3: Thermal Characterization of Corn Zein Nanofibers Comprising Drugs

Figure 11A:
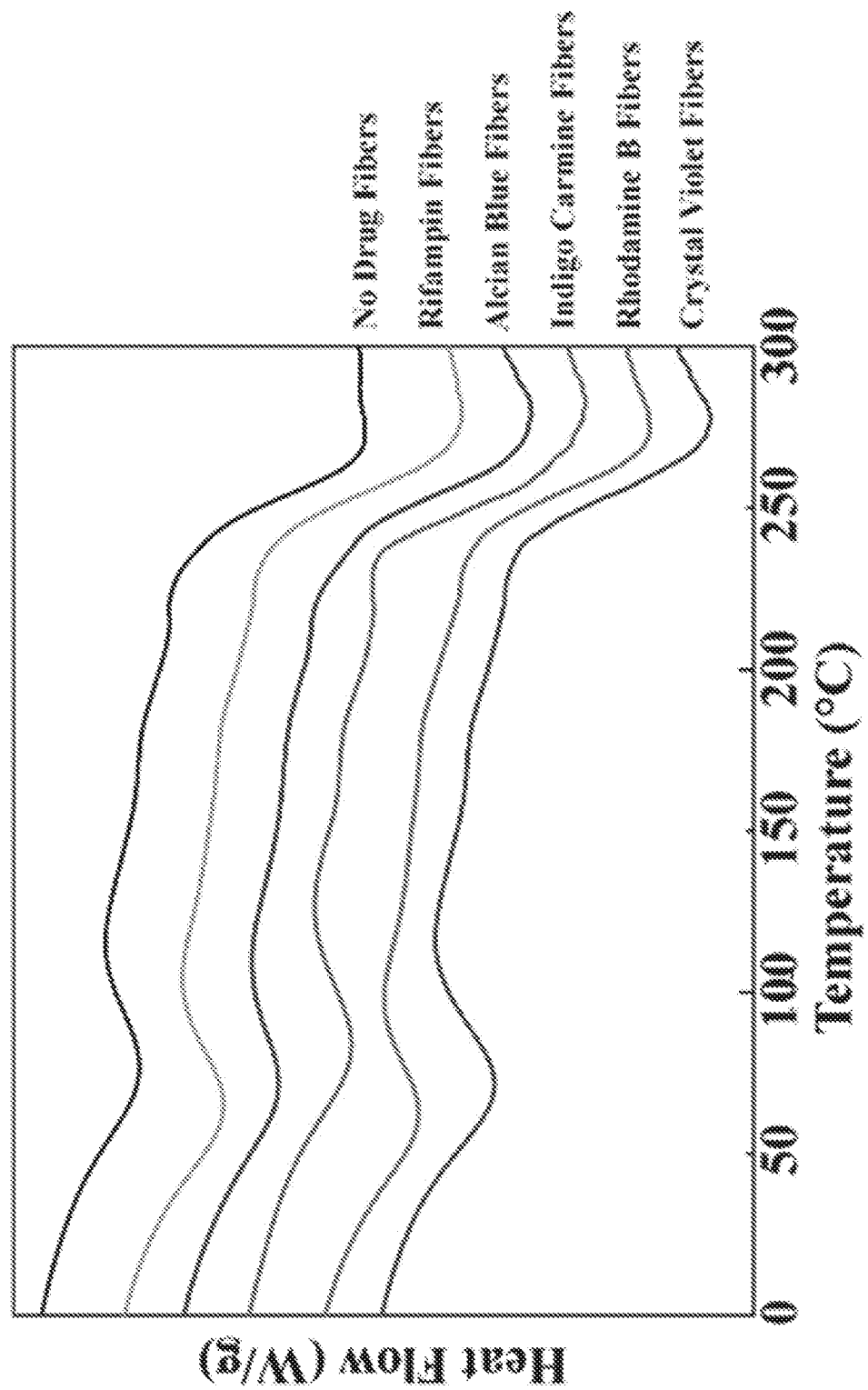
FIGS. 11A-11B are graphs of total heat flow of zein nanofiber (FIG. 11A) and zein film (FIG. 11B) samples, showing temperature regions related to bound water evaporation, glass transition and degradation.

DSC analysis was conducted to examine the thermal properties of the zein-drug nanofibers and films prior to drug release testing. FIG. 11A shows the heat flow of the drug-zein nanofibers. As the temperature approached 100° C., an endothermic peak appeared for each sample which indicated that bound water absorbed from air had evaporated at this point. After all the water had evaporated, heat flow steadily declined in each sample as temperature increased. This may be due to the fact that molecules within proteins move faster in response to higher temperatures. At 226° C. a crystallization peak was observed for the corn zein nanofibers (FIG. 11A). Corn zein exhibits a crystallization peak at 210° C. followed by the formation of β-crystals. Without intending to be limited to any particular theory, the higher zein crystallization temperature observed here is potentially due to the 1-dimensional aspect of nanofibers. According to polymer nanofiber studies, nanofibers display different crystallization behavior from those in the bulk materials. The general trend appeared to be that when model drug is present within the zein protein, the crystallization occurred at a higher temperature. This shift is potentially a result of additional molecular weight from the model drugs within the fiber mesh. This trend is consistent with every drug-zein copolymer except the alcian blue sample which had a crystallization peak similar to that found in corn zein.

Figure 11B:
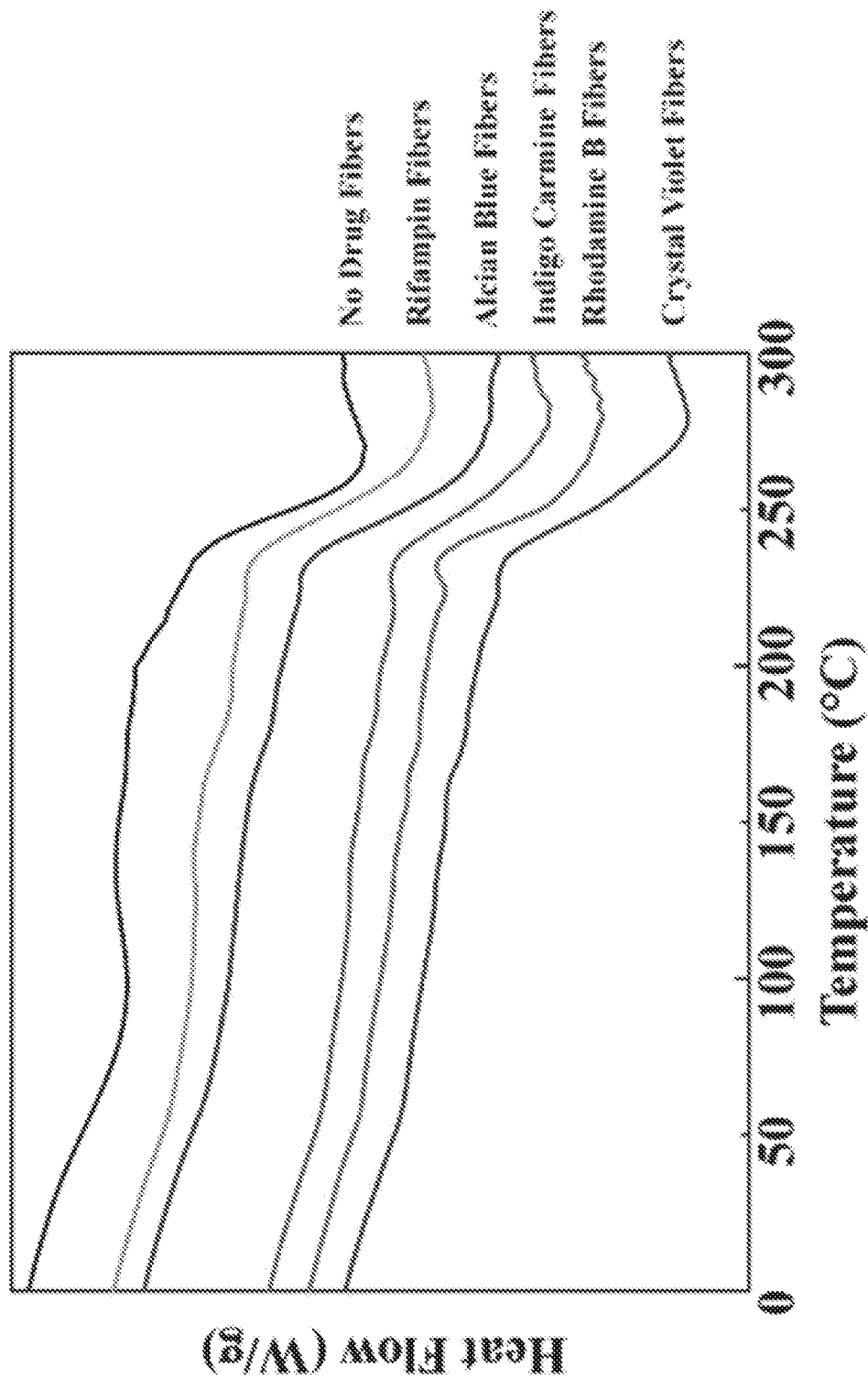

As previously mentioned in Example 2, alcian blue molecules may be too large to completely integrate into the protein structure. Corn zein polymer chains, in the alcian blue-zein copolymer, are less obstructed by the alcian blue molecules which are situated more along the polymer chain exterior rather than embedded within the alpha helical structure. Table 4 shows the full degradation peak values for each fiber sample with an average value at 273.0±3.423° C. A degradation peak appeared for each fiber sample immediately after corn zein crystallization. As shown in Table 4, corn zein nanofibers had a degradation peak at 267.1° C. Corn zein powder is thermally stable up to 280° C. with a single degradation step at higher temperatures. The small decrease in thermal stability was possibly due to the increase in surface contact area where nanofiber polymer strands are exposed to more heat than in bulk material. When drugs were added to zein nanofibers, the thermal stability increased slightly and this trend was consistent throughout each sample as seen in Table 4 and FIG. 11A. However, the peak shift was minor which indicated that the addition of drugs changed the molecular structure but did not significantly affect the thermal properties of the zein. This suggests that the chemical composition of the zein and the model drugs remained intact and the zein was acting solely as a carrier for the drugs. FIG. 11B shows the heat flow of the drug-zein films. The films displayed a similar heat flow trend seen in FIG. 11A for the nanofiber samples. Zein films had β-crystallinity peaks immediately before degradation and displayed degradation in a single step. The model drug-zein films also had a major degradation peak at a higher temperature than that of the pure film, as shown in Table 4.

the addition of drugs displayed an early glass transition (115~123° C., see Table 4) followed by an unstable heat capacity drop, much lower than the Tg of pure zein films (146° C.). This suggested the drugs may have caused additional polymer matrix degradation or disassembling at a lower temperature (~130° C.) in the films reducing the amount of polymer available to undergo glass transition. The model drugs were possibly situated more along the exterior of the film unprotected inside the zein matrix. As a result, the

TABLE 4

Thermal analysis data of corn zein nanofibers and films with model drugs. Glass transition temperatures were obtained from reversing heat capacity curves, while major degradation peak temperatures were obtained from total heat flow curves.

| Sample | Fiber | | Film | |
|---|---|---|---|---|
| | Glass Transition $T_g$ (° C.) | Degradation $T_d$ (° C.) | Glass Transition $T_g$ (° C.) | Degradation $T_d$ (° C.) |
| Pure Corn Zein | 162.3 | 267.1 | 146.2 | 268.5 |
| Rifampin | 166.8 | 272.0 | 121.6 | 282.1 |
| Alcian Blue | 158.2 | 276.9 | 120.1 | 282.9 |
| Indigo Carmine | 166.2 | 275.6 | 120.4 | 280.9 |
| Crystal Violet | 162.4 | 273.8 | 115.3 | 278.5 |
| Rhodamine B | 164.1 | 272.6 | 122.3 | 279.2 |

Figure 12A:
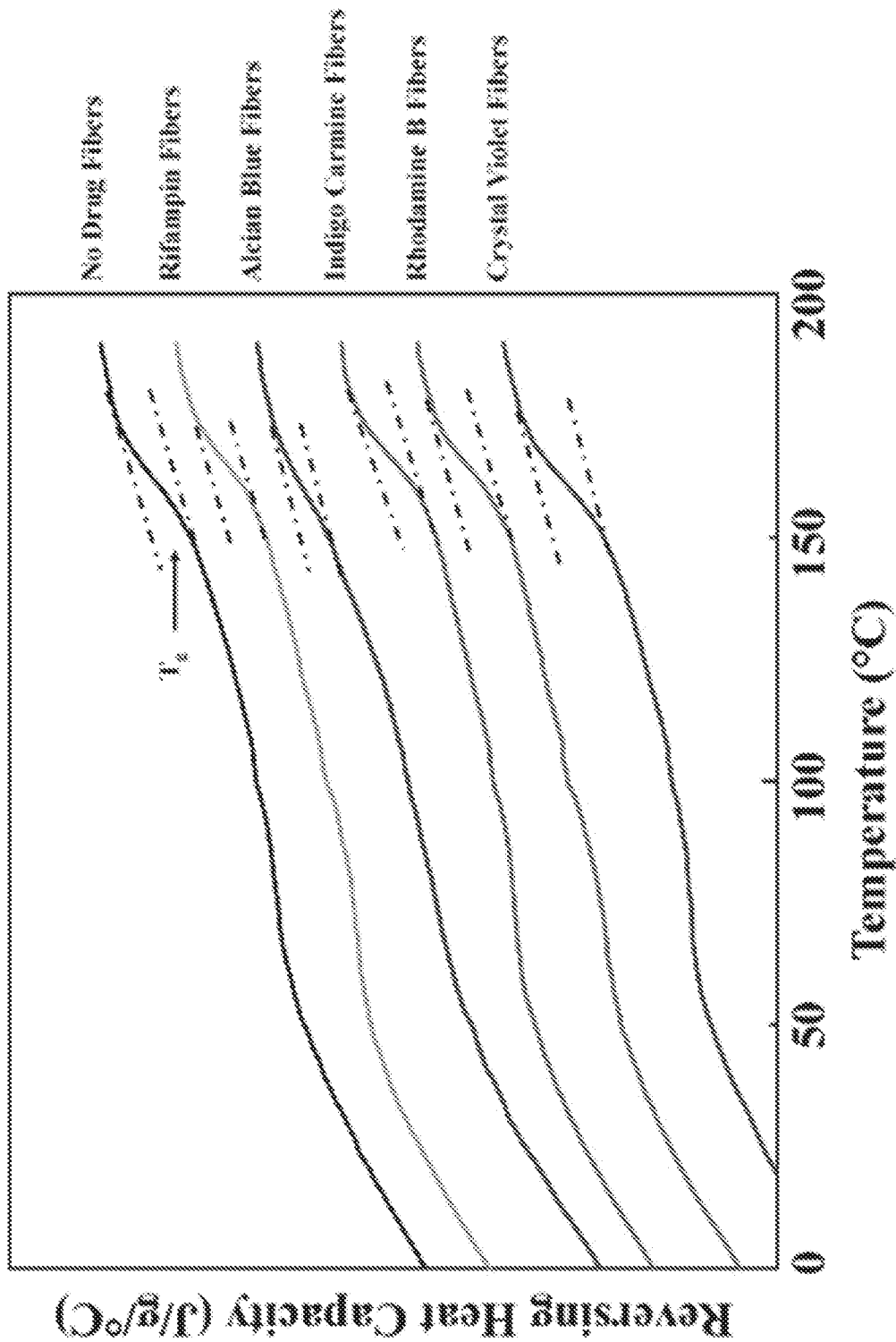
FIGS. 12A-12B are graphs of reversing heat capacity scans of different zein nanofiber (FIG. 12A) and zein film samples (FIG. 12B), showing temperature regions related to glass transition temperature ($T_g$) of the various drug-loaded fibers vs. the reversing heat capacity for various drug-loaded film samples.

FIG. 12A represents the reversing heat capacity of the zein-drug nanofibers. Due to the presence of amorphous polymer, corn zein protein displayed a glass transition at 162.3° C. This is similar to the glass transition of zein powder observed in previous studies at a temperature of 165° C. As previously discussed, and without intending to be limited to any particular theory, the decrease in glass transition temperature was potentially due to the polymer strands possessing more molecular mobility in the form of a nanofiber than as a compact powder. In accordance with Table 4, most model drugs shifted the glass transition to a higher temperature. The presence of most model drugs restricted molecular motion of the nanofiber matrix resulting in an increase in glass transition. The shift in glass transition also suggests that the drugs induced molecular alignment in the zein. As described in the Example 2, the drugs may promote formation of alpha helical structure within the zein. Therefore the increase in glass transition serves as evidence that there is less amorphous and more pre-aligned polymer in the drug-zein nanofibers. However, alcian blue and crystal violet samples did not follow this trend. Due to its large molecular size, alcian blue molecules potentially push the polymer fibers together rather than embed themselves within the matrix. In addition, the melting point of alcian blue was seen at 148° C. which indicates that there was no hindrance in molecular mobility in the zein. This coincides with a decrease in glass transition in the alcian blue sample. Alcian blue likely compressed the zein polymer together into an aligned structure and melted before hindering the glass transition. In Table 4, the crystal violet-zein nanofibers exhibited a glass transition temperature value overlapping with zein protein. It appears that the crystal violet, while inducing alpha helix formation, did not impede further alignment of zein polymer.

Figure 12B:
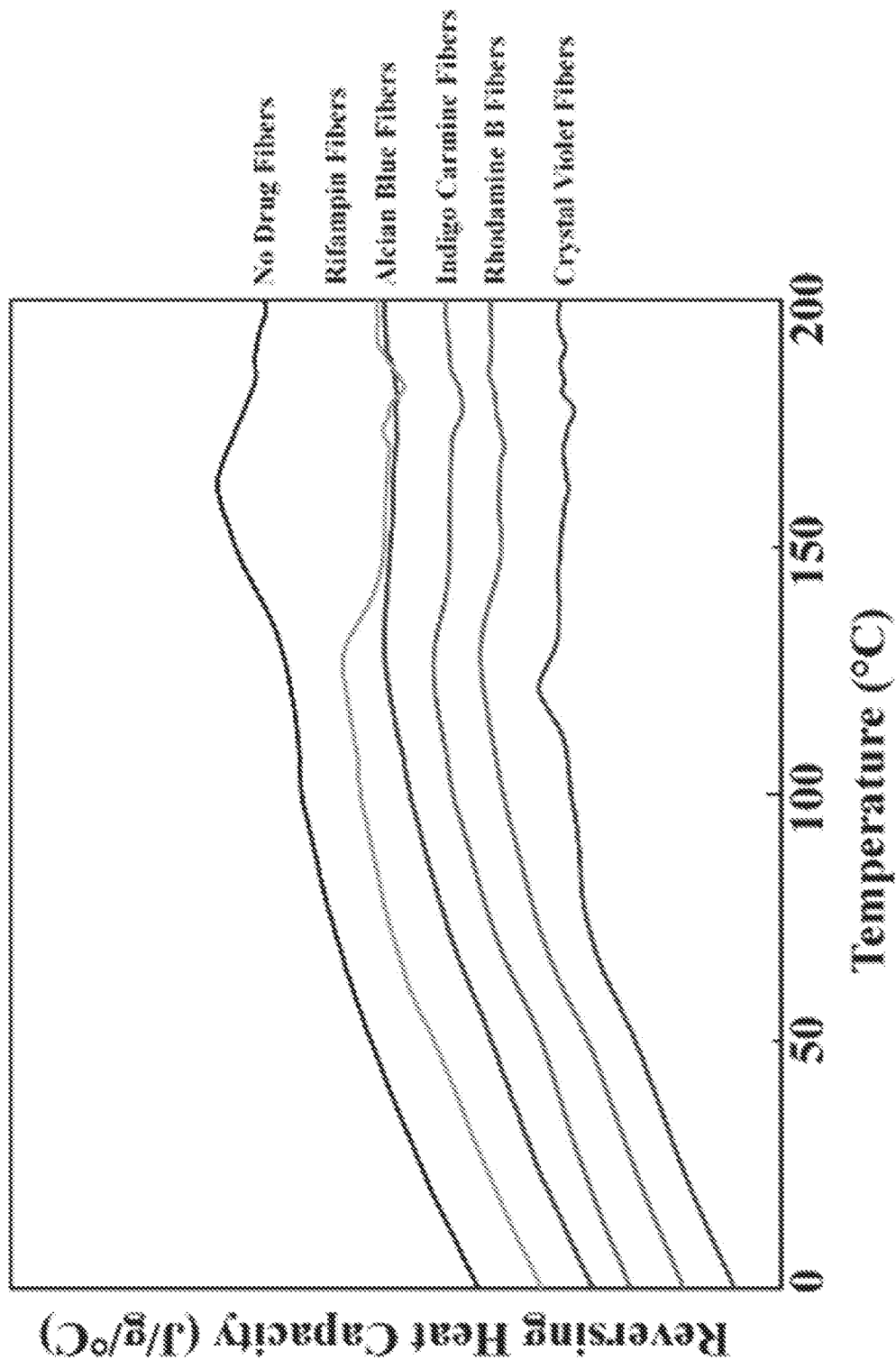

FIG. 12B represents the reversing heat capacity of the zein-drug films with different model drugs. Zein films display an earlier glass transition than zein nanofibers which could be due to the film 2D structure having more alignment than the 1D nanofibers. Unlike the nanofibers, all films with drug release of most films was faster than that of the nanofibers because the drugs are less restricted in motion by the films (see Example 5).

Example 4: Morphology Characterization of Corn Zein Nanofibers Comprising Drugs

Figure 13:
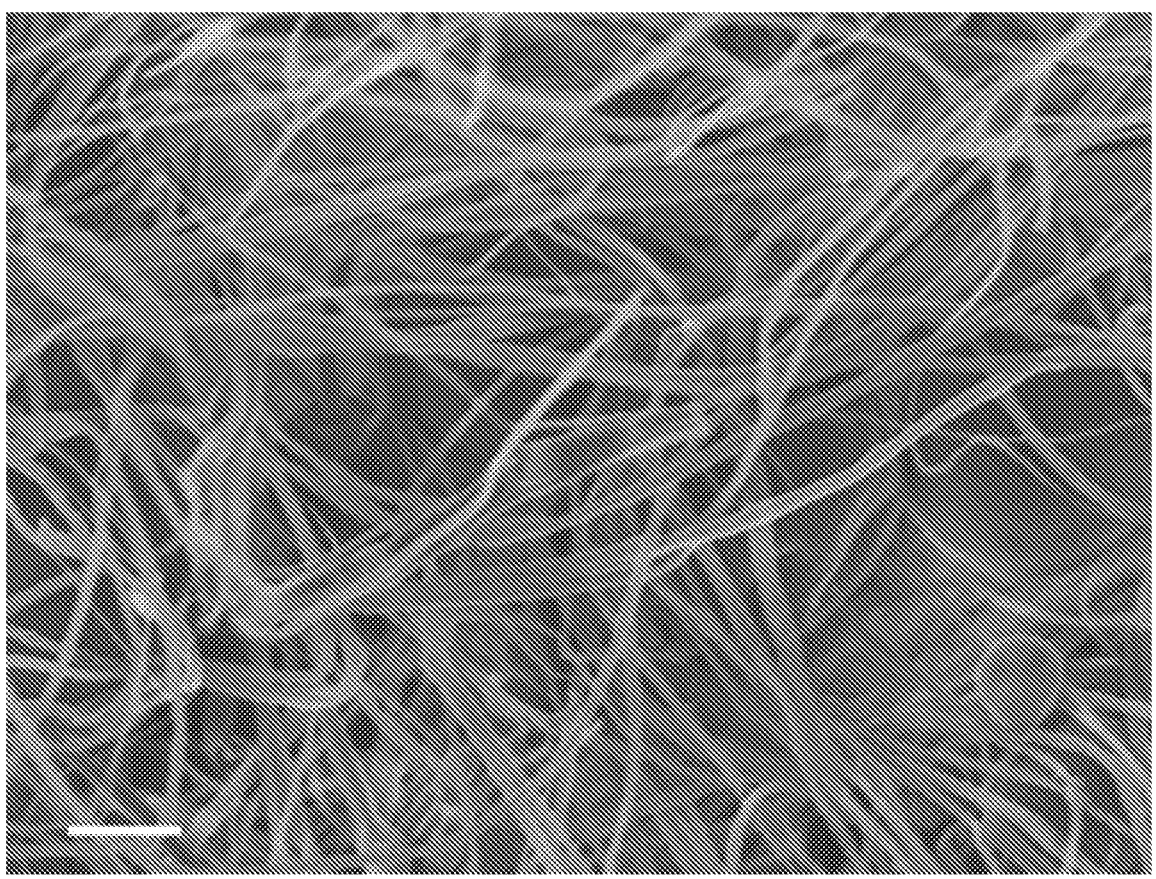
FIG. 13 is an SEM image of pure corn zein nanofibers (scale bar is 20 μm).
Figure 14E:
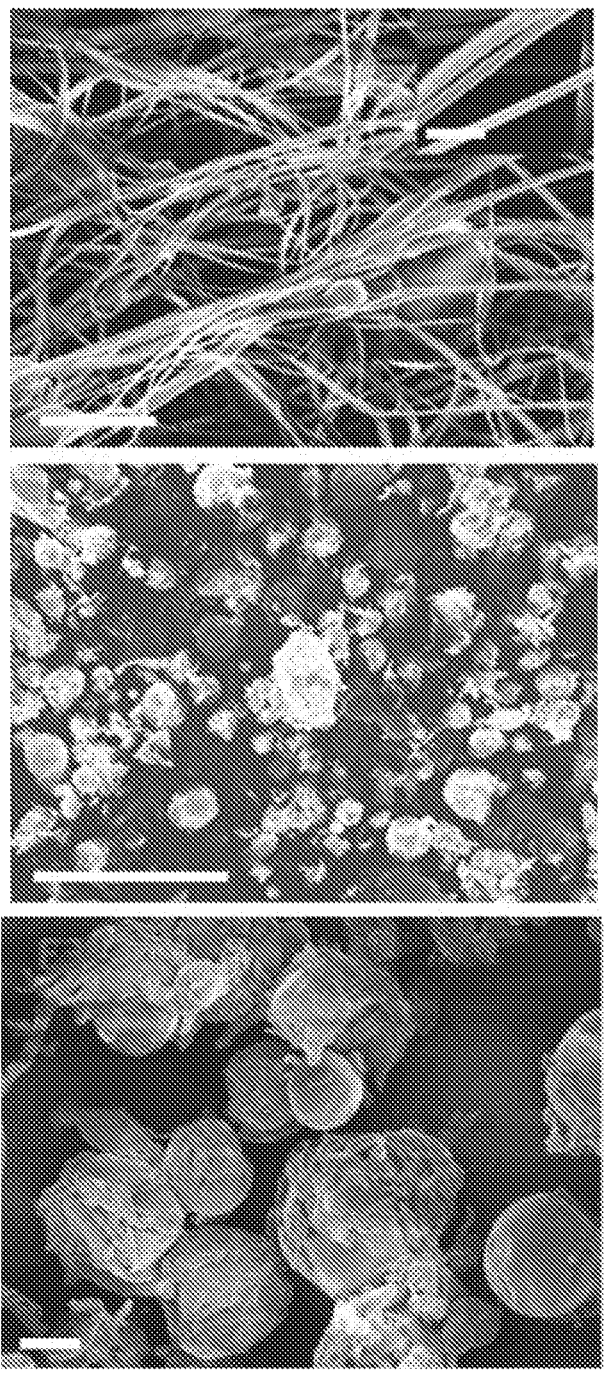
Figure 15A:
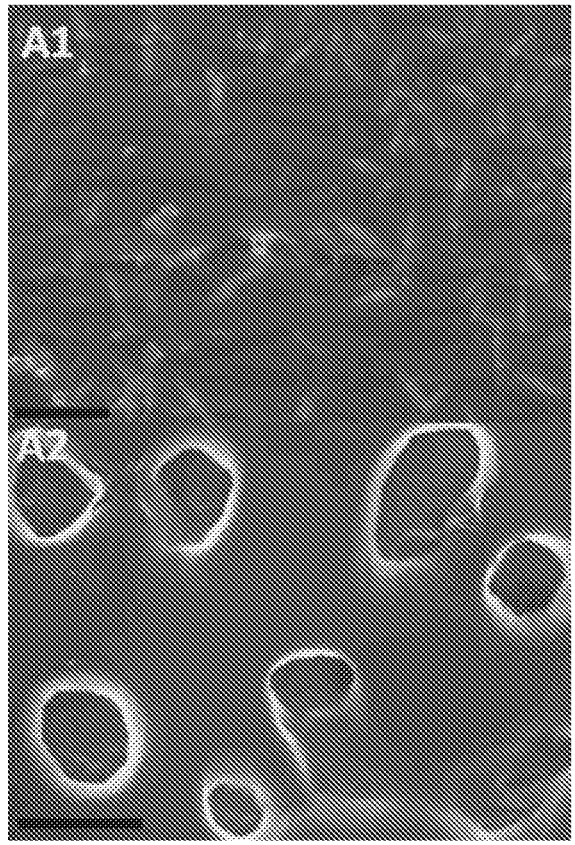
FIGS. 15A-15E are SEM images of corn zein films with different model drugs (Rifampin, Alcian Blue, Indigo Carmine, Rhodamin and Crystal Violet for FIGS. 15A-15E respectively). The left-hand images show pre-release images of the films. The right-hand images show post-release images of the films. The scale bar for the right-hand image in FIG. 15A is 200 μm. The scale bar in all other images is 4 μm.
Figure 15B:
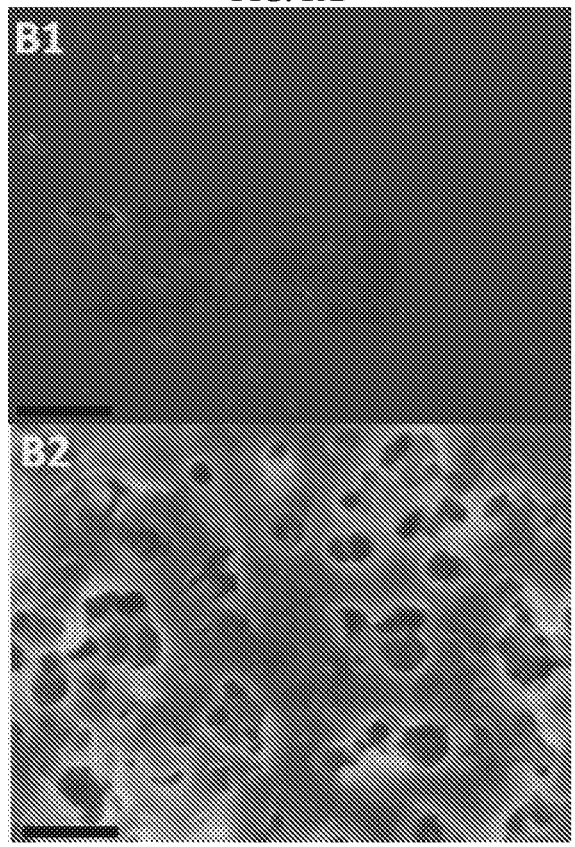
Figure 15C:
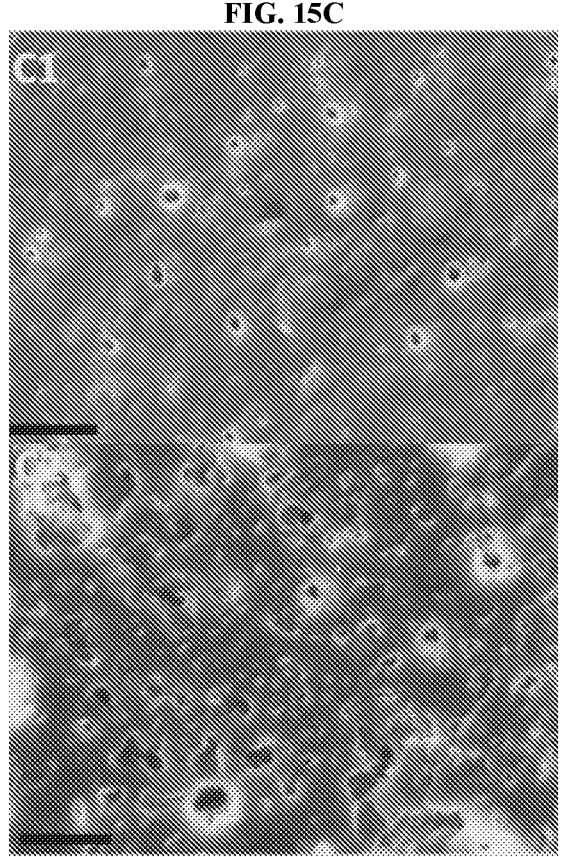
Figure 15D:
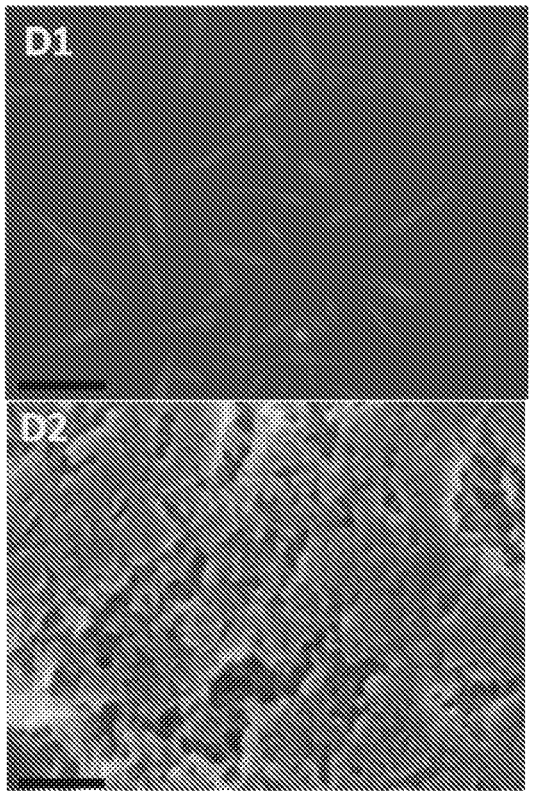
Figure 15E:
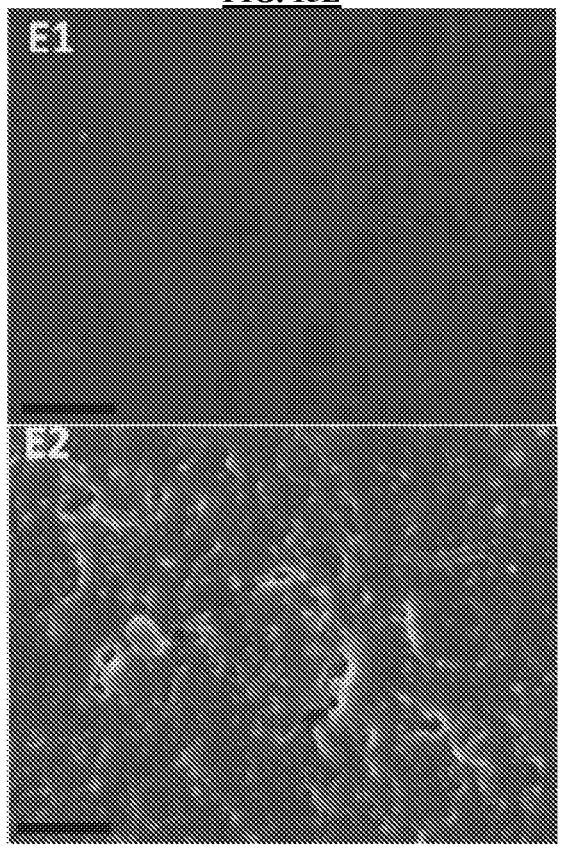

The morphology and fiber diameter of the air jet spinning nanofibers were characterized by scanning electron microscope (SEM). As shown in FIG. 13, the pure corn zein nanofibers were uniform, with diameters in the range of 0.5 μm to 1.5 μm. No aggregates or beads were found in the pure corn zein fiber sample. SEM images of corn zein nanofibers with different model drugs are shown in FIGS. 14A-14E. All five types of pre-release samples maintained similar morphology to the pure corn zein nanofiber, with some tiny aggregates formed randomly in the nanofiber matrix of rifampin, indigo carmine, rhodamin and crystal violet loaded fibers. The diameters of rifampin, alcian blue, indigo carmine and rhodamin samples were in a similar range compared with that of pure corn zein nanofibers. However, diameters of pre-release Crystal Violet nanofibers decreased to 0.2~0.8 μm.

The morphology of "after-release" samples, after stirring in 20 mM phosphate buffer for 7 days, is shown in the middle panels of FIGS. 14A-14E. Due to the release of drug into the buffer, corn zein nanofibers were slowly disassembled into particles with diameters of 0.5~1.5 μm after 7 days. To further investigate the surface morphology of these particles, SEM images of the after-release samples with 20 μm scale bars are shown in the bottom panels of FIGS. 14A-14E. Small fiber residues and holes can be seen randomly on the particle surface with multi-layer structures. Both holes and layer structures could have resulted from drug release process from nanofiber matrix. While fiber samples appeared to have broken apart during release, no significant changes in mass were observed suggesting minimal degradation of zein proteins during the release.

As a comparison, the morphology of corn zein films with model drugs are shown in FIGS. 15A-15E. The pre-release rifampin, rhodamine and crystal violet film samples showed a smooth morphology with a similar surface pattern to the pure zein film. The alcian blue film sample showed a solid and blank surface morphology, while the other samples assembled into rod/particle shapes and homogeneously distributed in the corn zein films. The surface of Indigo Carmine sample tended to be rougher than other films. Due to the release of drug molecules, holes with a similar diameter of the original drug aggregates were formed on the surface of all the samples. The diameter of the holes on the rifampin film surfaces were around 20 µm, which is much larger than that of the other four samples. The diameters of holes on the surface of alcian blue and indigo carmine samples ranged from 1 to 4 µm, which suggests that the typical size of drug aggregates in the cast films are much larger than those in the zein fibers (less than the fiber diameter of 0.5~1.5 µm).

Example 5: Drug Release Studies

Figure 16A:
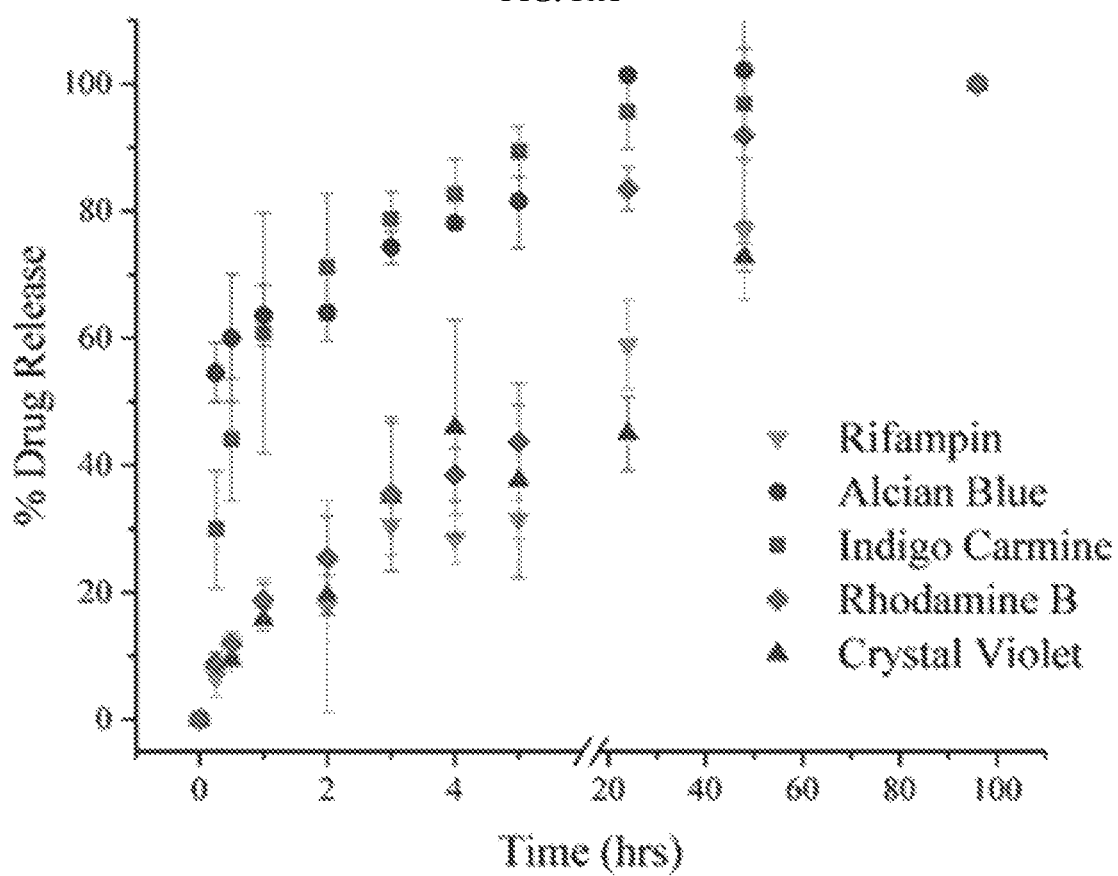
FIGS. 16A-16B are graphs showing model drug release from corn zein fibers (FIG. 16A) and corn zein films (FIG. 16B). The release of most model drugs was slower and more controlled in the fiber samples.
Figure 16B:
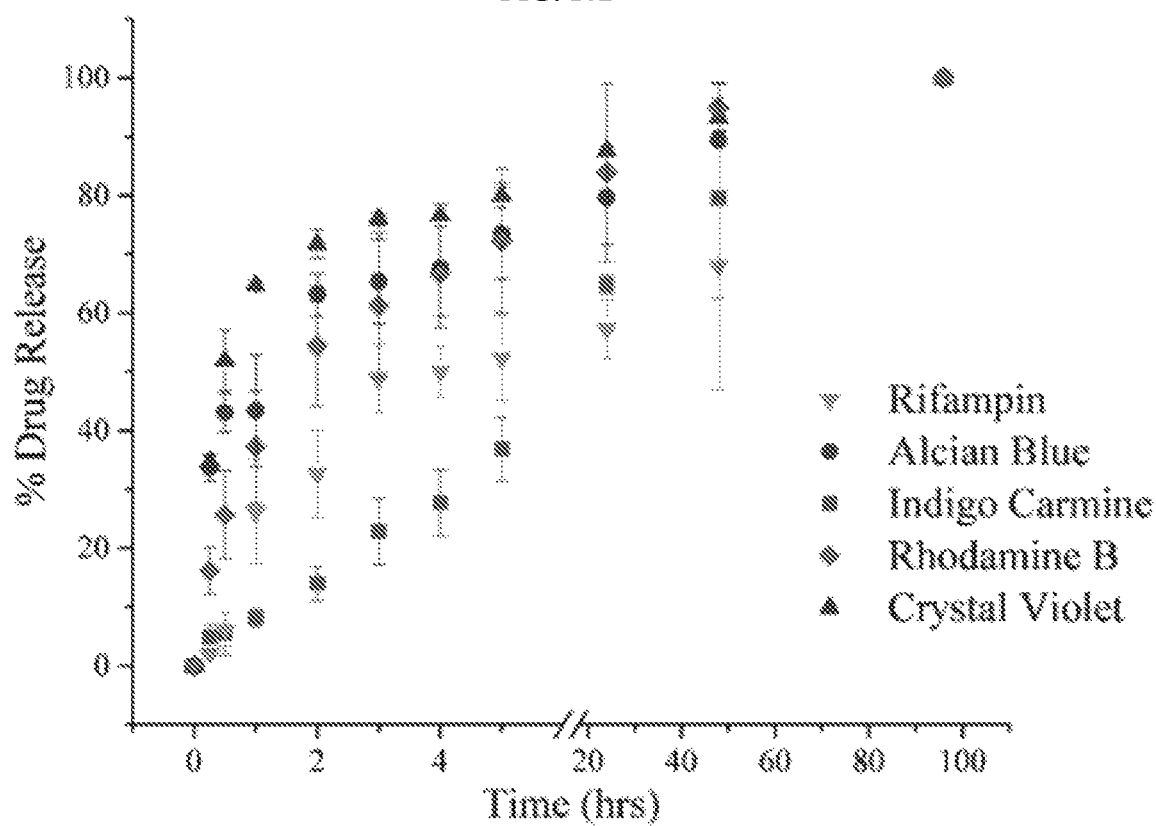

To further investigate the potential effectiveness of the supramolecular systems for transdermal drug delivery, drug release of the model drugs incorporated in either films or fibers was simulated in 0.1% w/v 20 mM phosphate buffer (pH 7.0) for different times. Shown in FIGS. 16A-16B are the normalized release profiles for the fiber and film models, respectively. Data points were normalized based on the amount of drug released at 96 hours. No significant drug release was observed above 96 hours for all samples. All release profiles were also fit with the Korsmeyer-Peppas model, and n values (demonstrated the release resistance) are shown in Table 5. In each case, sufficient $r^2$ values suggest the validity of the model in assessing the release from both films and fiber samples. The general trends suggest that the fibers allowed for slower, more controlled release. At the 15-minute time point, a considerably high release percentage was observed for both the alcian blue and indigo carmine samples. Without intending to be limited to any particular theory, this is suggestive of a lack of bonding between the drugs and the zein protein. This further suggests that the fibers act as a physical carrier of the drugs as opposed to chemically binding to them. Alcian blue is a very large molecule (MW 1.3 kDa), so it is reasonable to assume its bulkiness prevents it from being efficiently integrated into the zein structure. In contrast to the fibers, films with indigo carmine incorporated displayed a dramatic drop at the earlier points in its release profile. This can be attributed to the nature of the method used to fabricate the films. The corn zein was exposed to formic acid for a longer period of time during film synthesis than during fiber generation. During this time, the formic acid may have severed some of the hydrogen bonds of the corn zein structure, allowing the integration of the model drug molecules. Thus, the addition of drugs did not compress the corn zein towards a more alpha helical structure for the films allowing it to be released faster. Therefore, although the cylindrical nanofibers have a greater surface area-to-volume ratio, they are able to retain the drugs and exhibit slower release compared to the two-dimensional films.

TABLE 5 n values from the Korsmeyer-Peppas equation of model drug release profiles from fiber and film samples shown in FIGS. 16A-16B.

| Model Drug | Fiber | | Film | |
| --- | --- | --- | --- | --- |
| | N | $R^2$ | n | $R^2$ |
| Rifampin | 0.392 | 0.99 | 0.284 | 0.87 |
| Alcian Blue | 0.1104 | 0.97 | 0.1507 | 0.96 |
| Indigo Carmine | 0.1318 | 0.88 | 0.430 | 0.98 |
| Crystal Violet | 0.353 | 0.93 | 0.1184 | 0.93 |
| Rhodamine B | 0.33701 | 0.95 | 0.203 | 0.91 |

Figure 17:
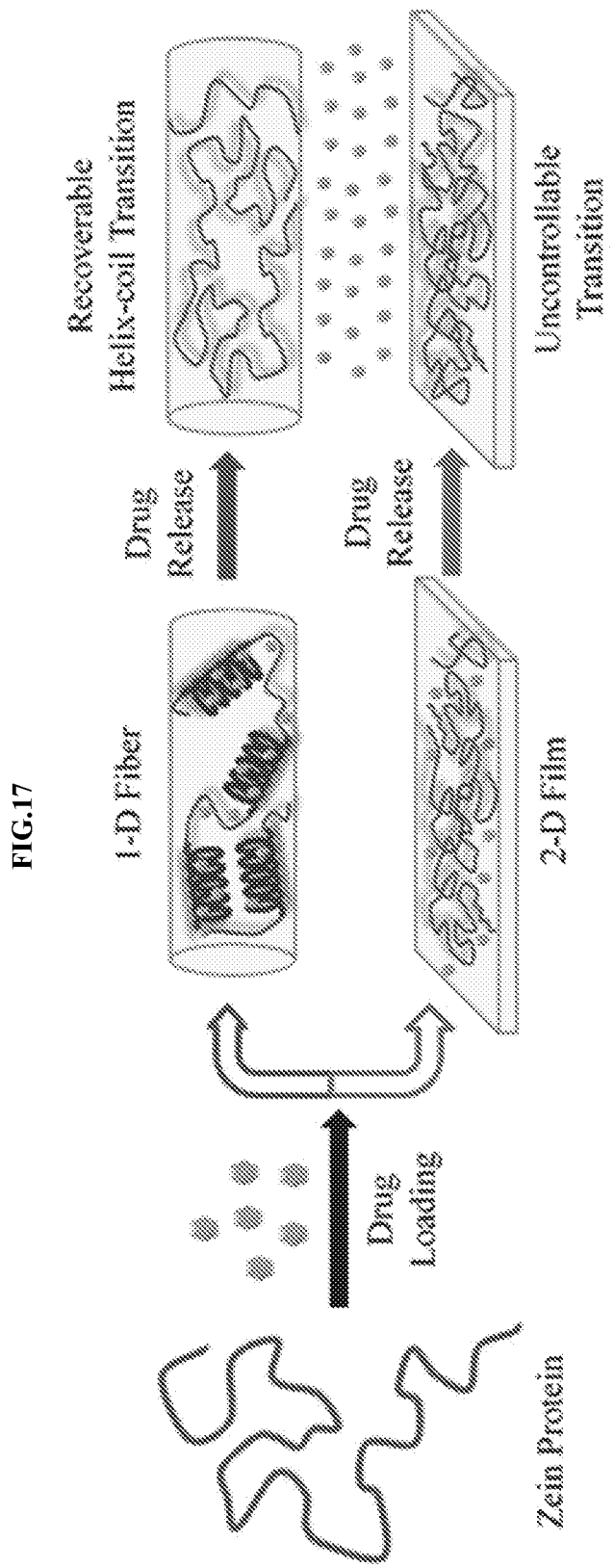
FIG. 17 is a scheme showing a non-limiting mechanism for the loading and release of drugs from corn zein nanofibers and films. In air-spun fiber samples (top path), addition of drugs causes the random coil network to transition to a more alpha helical structure. Once drugs are removed, samples return to their native structure. In films (bottom path), the addition of drugs does not cause the formation of alpha helices, and the original random coil network is not conserved.

As observed in the FTIR, the addition of model drugs facilitated a transition from a network of random coils to a more alpha helical arrangement in the fiber samples. When drugs were removed, fibers reverted back to their original random coil structure, showing a completely reversible, controllable transition. Without intending to be limited to any particular theory, this may be caused by the binding of model drug molecules to the protein through hydrogen bonding. However, some drugs lack hydrogen bond donor groups, suggesting that their physical infiltration may facilitate the transition. This controllable, reversible transition was not seen in the film samples. Upon the addition of model drugs, film samples preserved their random coil structure with the exception of alcian blue samples. When the drugs were released, in all cases film samples still consisted of a network of random coils, however, there is a small shift in the FTIR, suggesting the controllable, reversible transition seen in the fibers does not take place in the films. This may be attributed to the prolonged time the films were exposed to the solvent which severed any hydrogen bonds within the proteins. A representation of this proposed mechanism of drug incorporation is shown in FIG. 17.

Example 6: Morphological Analysis of Mori Silk-TiO$_2$ Nanofibers

FIGS. 20A-20E shows the morphologies of different Mori silk-TiO$_2$ nanofibers using the scanning electron microscopy (SEM). All six samples showed continuous long fibers with a uniform diameter distribution, forming an interconnected network structure. As can be seen in FIG. 20A, randomly oriented fibers with similar diameters formed a loose network structure. The average diameter of the fiber was measured to be ~5 µm. This loose structure made these materials amenable to filtration application for various particle sizes. The high surface-to-volume ratio property enhanced the efficiency of screening oversized particles. With 1% TiO$_2$ (w/w) particles added, silk fibers were bonded and connected by the TiO$_2$ particles. The diameter of TiO$_2$ particles was measured to be ~50 µm, which is much larger than that of common air pollutant particles. FIGS. 20C-20E are images of Mori silk-TiO$_2$ nanofibers with 2%, 5% and 10% of TiO$_2$ particles, respectively. Liquid silk solution first encases the TiO$_2$ particles by covering them with a layer of silk protein which then forms a fiber as it is blown out of the spray gun. Therefore, TiO$_2$ particles are strongly adhered to the silk fibers. These strongly attached TiO$_2$ particles can help remove the toxic chemicals in both the air or solution. FIG. 20F shows an enlarged picture of the 10% silk-TiO$_2$ nanofiber filters. TiO$_2$ particles were distributed uniformly in the fibers.

Example 7: Structural Analysis of Mori Silk-TiO$_2$ Nanofibers

Figure 21A:
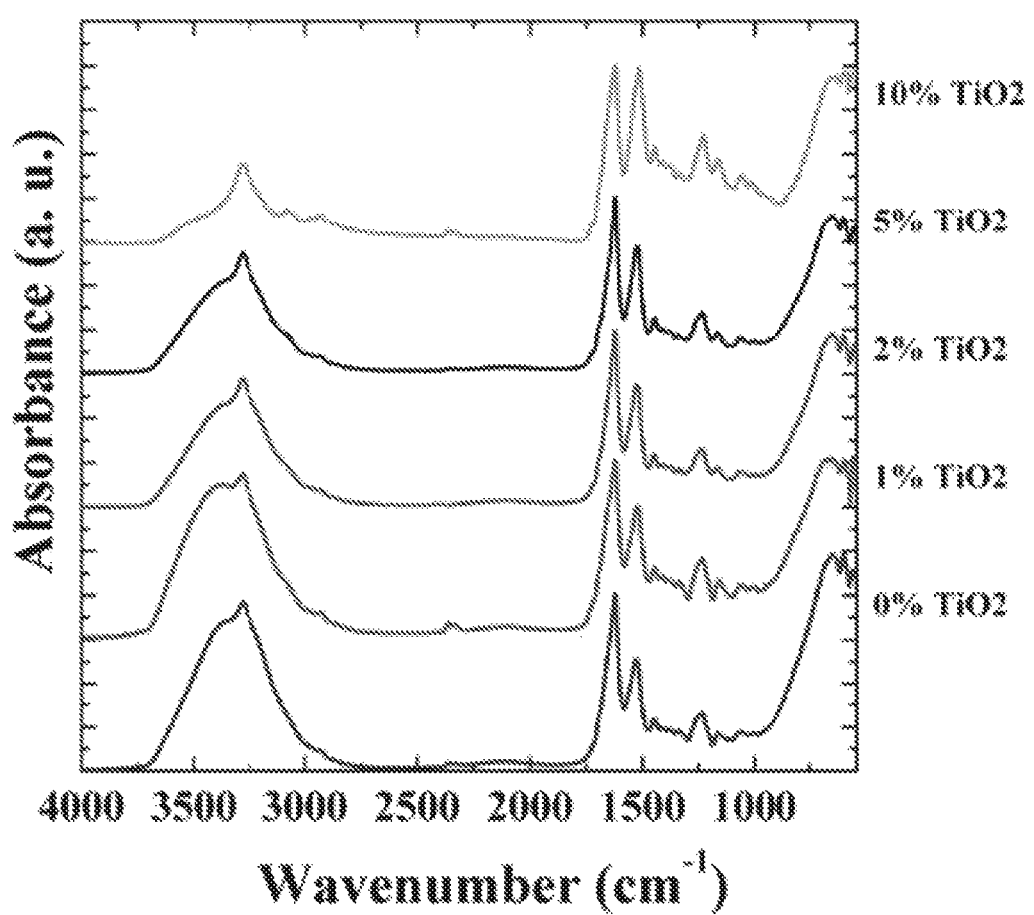
FIGS. 21A-21D are FTIR Spectra for unwashed (FIGS. 21A and 21C) and washed (FIGS. 21B and 21D) mori nanofibers with varying concentrations of TiO$_2$. The full spectra are shown in FIGS. 21A-21B and the amide region is isolated in FIGS. 21C-21D.
Figure 21B:
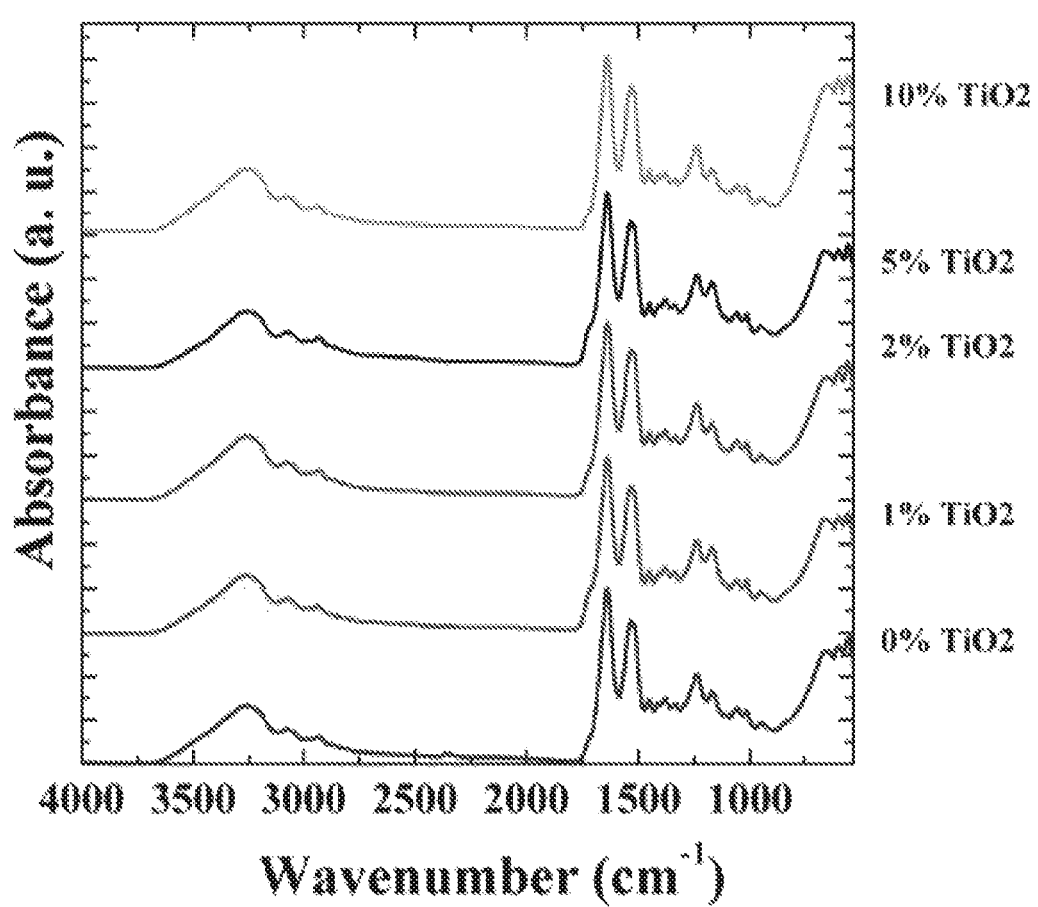
Figure 21C:
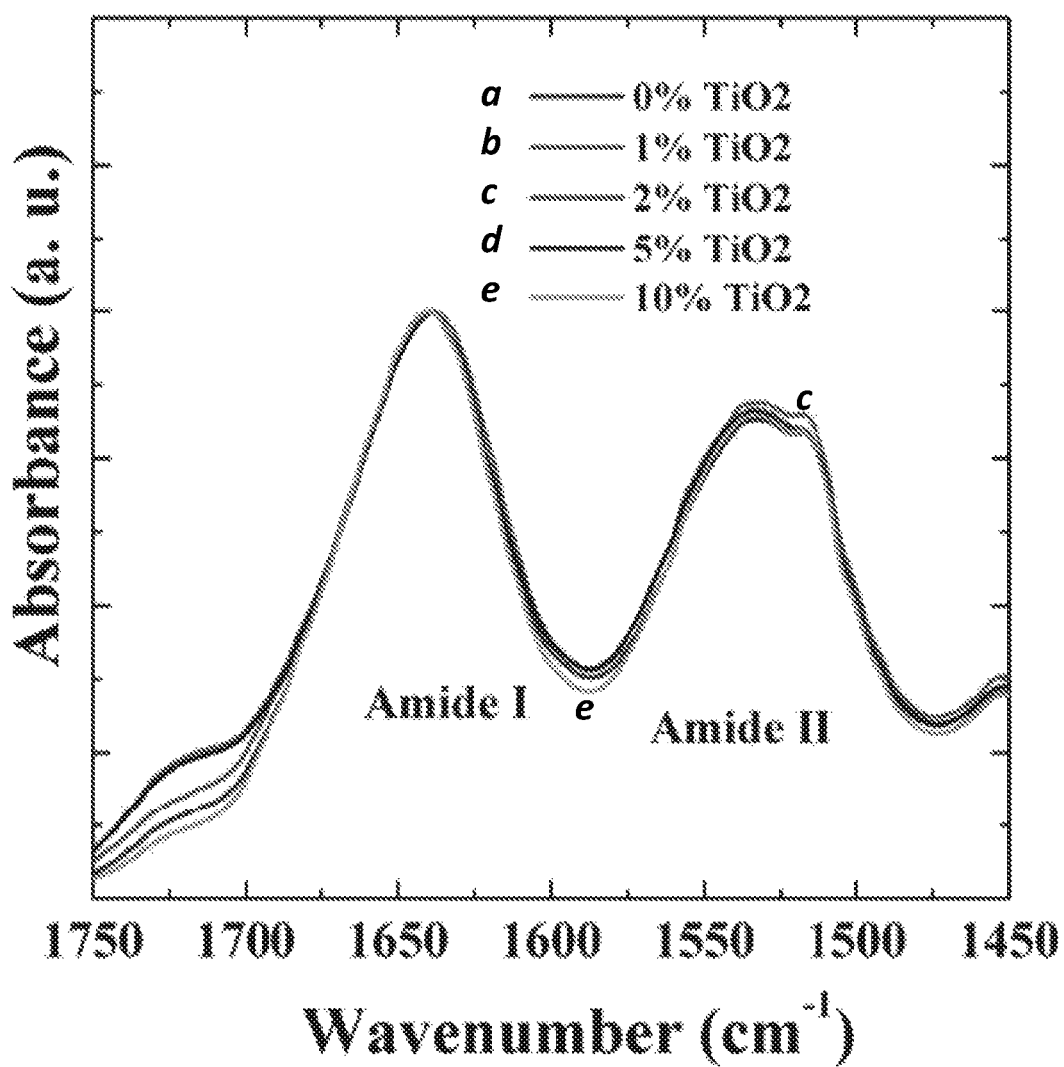
Figure 21D:
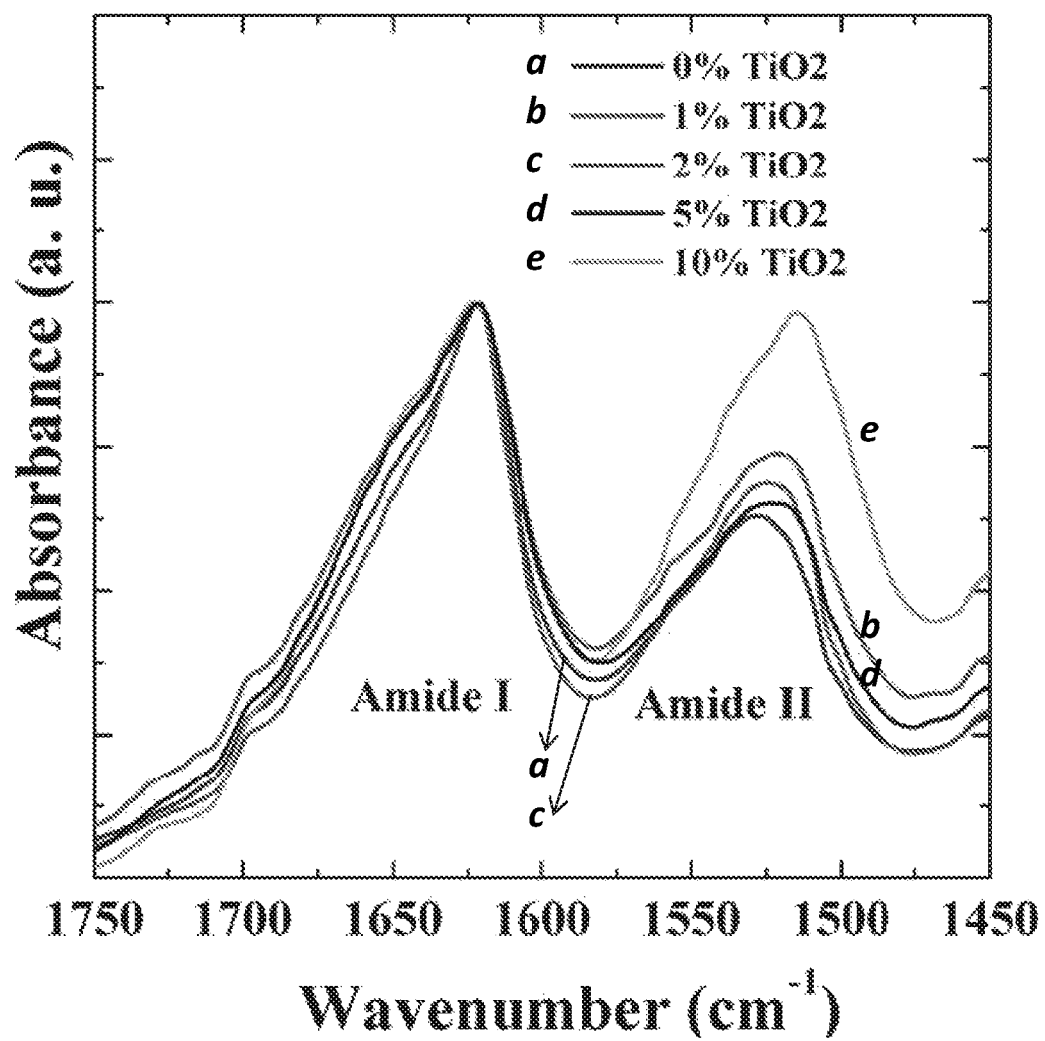

The structural properties of the mori silk-TiO$_2$ nanofibers were further explored through FTIR. FIGS. 21A & 21C show the spectra for nanofiber samples with varying amounts of $TiO_2$ before soaking in water to remove $CaCl_2$ residues. In both figures, it appears that the addition of $TiO_2$ induced little change in the silk composition. The Amide I and II regions of silk are magnified in FIG. 21C, and all samples exhibited a peak centered around 1644 $cm^{-1}$ associated with random coils of silk proteins. Mori silk exhibiting peaks in the 1648-1554 $cm^{-1}$ and 1535-1542 $cm^{-1}$ region have been characterized as having the Silk I conformation. Considering the nanofibers remained intact after the water soaking process, this would suggest that the silk did in fact have the insoluble Silk I conformation. However, after washing, the center of the Amide I and II peaks shifted to 1620-1630 $cm^{-1}$ and 1520 $cm^{-1}$ as seen in FIGS. 21B & 21D. This would be indicative of a much stronger Silk II conformation with beta-sheet crystals. It has been hypothesized that this change could be facilitated by controlling the drying rate of silk-based films. Silk films that were dried slowly had more time to assemble and form Silk II structures. The fibers made by the methods of the invention were left to air dry overnight and then placed in a desiccator, allowing for the conformational change. Addition of $Ca^{2+}$ ions can play an important role in regulating the structural formation of silk fibrils. Since $CaCl_2$ was used to disrupt hydrogen bonds and dissolve the silk in formic acid, it could have also contributed to the formation of the original Silk I conformation, and then Silk II as it was removed during washing. It is also noted that in FIG. 21D, the 2% $TiO_2$ sample exhibited the largest amounts of beta-sheets, while the other samples contained a combination of random coils seen in the 1644 $cm^{-1}$ region and beta-sheets corresponding to the 1625 $cm^{-1}$ region. The 10% $TiO_2$ also deviated from the trend with a very prominent Amide II peak. This could suggest that the silk and $TiO_2$ react differently at high concentrations. The 2820-2850 $cm^{-1}$ and 2720-2750 $cm^{-1}$ regions in FIG. 21B also decreased as compared to FIG. 21A, suggesting a decrease in C—H bond stretching. In these washed samples, the addition of $TiO_2$ also appeared to alter the 3400 $cm^{-1}$ region as seen in FIG. 21B. The amine peak represented at 3400-3250 $cm^{-1}$ was intact in all samples, however the shoulder at high wavelengths decreased with the addition of $TiO_2$. This peak can be correlated to the O—H stretching from absorbed water vapor. As the concentration of $TiO_2$ was increased, the strength of the peak decreased, suggesting the fibers are becoming more hydrophobic.

Example 8: Thermal Analysis of Mori Silk-$TiO_2$ Nanofibers

Figure 22:
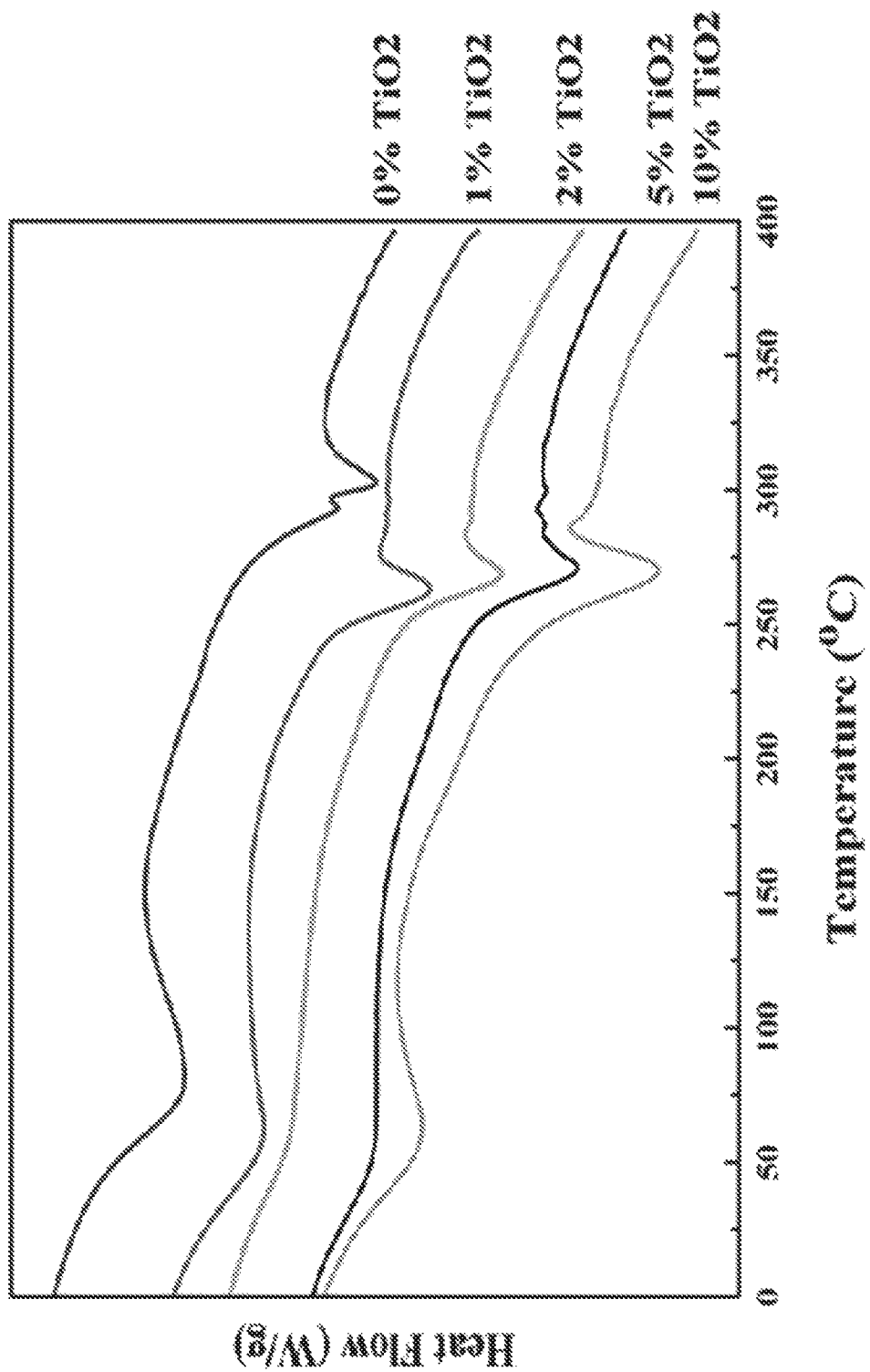
FIG. 22 is a DSC heat flow graph of washed mori nanofibers with varying concentrations of TiO$_2$.
Figure 23:
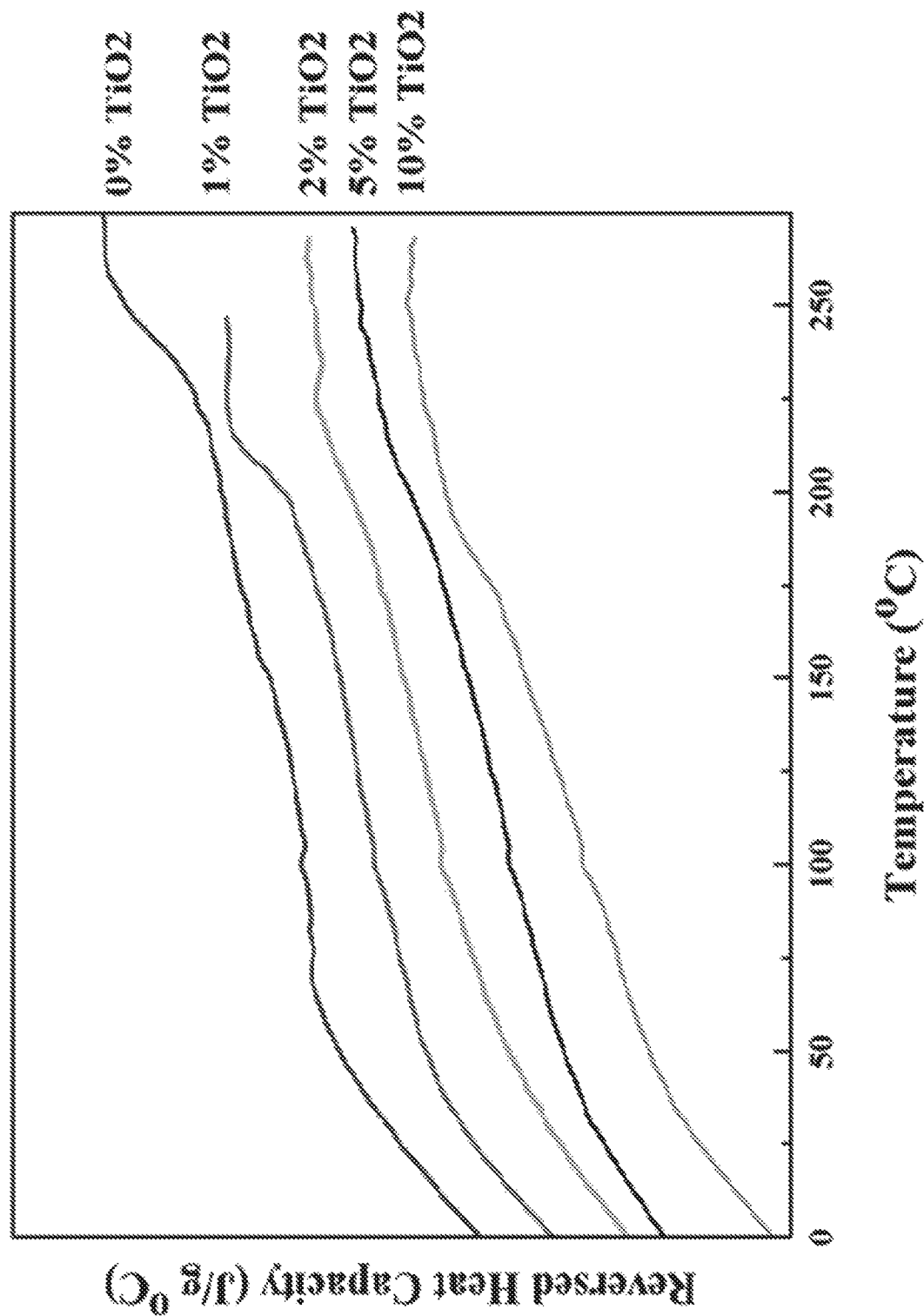
FIG. 23 is a DSC reversed heat capacity graph of washed mori nanofibers with varying concentrations of TiO$_2$.

Thermal properties of the mori silk-$TiO_2$ nanofibers were analyzed using DSC. FIGS. 22-23 represent the heat flow and the reversed heat capacity of water washed samples respectively. Only water washed samples were tested as unwashed samples, with remaining calcium chloride, produced excessive noise.

In FIG. 22, the initial endothermic peaks seen in all samples up to 100° C. represent the evaporation of remaining water. After water evaporation, the fiber composites continuously absorbed more heat until the silk degraded. The pure silk (0% $TiO_2$) sample exhibited a double peak around 302.7° C. and 310.0° C. which indicates the presence of Silk I and Silk II compositions respectively. Pure mori silk consists of two crystalline polymorphs within the bulk silk fibroin, Silk I which is largely amorphous and Silk II which has a β-sheet conformation. As previously seen in the FTIR results (Example 7), washing the composite fibers in water induced the development of Silk II β-sheet structures. The β-sheet crystallinity in Silk II has greater bond strength and thus requires higher temperatures to degrade/melt compared to Silk I. Once $TiO_2$ was added, a single degradation peak appeared which shifted to the left by about 30° C. The single peak suggests that adding $TiO_2$ to mori silk resulted in a more uniform silk structure with continuous degradation than the pure silk material.

In FIG. 23, slight peaks at approximately 100° C. again represent the evaporation of remaining water. The glass transition temperature for pure mori silk (0% $TiO_2$) appeared at 242.6° C. with a well-defined curve. Throughout samples 1%-10% $TiO_2$, the glass transition temperature incrementally decreased as more $TiO_2$ was added. According to previous silk fibroin studies, the reduction in the specific reversing heat capacity occured due to the formation of beta-sheets and possible immobilized non-crystalline segments. The formation of beta-sheets reduced the amount of mobile chain-segments available to participate in the glass transition step. The steady decrease in glass transition temperature, with increasing amount of $TiO_2$, demonstrates tunable molecular mobility and thermal properties for this composite.

Thermal properties of the mori silk-$TiO_2$ nanofibers were further investigated through thermogravimetric analysis. Shown in FIGS. 24A & 24C are the degradation profiles of the unwashed and washed nanofiber samples and FIGS. 24B & 24D show the unwashed and washed derivatives respectively.

Figure 24A:
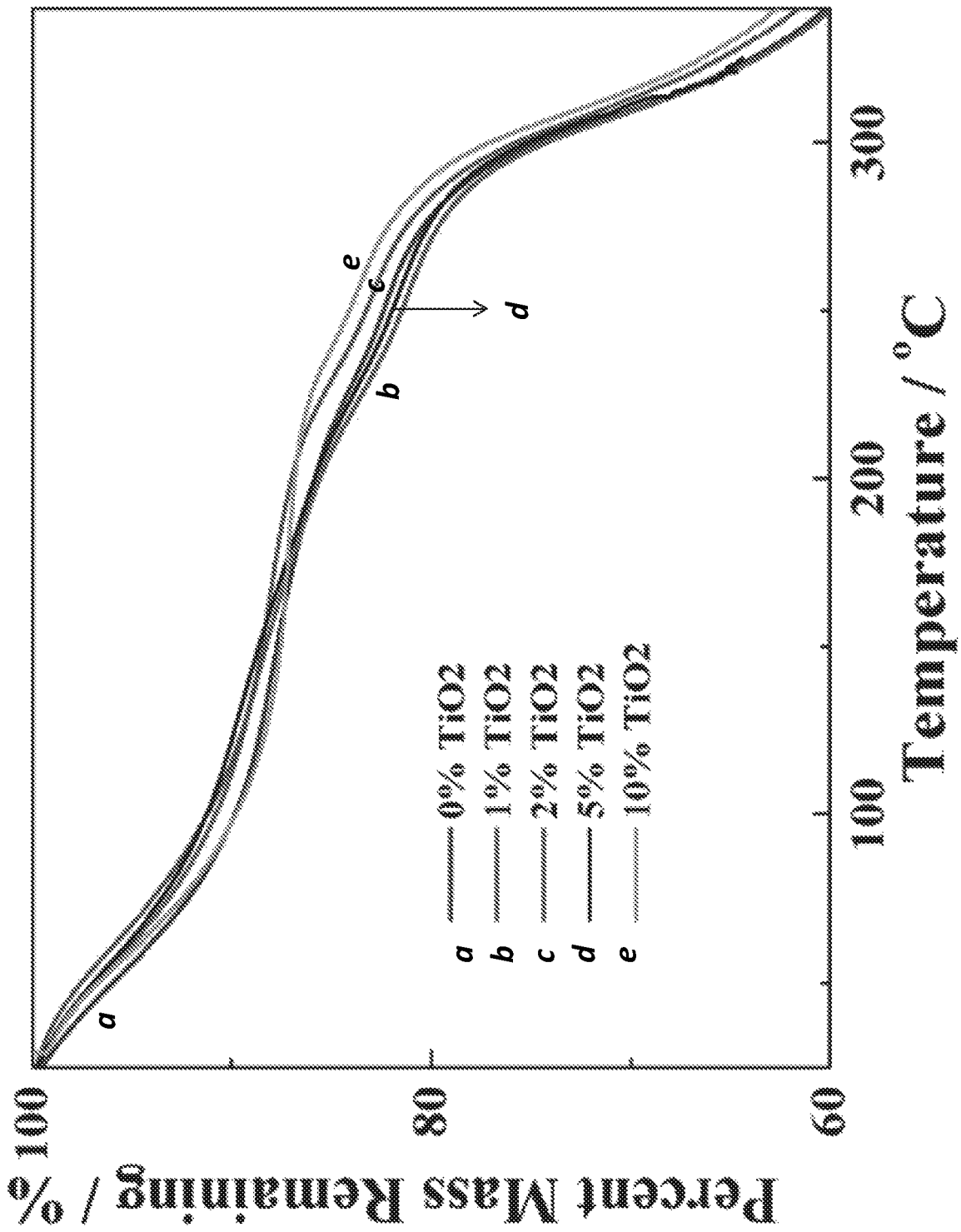
FIGS. 24A-24D are graphs showing comparisons of thermogravimetric analysis of the different air-spun silk-TiO$_2$ micro-/nano-fibers. The graphs show the decomposition temperature trends in the samples for both unwashed (FIG. 24A) and washed (FIG. 24C) along with their respective derivative graphs (FIG. 24B and FIG. 24D).
Figure 24B:
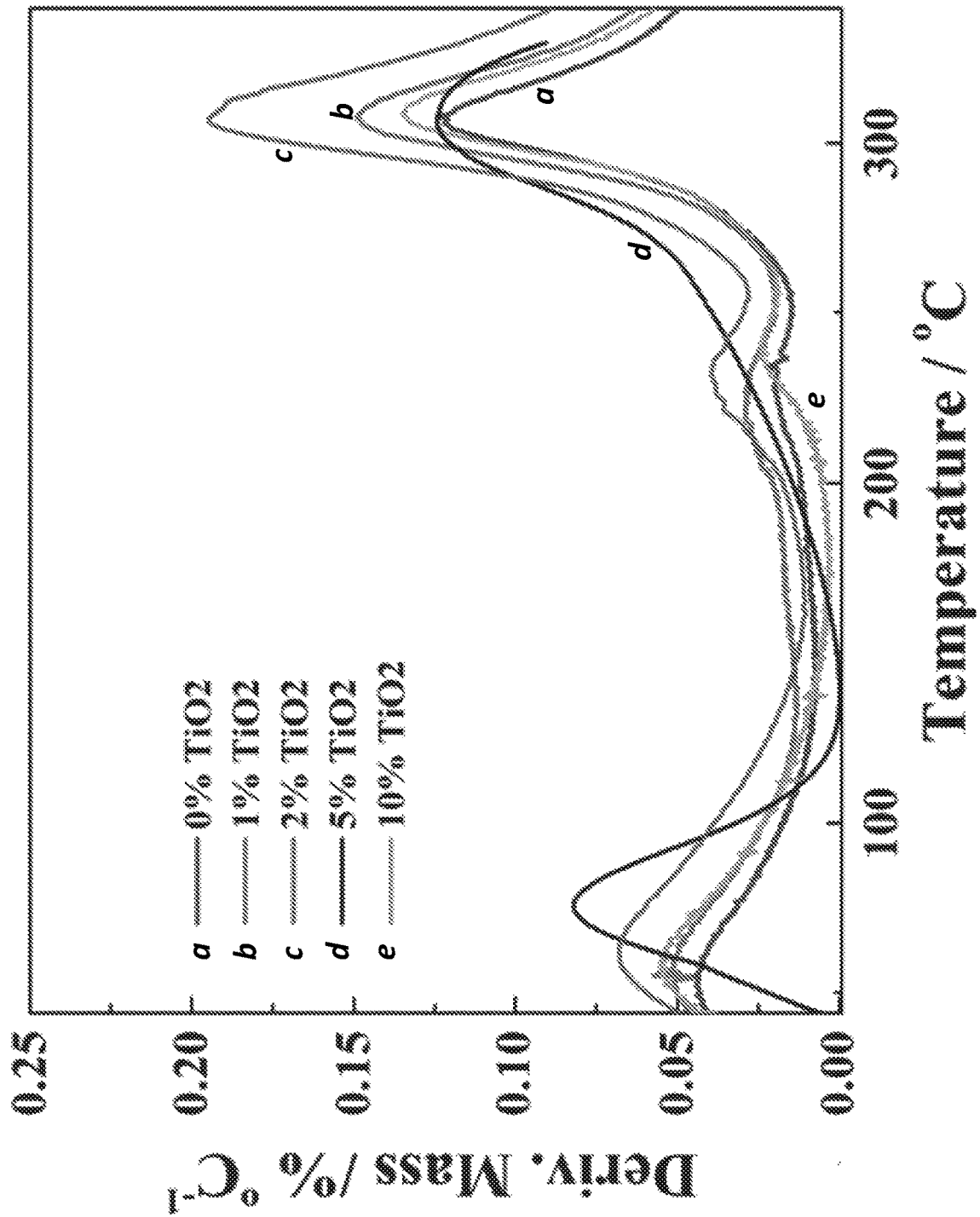
Figure 24C:
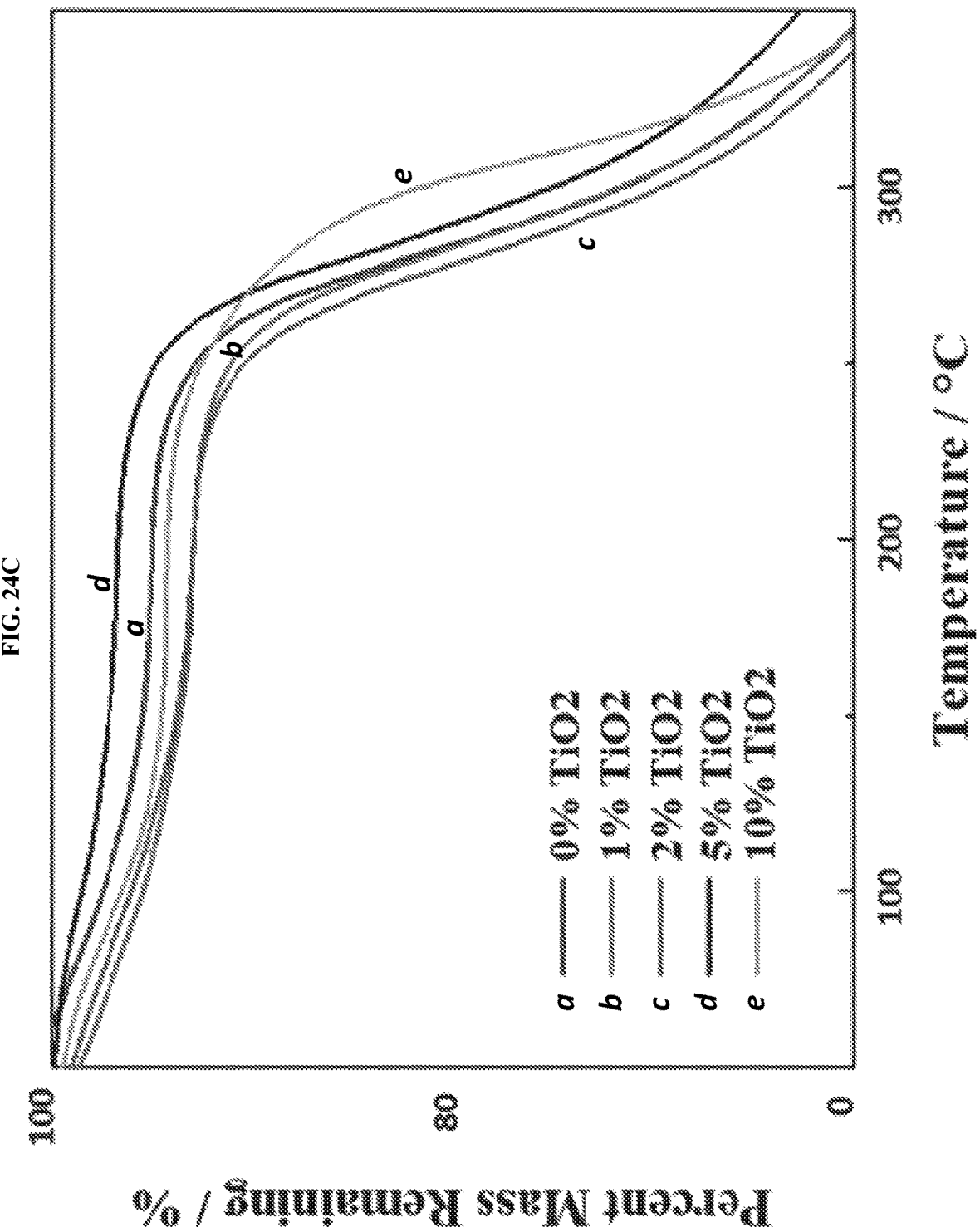
Figure 24D:
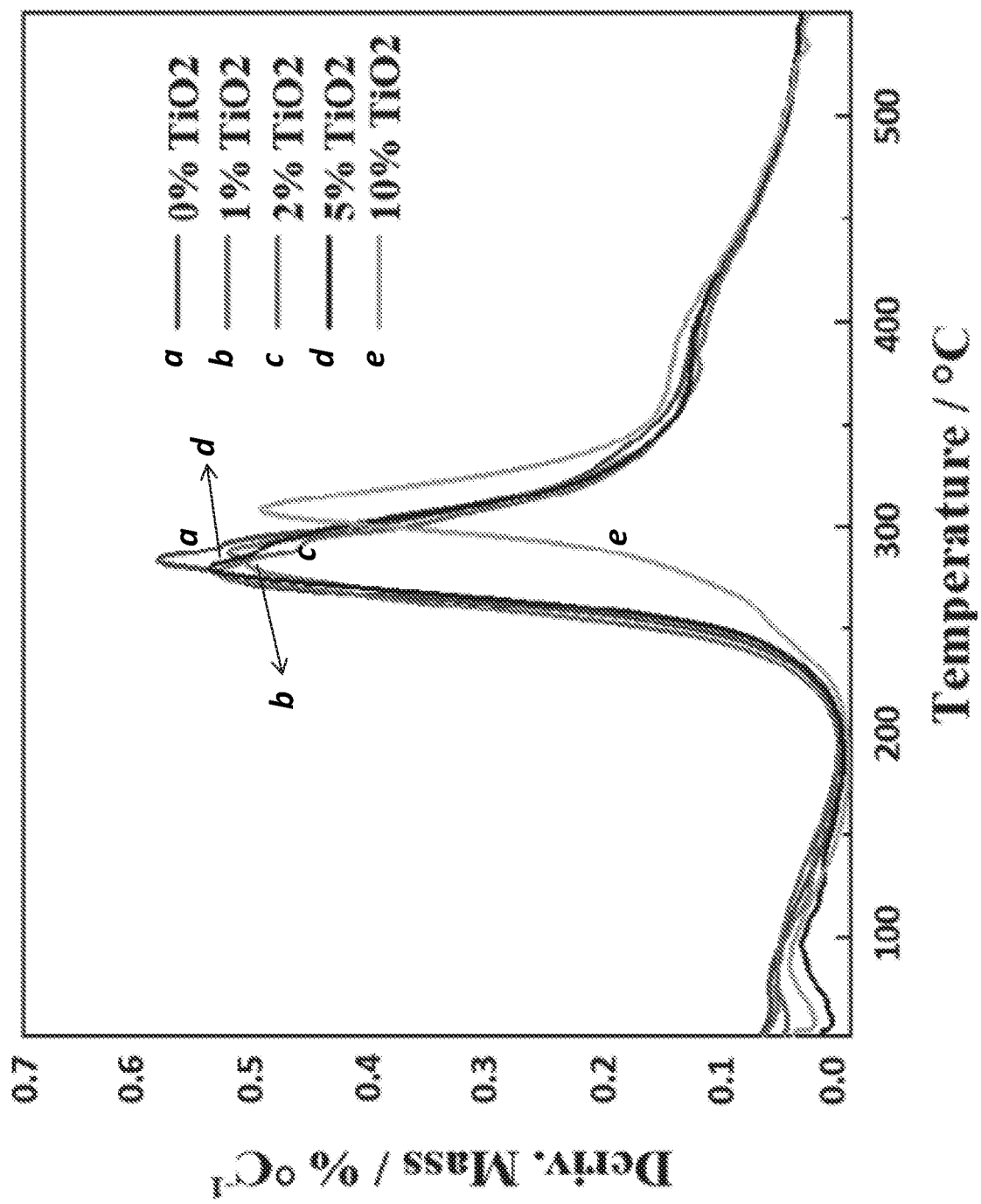

As shown in FIG. 24A, the unwashed samples had very similar degradation profiles despite having different $TiO_2$ ratios. The 0% $TiO_2$ sample had a middle degradation temperature of 287° C. while the 10% $TiO_2$ sample had a middle degradation temperature of 278.9° C. This would suggest that the addition of $TiO_2$ slightly decreased initial thermal stability in samples. However, strong peak degradation typically did not occur until beyond 300° C. as seen in FIG. 24B. As temperature exceeded 300° C. in FIG. 24A, the 10% $TiO_2$ sample degradation profile shifted higher above the others possessing greater thermal stability. The peak derivative mass percent was also situated at a slightly higher temperature in FIG. 24B. Titanium dioxide and calcium chloride have melting points above 1,800° C. and 700° C. respectively so the degradation observed can only be attributed to that of the mori silk. As the percentage of titanium dioxide in the sample increased, so should the overall resistance to thermal degradation increase.

Due to excessive $CaCl_2$, samples were washed in deionized water and then dried. The washed samples again had similar degradation profiles to the unwashed samples, as shown in FIGS. 24C-24D, as well as in Table 6. FIG. 24D clearly shows that the derivative mass percent peak shifted to a high temperature for the 10% $TiO_2$ sample as well. Curves between 0-100° C. resemble the loss of mass from water evaporating from the nanofibers in both FIGS. 24C-24D. In conjunction with quantified percent water content in Table 6, it appears that the nanofibers were able to retain a small amount of bound water even after drying (in FIG. 24D the change in mass derivative approaches 0 until reaching past 200° C.). In FIG. 24C, within the temperature range of 100-200° C., the $TiO_2$ nanofibers had a relatively flat profile as well. The mori silk in washed samples did not degrade as easily compared to unwashed samples. As previously mentioned in the FTIR analysis (Example 7), washing away calcium chloride from mori silk led to the development of a stronger Silk II structure. Therefore, washed samples had greater thermal stability than unwashed samples and this trend was found to be consistent across each sample.

TABLE 6

Thermal analysis data of different air-spun mori silk-TiO₂ nanofibers (measured by DSC and TG).

| Sample (wt %) | $T_g$ (° C.) | ΔCp at Tg (Jg⁻¹K⁻¹) | $T_d$ (° C.) | Max Water Swelling Content (%) | $T_{dm}$ (° C.) | Remaining mass at 350° C. (%) |
|---|---|---|---|---|---|---|
| 0% TiO₂ | 242.6 | 0.34 | 302.7/ 310.0 | 37.9 | 287.1 | 38.2 |
| 1% TiO₂ | 208.3 | 0.26 | 262.2 | 33.7 | 285.8 | 50.3 |
| 2% TiO₂ | 200.3 | 0.24 | 268.4 | 30.4 | 283.7 | 42.1 |
| 5% TiO₂ | 192.7 | 0.20 | 270.2 | 18.3 | 286.2 | 46.4 |
| 10% TiO₂ | 186.9 | 0.20 | 270.8 | 8.7 | 278.9 | 57.4 |

Figure 25:
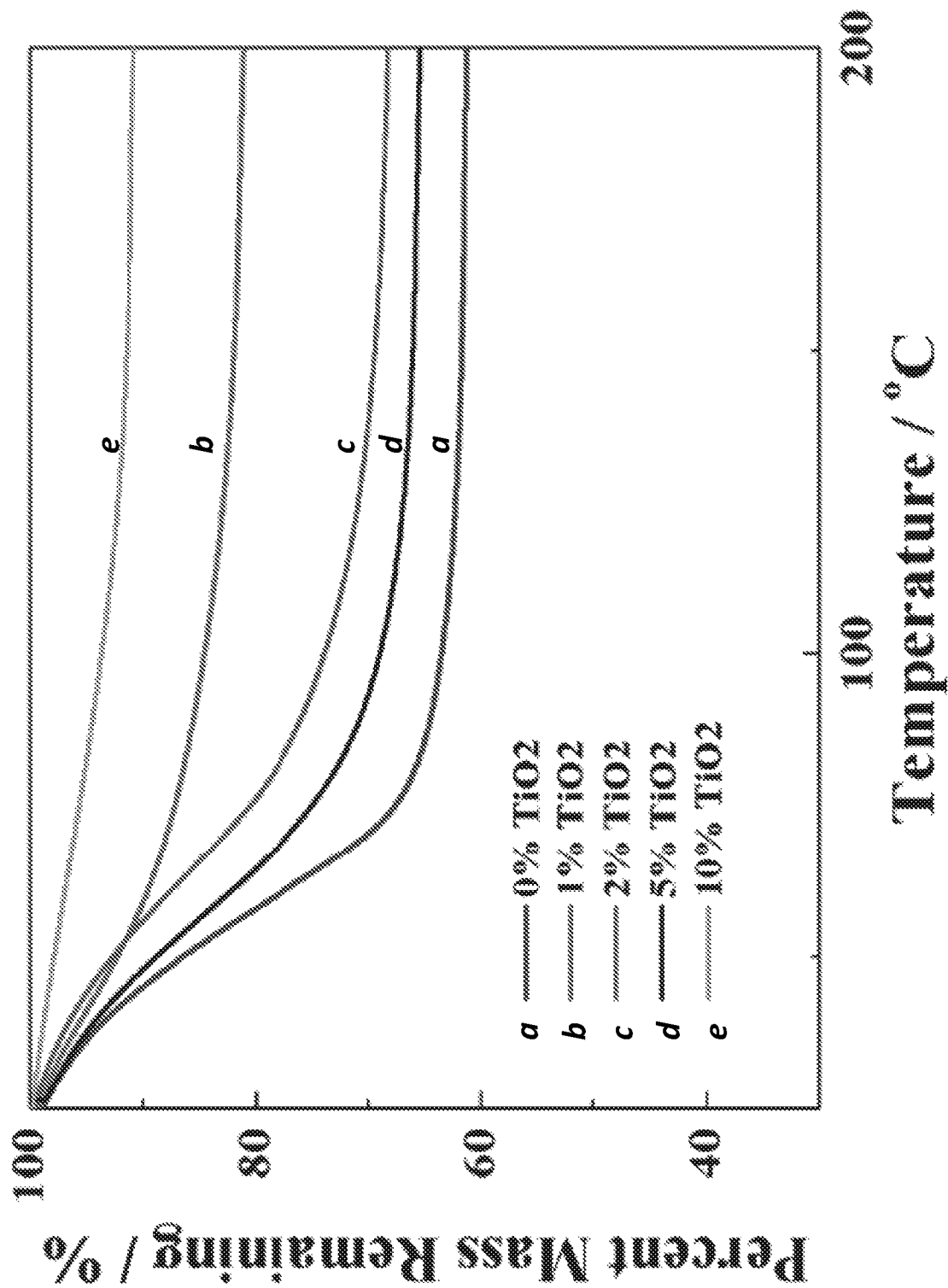
FIG. 25 is a graph comparing swelling capability of the different mori silk-TiO$_2$ nanofibers. The graph shows the amount of water absorbed by silk fiber samples before air drying.

All numbers have an error bar within ±5%. The first three columns ($T_g$, ΔCp at $T_g$, and Degradation $T_d$) were determined by DSC analysis, the rest were determined by TG analysis.
$T_{dm}$: Degradation middle temperature TGA was also used to determine the swelling capability of fiber samples as shown in FIG. 25. Different fiber samples were swelled in water for 30 mins, and then surface moisture as gently removed by wiping with tissues. Then the undried samples were heated by TGA to obtain their maximum water content that absorbed during the swelling process. Endothermic curves (FIG. 25) seen in all samples ended at 100° C., representing the evaporation weight % of remaining water. The pure silk nanofibers were capable of retaining a significant amount of water, around 40% by weight (Table 7). According to initial results, the addition of TiO₂ reduced water carrying capacity of the fibers. Composite fibers have around 30% of water by weight most of the time.

Example 9: Human Cell Proliferation

Figure 26:
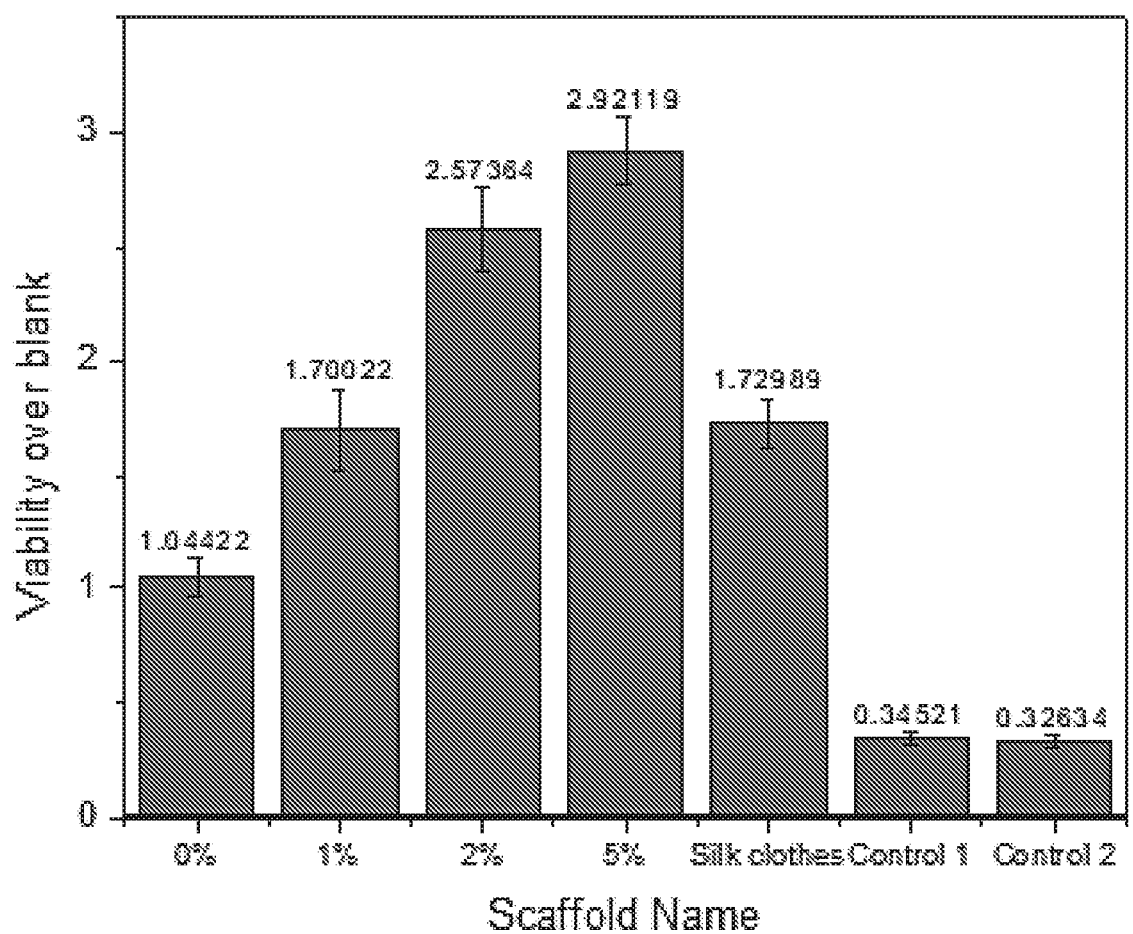
FIG. 26 is a graph comparing HEK293 (Human embryonic kidney) cells attached to and proliferated on different silk-TiO$_2$ composite fiber materials. Cell density was assessed and plotted vs. different control samples (silk textile cloths and blank substrates).
Figure 27C:
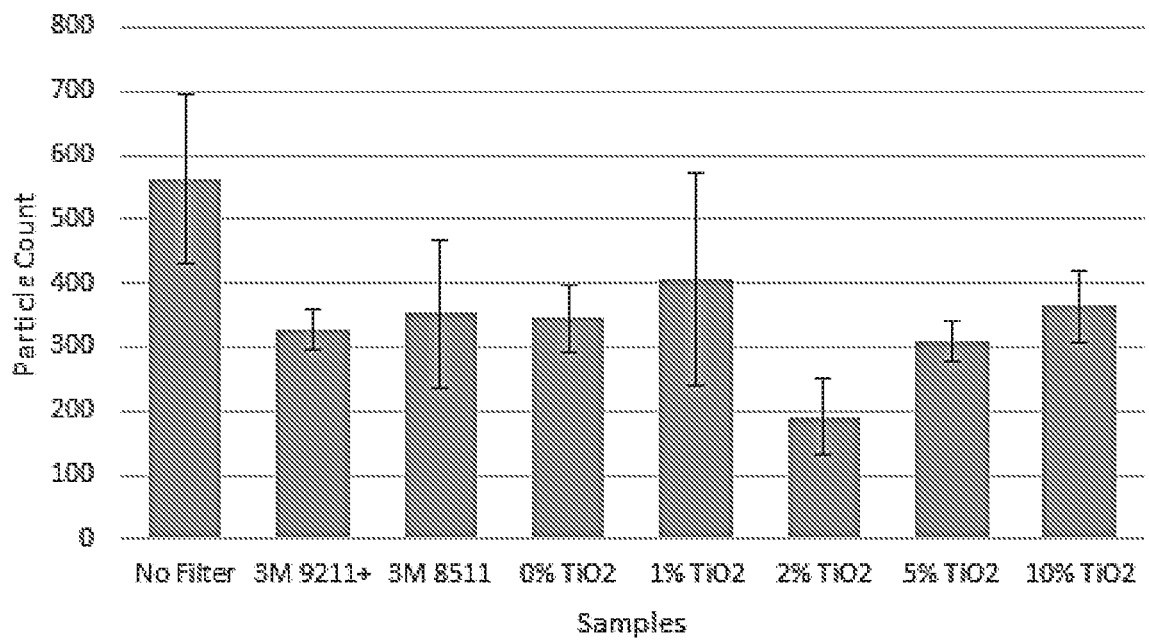
FIGS. 27A-27E are graphs showing the amount of particles penetrating through a range of mori silk-TiO$_2$ filter samples after 1 minute. The size of the particles ranges from 0.3 μm (FIG. 27A), 0.5 μm (FIG. 27B), 1 μm (FIG. 27C), 2.5 μm (FIG. 27D), 5 μm (FIG. 27E), and 10 μm (FIG. 27F) in diameter.
Figure 27D:
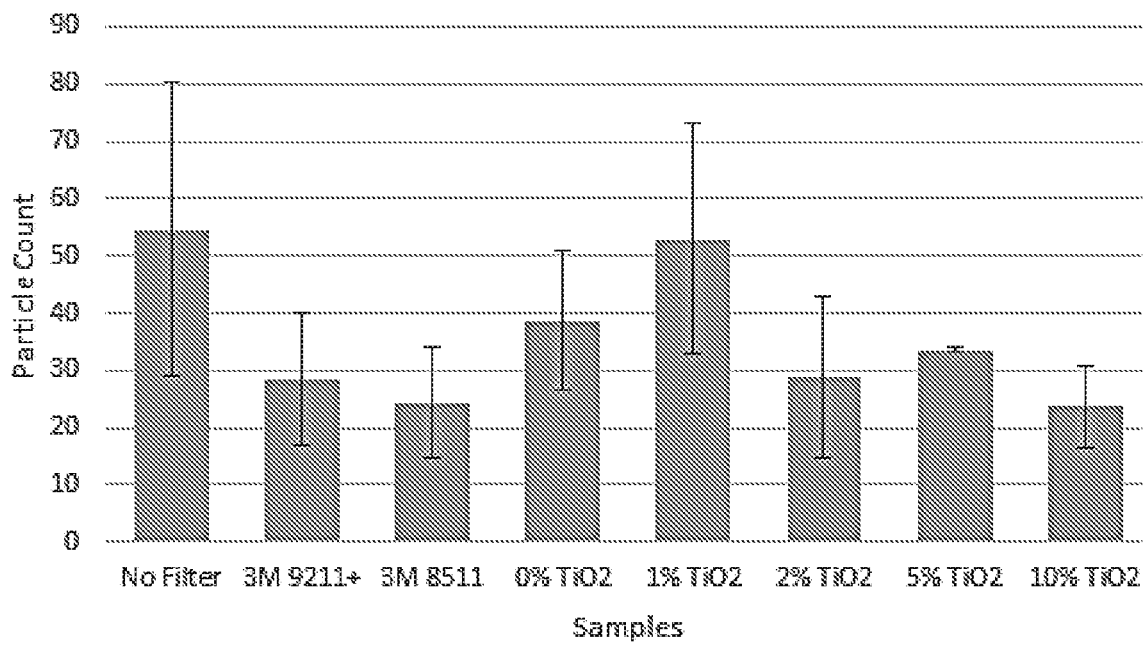
Figure 27E:
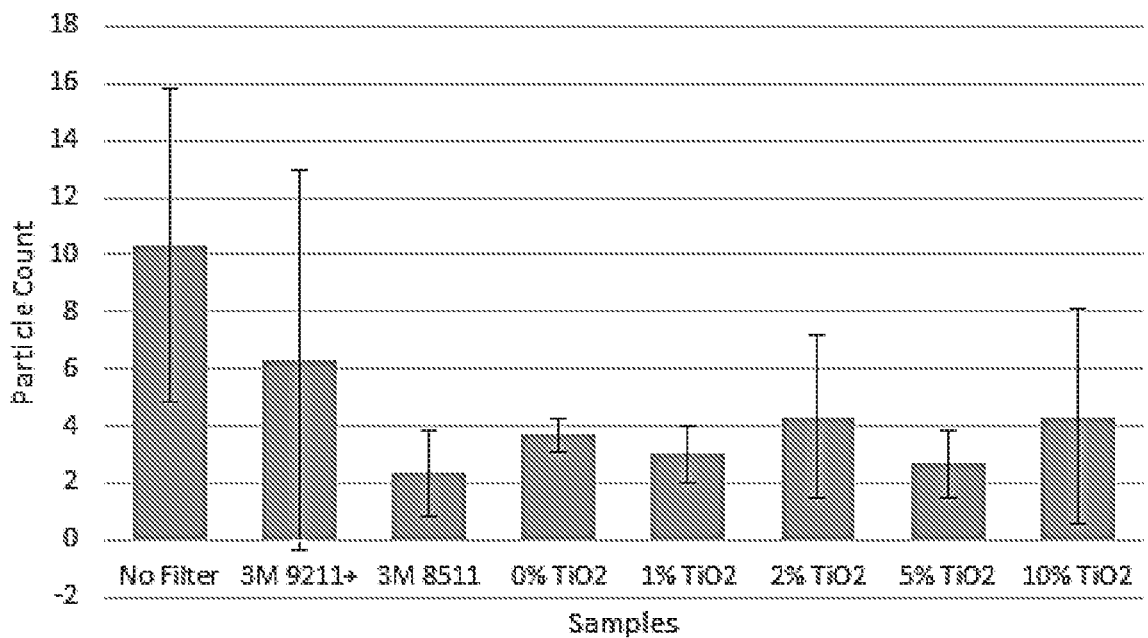
Figure 27F:
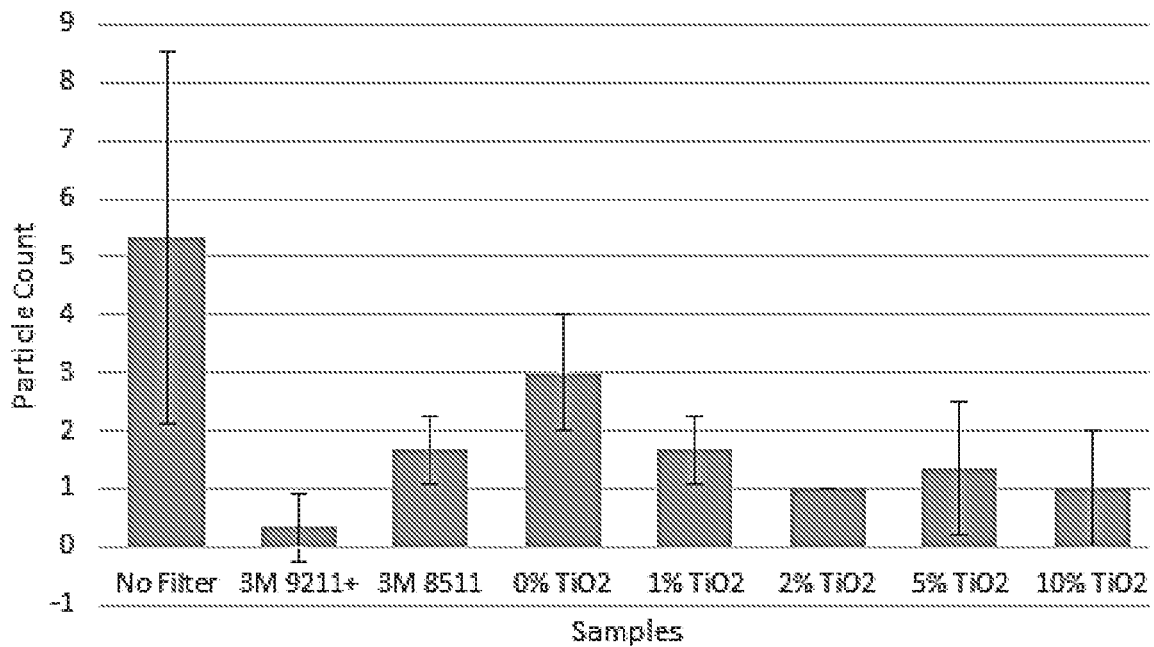

Cell compatibility tests were performed to further demonstrate the potential of these nanofibers for bioengineering applications. HEK293 (Human embryonic kidney cells) is a cell line that is often used in cancer research. HEK293 cells were generated by transformation of either a fibroblastic, endothelial or epithelial cell, all of which are abundant in kidneys. These cells, if interacting with a suitable material in vitro, will grow and proliferate. In order to test cell compatibility on the silk-TiO₂ fiber materials, HEK293 cells were cultured on the surface of different samples (0%, 1%, 2%, 5% and a textile cloth control made by pure silk natural fibers) for 72 hours. After seeding the cells on the samples for 72 hours, the morphology of the cells on composite fiber mat materials remained stable, similar to the control cells on the blank substrate, which indicated that all of the fiber materials tested could support the growth of HEK293 cells. Cell proliferation on the different composite fiber materials were then evaluated by cell numbers per square centimeter at 72 hours after seeding using an MTT assay (FIG. 26). After 72 hours, compared with pure silk fiber sample (0%), all silk-TiO₂ fiber materials showed a significantly increased cell density, which indicated cell proliferation can be elevated drastically by adding a small amount of TiO₂ into the silk matrix. With the increase of the TiO₂ content in silk, the cell density also gradually increased on the surface of the fiber mats. In addition, at 72 hours, the cell density on control samples (silk textile cloths) was significantly lower than all other air-spun fiber samples, indicating that human cells attached to air-spun materials more easily compared to commercial silk textile materials. In conclusion, the results demonstrated that the air-spun silk fiber materials with low TiO₂ content (<10 wt %) can support and facilitate cell attachment, growth and proliferation, better than the pure silk materials.

Example 10: Filtering Efficiency

To characterize the filtering capabilities of the TiO₂ silk nanofibers, pressed fiber samples were adhered to the pump inlet of an Extech VPC300 Particle counter with thicknesses outlined in Table 7. The number of particles entering the instrument were then counted and grouped by diameter, and results were compared to counts achieved when two types of commercial 3M™ filters (3M 8511 NIOSH and 3M Aura 9211+NIOSH) were used, as well as those collected from air without any filter. As seen in FIGS. 27A-F, silk TiO₂ filters successfully blocked particles of all diameters and even outperformed commercial filters. Most notably, 2% TiO₂ samples resulted in a 67% reduction in collected 0.3 μm diameter particles. The addition of TiO₂ to samples appears to have increased their filtering efficiency, with the count of 0.3 μm diameter particles dropping from 9,853 (pure silk) to 8,786 (1% TiO₂), and 4,405 (2% TiO₂). However, upon the addition of TiO₂ to 5%, more 0.3 μm diameter particles (10,950) infiltrated the particle counter, suggesting that high mass percentage of TiO₂ (5%-10%) in silk fibers does not improve the air filtration ability of the fiber filters. While TiO₂ has been shown in the art to increase filtering efficiency, this quality is in respect to its ability to oxidize organic pollutants upon exposure to UV light. However, the results of this experiment are unrelated to this ability. Here, the effect of TiO₂ on the filtering capabilities of the nanofibers appears to be related to its effect on the geometry and pore size of the filter.

Filter efficiency was determined by calculating the ratio of particles blocked by the filter compared to the amount of particles passing through the no filter using equation 2:

$$\frac{N_O - N_f}{N_O} \times 100\% \qquad (2)$$

where $N_O$ is the number of particles passing through from air with no filter and $N_f$ is the number of particles passing through the filter sample. To determine the reliability and durability of the titanium dioxide silk nanofibers, filtering tests were performed for a duration of 100 minutes in addition to the 1-minute test. Since the filters were being subjected to mechanical force supplied by an air pump during these tests, drops in efficiency over time can most likely be attributed to the small breakdown of the fiber network inside the samples. As seen in Table 7, silk nanofiber samples appeared to be superior or comparable to commercial filters during the 1-minute test. The silk filters (0.14~0.18 mm) are much thinner than the commercial filter samples (~0.55 mm). This means that the filter efficiency as a function of thickness of the silk fiber mats is much higher than those of commercial filters. In the 100-minute tests, almost all silk nanofiber samples showed a higher filtering efficiency than commercial air filters, suggesting their superior durability and reliability. In certain embodiments, titanium dioxides can degrade organic air pollutants when exposed to UV light.

TABLE 7

Thickness and efficiency of filter samples

| Sample | Thickness (mm) | Filter Efficiency (1 min) | Filter Efficiency (100 min) |
|---|---|---|---|
| Pure Mori Silk | 0.144 | 29.2% | 85.7% |
| 1% TiO$_2$ silk | 0.185 | 33.4% | 79.4% |
| 2% TiO$_2$ silk | 0.147 | 67.2% | 67.8% |
| 5% TiO$_2$ silk | 0.142 | 22.5% | 71.0% |
| 10% TiO$_2$ silk | 0.165 | 28.2% | 63.5% |
| 3M 8511 NIOSH | 0.557 | 18.0% | 68.3% |
| 3M 9211 NIOSH | 0.567 | 38.2% | 67.5% |

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of producing non-woven protein fibers, the method comprising:
   (a) dissolving a protein in an acidic solution, wherein the acidic solution comprises more than about 80% acidic component by volume;
   (b) optionally removing any insoluble material from the solution; and
   (c) spraying the solution under an applied pressure at a collection surface, such that the solution evaporates after being sprayed, forming protein fibers upon reaching or before reaching the collection surface;
   wherein the solution is sprayed without application of an electrical potential; and
   wherein at least one additional non-protein material is present in the acidic solution and is selected from the group consisting of a pharmaceutical agent, synthetic polymer, natural polymer, plasticizer, metal, metal alloy, metal oxide, metal salt, ceramic, glass, natural composite, synthetic composite, carbon material, nanoparticle, nanotube, nanofiber, nanosheet, microsphere, microfiber, and any combinations thereof.

2. The method of claim 1, wherein the at least one additional non-protein material is at least one of the following:
   (a) a metal oxide selected from the group consisting of SiO$_2$, TiO$_2$, CaO, Al$_2$O$_3$, CuO, ZnO, FeO, MnO, NiO, BaO, SrO, and Fe$_2$O$_3$;
   (b) a pharmaceutical agent selected from the group consisting of an antibiotic, a β-lactamase inhibitor, an anti-diabetic agent, and an anticancer agent;
   (c) a synthetic polymer selected from the group consisting of poly(lactic-co-glycolic acid) (PLGA), polystyrene, polyvinylchloride, poly(styrene sulfonate), poly(acrylic acid) (PAA), poly(diallyldimethylammoniumchloride) (PDADMAC), polyglycolic (PGA) acid and polylactic acid (PLA)
   (d) a natural polymer selected from the group consisting of cellulose, chitin, and starch;
   (e) a carbon material selected from the group consisting of graphene, carbon nanotubes, carbon nanofibers, and fullerenes;
   (f) a plasticizer selected from the group consisting of sorbitan, sorbitan anhydrides, castor oil, mono-acetylated monoglycerides, di-acetylated monoglycerides, glycerin triacetate, glycerol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, polyvinyl alcohol, propylene glycol, triethyl citrate, tributyl citrate, acetyl triethyl citrate, acetyl tributyl citrate, n-butyryl tri-n-hexyl citrate, oleic acid, steric acid, polyethylene glycols, and any combinations thereof.

3. The method of claim 2, wherein the at least one pharmaceutical agent is selected the group consisting of rifampin, meticillin, nafcillin, oxacillin, cloxacillin, dicloxacillin, flucloxacillin, aminopenicillins, ampicillin, amoxicillin, pivampicillin, hetacillin, bacampicillin, metampicillin, talampicillin, epicillin, carboxypenicillins, carbenicillin, ticarcillin, temocillin, ureidopenicillins, mezlocillin, piperacillin, β-lactamase inhibitors, clavulanic acid, sulbactam, tazobactam, insulins, biguanides, metformin, phenformin, buformin, thiazolidinediones, rosiglitazone, pioglitazone, troglitazone, doxorubicin, cyclophosphamide, amsacrine, bleomycin, capecitabine, carmustine, docetaxel, eribulin, fluorouracil, gemcitabine, hydroxycarbamide, idarubicin, temozolomide, thiotepa, tioguanine, topotecan, trabectedin, treosulfan, vinblastine, and vinorelbine.

4. The method of claim 1, wherein the protein is derived from at least one natural source selected from the group consisting of arthropod silk, keratin, tissue elastin, collagen, resilin, reflectin, and plant proteins.

5. The method of claim 4, wherein the protein is derived from at least one arthropod silk source selected from the group consisting of *Bombyx mori* silk, *Samia cynthia* silk, *Antheraea assamensis* silk, *Antheraea mylitta* silk, *Antheraea paphia* silk, *Antheraea pernyi* silk, *Antheraea roylei* silk, *Antheraea yamamai* silk, and spider silk.

6. The method of claim 4, wherein the protein is derived from at least one protein source selected from the group consisting of Indian *Antheraea mylitta* silk (Tussah), *Philosamia ricini* silk (Eri), *Antheraea assamensis* silk (Muga), Thailand silk (Thai) and *Bombyx mori* mulberry silk (Mori).

7. The method of claim 4, wherein the protein is derived from at least one plant source selected from the group consisting of corn zein, wheat gliadin, wheat gluten, barley hordein, rye secalin, sorghum kafirin, oat avenin, soy, and any combinations thereof.

8. The method of claim 1, wherein the protein is artificial or recombinant.

9. The method of claim 1, wherein the protein is dissolved in the acidic solution at a concentration of about 1 g/L to about 600 g/L.

10. The method of claim 1, wherein the acidic component is selected from the group consisting of formic acid, acetic acid, hydrochloric acid, propionic acid, butyric acid, valeric acid, caproic acid, oxalic acid, lactic acid, malic acid, citric acid, benzoic acid, carbonic acid, phenol, uric acid, and any combinations thereof.

11. The method of claim 1, wherein the acidic solution comprises a salt comprising: at least one cation selected from the group consisting of lithium, sodium, potassium, calcium, magnesium, zinc, iron, ammonium, and any combinations thereof; or at least one anion selected from the group consisting of hydroxide, gluceptate, gluconate, acetate, propionate, lactate, nitrate, chloride, bromide, fluoride, iodide, sulfate, carbonate, phosphate, and any combinations thereof.

12. The method of claim 1, wherein the acidic solution comprises at least one salt selected from the group consisting of CaCl$_2$, NaCl, KCl, and MgCl$_2$.

13. The method of claim 1, wherein the insoluble materials are removed from the solution via a method selected from the group consisting of decantation, centrifugation, and filtration.

14. The method of claim 1, wherein the solution is sprayed using an airbrush.

15. The method of claim 1, wherein the solution is sprayed at an applied pressure of about 5 psi to about 200 psi.

16. The method of claim 1, further comprising drying the protein fibers.

17. The method of claim 1, wherein the method produces protein fibers having at least one of the following:
(a) an average diameter of about 0.1 μm to about 200 μm;
(b) an average length of about 1 μm to about 10 m.

18. The method of claim 1, wherein the method produces protein fibers that are not soluble in water.

19. A method of producing non-woven protein fibers, the method comprising:
(a) dissolving a protein in an acidic solution, wherein the protein is derived from at least one natural source selected from the group consisting of arthropod silk and plant proteins;
(b) optionally removing any insoluble material from the solution; and
(c) spraying the solution under an applied pressure at a collection surface, such that the solution evaporates after being sprayed, forming protein fibers upon reaching or before reaching the collection surface;
wherein the solution is sprayed without application of an electrical potential; and
wherein at least one additional non-protein material is present in the acidic solution and is selected from the group consisting of a pharmaceutical agent, synthetic polymer, natural polymer, plasticizer, metal, metal alloy, metal oxide, metal salt, ceramic, glass, natural composite, synthetic composite, carbon material, nanoparticle, nanotube, nanofiber, nanosheet, microsphere, microfiber, and any combinations thereof.

20. The method of claim 19, wherein the at least one additional non-protein material is at least one of the following:

(a) a metal oxide selected from the group consisting of $SiO_2$, $TiO_2$, CaO, $Al_2O_3$, CuO, ZnO, FeO, MnO, NiO, BaO, SrO, and $Fe_2O_3$;

(b) a pharmaceutical agent selected from the group consisting of an antibiotic, a β-lactamase inhibitor, an anti-diabetic agent, and an anticancer agent;

(c) a synthetic polymer selected from the group consisting of poly(lactic-co-glycolic acid) (PLGA), polystyrene, polyvinylchloride, poly(styrene sulfonate), poly (acrylic acid) (PAA), poly(diallyldimethylammoniumchloride) (PDADMAC), polyglycolic (PGA) acid and polylactic acid (PLA)

(d) a natural polymer selected from the group consisting of cellulose, chitin, and starch;

(e) a carbon material selected from the group consisting of graphene, carbon nanotubes, carbon nanofibers, and fullerenes;

(f) a plasticizer selected from the group consisting of sorbitan, sorbitan anhydrides, castor oil, mono-acetylated monoglycerides, di-acetylated monoglycerides, glycerin triacetate, glycerol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, polyvinyl alcohol, propylene glycol, triethyl citrate, tributyl citrate, acetyl triethyl citrate, acetyl tributyl citrate, n-butyryl tri-n-hexyl citrate, oleic acid, steric acid, polyethylene glycols, and any combinations thereof.

21. The method of claim 20, wherein the at least one pharmaceutical agent is selected the group consisting of rifampin, meticillin, nafcillin, oxacillin, cloxacillin, dicloxacillin, flucloxacillin, aminopenicillins, ampicillin, amoxicillin, pivampicillin, hetacillin, bacampicillin, metampicillin, talampicillin, epicillin, carboxypenicillins, carbenicillin, ticarcillin, temocillin, ureidopenicillins, mezlocillin, piperacillin, β-lactamase inhibitors, clavulanic acid, sulbactam, tazobactam, insulins, biguanides, metformin, phenformin, buformin, thiazolidinediones, rosiglitazone, pioglitazone, troglitazone, doxorubicin, cyclophosphamide, amsacrine, bleomycin, capecitabine, carmustine, docetaxel, eribulin, fluorouracil, gemcitabine, hydroxycarbamide, idarubicin, temozolomide, thiotepa, tioguanine, topotecan, trabectedin, treosulfan, vinblastine, and vinorelbine.

22. The method of claim 19, wherein the protein is derived from at least one arthropod silk source selected from the group consisting of *Bombyx mori* silk, *Samia cynthia* silk, *Antheraea assamensis* silk, *Antheraea mylitta* silk, *Antheraea paphia* silk, *Antheraea pernyi* silk, *Antheraea roylei* silk, *Antheraea yamamai* silk, and spider silk.

23. The method of claim 19, wherein the protein is derived from at least one protein source selected from the group consisting of Indian *Antheraea mylitta* silk (Tussah), *Philosamia ricini* silk (Eri), *Antheraea assamensis* silk (Muga), Thailand silk (Thai) and *Bombyx mori* mulberry silk (Mori).

24. The method of claim 19, wherein the protein is derived from at least one plant source selected from the group consisting of corn zein, wheat gliadin, wheat gluten, barley hordein, rye secalin, sorghum kafirin, oat avenin, soy, and any combinations thereof.

25. The method of claim 19, wherein the protein is artificial or recombinant.

26. The method of claim 19, wherein the protein is dissolved in the acidic solution at a concentration of about 1 g/L to about 600 g/L.

27. The method of claim 19, wherein the acidic solution comprises at least one acidic component selected from the group consisting of formic acid, acetic acid, hydrochloric acid, propionic acid, butyric acid, valeric acid, caproic acid, oxalic acid, lactic acid, malic acid, citric acid, benzoic acid, carbonic acid, phenol, uric acid, and any combinations thereof.

28. The method of claim 19, wherein the acidic solution comprises more than about 80% acidic component by volume.

29. The method of claim 19, wherein the acidic solution comprises a salt comprising: at least one cation selected from the group consisting of lithium, sodium, potassium, calcium, magnesium, zinc, iron, ammonium, and any combinations thereof; or at least one anion selected from the group consisting of hydroxide, gluceptate, gluconate, acetate, propionate, lactate, nitrate, chloride, bromide, fluoride, iodide, sulfate, carbonate, phosphate, and any combinations thereof.

30. The method of claim 19, wherein the acidic solution comprises at least one salt selected from the group consisting of $CaCl_2$, NaCl, KCl, and $MgCl_2$.

31. The method of claim 19, wherein the insoluble materials are removed from the solution via a method selected from the group consisting of decantation, centrifugation, and filtration.

32. The method of claim 19, wherein the solution is sprayed using an airbrush.

33. The method of claim 19, wherein the solution is sprayed at an applied pressure of about 5 psi to about 200 psi.

34. The method of claim 19, further comprising drying the protein fibers.

35. The method of claim 19, wherein the method produces protein fibers having at least one of the following:
   (a) an average diameter of about 0.1 μm to about 200 μm;
   (b) an average length of about 1 μm to about 10 m.

36. The method of claim 19, wherein the method produces protein fibers that are not soluble in water.

\* \* \* \* \*